US012792304B2

(12) United States Patent
Lee

(10) Patent No.: US 12,792,304 B2
(45) Date of Patent: Nov. 10, 2026

(54) ACCUMULATOR FOR HIGH OPERATING SPEED, OPERATIONAL LOGIC CIRCUIT AND PROCESSING-IN-MEMORY DEVICE INCLUDING THE SAME

(71) Applicant: SK hynix Inc., Icheon-si (KR)

(72) Inventor: Seong Ju Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 1191 days.

(21) Appl. No.: 17/835,562

(22) Filed: Jun. 8, 2022

(65) Prior Publication Data

US 2023/0168862 A1 Jun. 1, 2023

(30) Foreign Application Priority Data

Dec. 1, 2021 (KR) ........................ 10-2021-0169849

(51) Int. Cl.
*G06F 7/50* (2006.01)
*G06F 7/57* (2006.01)

(52) U.S. Cl.
CPC . *G06F 7/50* (2013.01); *G06F 7/57* (2013.01)

(58) Field of Classification Search
CPC ........ G06F 7/3689; G06F 7/485; G06F 7/498; G06F 7/4981; G06F 7/50; G06F 7/5095; G06F 7/57
See application file for complete search history.

(56) References Cited

U.S. PATENT DOCUMENTS 5,490,100 A * 2/1996 Kableshkov .......... G06F 16/284 708/709
6,295,597 B1 * 9/2001 Resnick .............. G06F 15/8076 712/8
10,127,013 B1 * 11/2018 Langhammer .......... H03M 7/24
2008/0046495 A1 * 2/2008 Du ........................ G06F 7/5095 708/495

FOREIGN PATENT DOCUMENTS

KR 1020090031594 A 3/2009

* cited by examiner

*Primary Examiner* — Emily E Larocque
(74) *Attorney, Agent, or Firm* — WILLIAM PARK AND ASSOCIATES LTD.

(57) ABSTRACT

An accumulator includes an input latch circuit including a first input latch capable of latching and outputting input data, a second input latch capable of latching and outputting odd latch data, and a third input latch capable of latching and outputting even latch data. The accumulator also includes an accumulating circuit configured to add the input data and the odd latch data output from the input latch circuit to output odd accumulation data, and configured to add the Input data and the even latch data to output even accumulation data. The accumulator further includes an output latch circuit including a first output latch capable of latching the odd accumulation data output from the accumulating circuit and outputting the odd latch data, and including a second output latch capable of latching the even accumulation data output from the accumulating circuit and outputting the even latch data.

28 Claims, 54 Drawing Sheets

ACCUMULATOR FOR HIGH OPERATING SPEED, OPERATIONAL LOGIC CIRCUIT AND PROCESSING-IN-MEMORY DEVICE INCLUDING THE SAME

CROSS-REFERENCE TO RELATED APPLICATIONS

The present application claims priority under 35 U.S.C 119(a) to Korean Application No. 10-2021-0169849, filed on Dec. 1, 2021, which is incorporated herein by reference in its entirety.

BACKGROUND

1. Technical Field

Various embodiments of the present disclosure generally relate to an accumulator, and more particularly, to an accumulator for high operation speed, an operational logic circuit and a processing-in-memory (hereinafter, referred to as "PIM") device including the accumulator.

2. Related Art

Recently, interest in artificial intelligence is rapidly increasing not only in the Information technology (IT) industry, but also in the financial and medical industries. Accordingly, the introduction of artificial intelligence, more precisely, deep learning, is being considered and prototyped in various fields. In general, deep learning is a collective term for technology that effectively learns neural networks (DNNs) or deep networks that increase the number of layers in traditional neural networks and uses them for pattern recognition or inference. In performing deep learning, a multiplication-accumulation (hereinafter, referred to as "MAC") operation is used. The MAC operation may be performed through the processes of a multiplication operation, an addition operation, and an accumulation operation. In an accumulator performing the accumulation operation, when the speed at which the accumulation operation is performed in the accumulator is slower than the speed at which data is input to the accumulator, the speed of performing the overall MAC operation may be reduced.

SUMMARY

According to an embodiment of the present disclosure, an accumulator may include an input latch circuit, an accumulating circuit, and an output latch circuit. The input latch circuit may include a first input latch that latches and outputs input data, a second input latch that latches and outputs odd latch data, and a third input latch that latches and outputs even latch data. The accumulating circuit may add the input data and the odd latch data output from the input latch circuit to output odd accumulation data, and add the input data and the even latch data to output even accumulation data. The output latch circuit may include a first output latch that latches the odd accumulation data output from the accumulating circuit and outputs the odd latch data, and a second output latch that latches the even accumulation data output from the accumulating circuit and outputs the even latch data.

According to another embodiment of the present disclosure, an accumulator may include an input latch circuit, an accumulating circuit, an output latch circuit, and an additional adder. The input latch circuit may include a first input latch that latches and outputs input data, a second input latch that latches and outputs odd latch data, and a third input latch that latches and outputs even latch data. The accumulating circuit may add the input data and the odd latch data output from the input latch circuit to output odd accumulation data, and add the input data and the even latch data to output even accumulation data. The output latch circuit may include a first output latch that latches the odd accumulation data output from the accumulating circuit and output the odd latch data, and a second output latch that latches the even accumulation data output from the accumulating circuit and output the even latch data. The additional adder may add a last odd latch data among the odd latch data output from the first output latch and a last even latch data among the even latch data output from the second output latch and output accumulation data.

According to another embodiment of the present disclosure, an accumulator may include a selector, an input latch circuit, an accumulating circuit, and an output latch circuit. The selector may output selected data selected from input data and odd latch data. The input latch circuit may include a first input latch that latches and outputs the selected data transmitted from the selector, a second input latch that latches and outputs the odd latch data, and a third input latch that latches and outputs even latch data. The accumulating circuit may add the selected data and the odd latch data output from the input latch circuit to output odd accumulation data, and add the selected data and the even latch data to output even accumulation data. The output latch circuit may include a first output latch that latches the odd accumulation data output from the accumulating circuit and output the odd latch data, and a second output latch that latches the even accumulation data output from the accumulating circuit and output the even latch data.

According to another embodiment of the present disclosure, a MAC operator may include a multiplication circuit configured to perform a multiplication operation on first input data and second input data and output multiplication data, an adder tree configured to perform an addition operation on the multiplication data and output multiplication addition data, and an accumulator configured to perform an accumulation operation on the multiplication addition data and latch data. The accumulator may include a selector, an input latch circuit, an accumulating circuit, and an output latch circuit. The selector may output selected data selected from the multiplication addition data and odd latch data. The input latch circuit may include a first input latch that latches and outputs the selected data transmitted from the selector, a second input latch that latches and outputs the odd latch data, and a third input latch that latches and outputs even latch data. The accumulating circuit may add the selected data and the odd latch data output from the input latch circuit to output odd accumulation data, and add the selected data and the even latch data to output even accumulation data. The output latch circuit may include a first output latch that latches the odd accumulation data output from the accumulating circuit and output the odd latch data, and a second output latch that latches the even accumulation data output from the accumulating circuit and output the even latch data.

According to another embodiment of the present disclosure, a PIM device may include a memory circuit configured to provide weight data and vector data, a multiplication circuit configured to perform a multiplication operation on the weight data and the vector data and output multiplication data, an adder tree configured to perform an addition operation on the multiplication data and output multiplication addition data, and an accumulator configured to perform an accumulation operation on the multiplication addition data and latch data. The accumulator may include a selector, an input latch circuit, an accumulating circuit, and an output latch circuit. The selector may output selected data selected from the multiplication addition data and odd latch data. The input latch circuit may include a first input latch that latches and outputs the selected data transmitted from the selector, a second input latch that latches and outputs the odd latch data, and a third input latch that latches and outputs even latch data. The accumulating circuit may add the selected data and the odd latch data output from the input latch circuit to output odd accumulation data, and add the selected data and the even latch data to output even accumulation data. The output latch circuit may include a first output latch that latches the odd accumulation data output from the accumulating circuit and output the odd latch data, and a second output latch that latches the even accumulation data output from the accumulating circuit and output the even latch data.

According to another embodiment of the present disclosure, a PIM device may include a first memory circuit configured to include a left memory bank that provides left weight data and a right memory bank that provides right weight data, a second memory circuit configured to include a first global buffer that provides left vector data and a second global buffer that provides right vector data, a left multiplication circuit configured to perform a multiplication operation on the left weight data and the left vector data and output left multiplication data, a left adder tree configured to perform an addition operation on the left multiplication data and output left multiplication addition data, a left accumulator configured to perform an accumulation operation on the left multiplication addition data and left latch data, a right multiplication circuit configured to perform a multiplication operation on the right weight data and the right vector data and output right multiplication data, a right adder tree configured to perform an addition operation on the right multiplication data and output right multiplication addition data, and a right accumulator configured to perform an accumulation operation on the right multiplication addition data and right latch data. Each of the left accumulator and the right accumulator may include a selector, an input latch circuit, an accumulating circuit, and an output latch circuit. The selector may output selected data selected from multiplication addition data and odd latch data. The input latch circuit may include a first input latch that latches and outputs the selected data transmitted from the selector, a second input latch that latches and outputs the odd latch data, and a third input latch that latches and outputs even latch data. The accumulating circuit may add the selected data and the odd latch data output from the input latch circuit to output odd accumulation data, and add the selected data and the even latch data to output even accumulation data. The output latch circuit may include a first output latch that latches the odd accumulation data output from the accumulating circuit and output the odd latch data, and a second output latch that latches the even accumulation data output from the accumulating circuit and output the even latch data.

According to another embodiment of the present disclosure, a PIM device may include a first memory circuit configured to include a left memory bank that provides left weight data and a right memory bank that provides right weight data, a second memory circuit configured to include a first global buffer that provides left vector data and a second global buffer that provides right vector data, a left multiplication circuit configured to perform a multiplication operation on the left weight data and the left vector data and output left multiplication data, a left adder tree configured to perform an addition operation on the left multiplication data and output left multiplication addition data, a right multiplication circuit configured to perform a multiplication operation on the right weight data and the right vector data and output right multiplication data, a right adder tree configured to perform an addition operation on the right multiplication data and output right multiplication addition data, an adder configured to perform an addition operation on the left multiplication addition data and the right multiplication addition data and output multiplication addition data, and an accumulator configured to perform an accumulation operation on the multiplication addition data and latch data. The accumulator may include a selector, an input latch circuit, an accumulating circuit, and an output latch circuit. The selector may output selected data selected from the multiplication addition data and odd latch data. The input latch circuit may include a first input latch that latches and outputs the selected data transmitted from the selector, a second input latch that latches and outputs the odd latch data, and a third input latch that latches and outputs even latch data. The accumulating circuit may add the selected data and the odd latch data output from the input latch circuit to output odd accumulation data, and add the selected data and the even latch data to output even accumulation data. The output latch circuit may include a first output latch that latches the odd accumulation data output from the accumulating circuit and output the odd latch data, and a second output latch that latches the even accumulation data output from the accumulating circuit and output the even latch data.

According to another embodiment of the present disclosure, a PIM device may include a first memory circuit configured to include a left memory bank that provides left weight data and a right memory bank that provides right weight data, a second memory circuit configured to include a first global buffer that provides left vector data and a second global buffer that provides right vector data, a left multiplication circuit configured to perform a multiplication operation on the left weight data and the left vector data and output left multiplication data, a right multiplication circuit configured to perform a multiplication operation on the right weight data and the right vector data and output right multiplication data, a unified adder tree configured to perform an addition operation on the left multiplication data and the right multiplication data and output multiplication addition data, and an accumulator configured to perform an accumulation operation on the multiplication addition data and latch data. The accumulator may include a selector, an input latch circuit, an accumulating circuit, and an output latch circuit. The selector may output selected data selected from the multiplication addition data and odd latch data. The input latch circuit may include a first input latch that latches and outputs the selected data transmitted from the selector, a second input latch that latches and outputs the odd latch data, and a third input latch that latches and outputs even latch data. The accumulating circuit may add the selected data and the odd latch data output from the input latch circuit to output odd accumulation data, and add the selected data and the even latch data to output even accumulation data. The output latch circuit may include a first output latch that latches the odd accumulation data output from the accumulating circuit and output the odd latch data, and a second output latch that latches the even accumulation data output from the accumulating circuit and output the even latch data.

BRIEF DESCRIPTION OF THE DRAWINGS

Certain features of the disclosed technology are illustrated by various embodiments with reference to the attached drawings.

DETAILED DESCRIPTION

Figure 1:
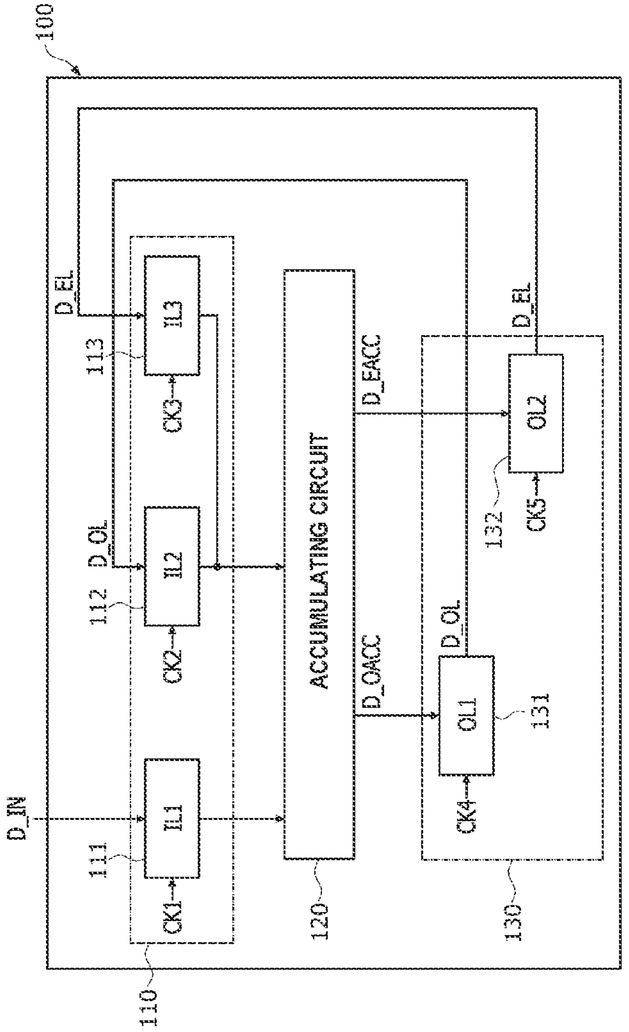
FIG. 1 is a diagram illustrating an accumulator according to an embodiment of the present disclosure.

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean a relative positional relationship, but not used to limit certain cases for which the element directly contacts the other element, or at least one intervening element is present between the two elements. Accordingly, the terms such as "on," "over," "above," "under," "beneath," "below," and the like that are used herein are for the purpose of describing particular embodiments only and are not intended to limit the scope of the present disclosure.

Further, when an element is referred to as being "connected" or "coupled" to another element, the element may be electrically or mechanically connected or coupled to the other element directly, or may be electrically or mechanically connected or coupled to the other element indirectly with one or more additional elements between the two elements. Moreover, when a parameter is referred to as being "predetermined," it may be intended to mean that a value of the parameter is determined in advance of when the parameter is used in a process or an algorithm. The value of the parameter may be set when the process or the algorithm starts or may be set during a period in which the process or the algorithm is executed.

A logic "high" level and a logic "low" level may be used to describe logic levels of electric signals. A signal having a logic "high" level may be distinguished from a signal having a logic "low" level. For example, when a signal having a first voltage corresponds to a signal having a logic "high" level, a signal having a second voltage may correspond to a signal having a logic "low" level. In an embodiment, the logic "high" level may be set as a voltage level which is higher than a voltage level of the logic "low" level. Meanwhile, logic levels of signals may be set to be different or opposite according to embodiment. For example, a certain signal having a logic "high" level in one embodiment may be set to have a logic "low" level in another embodiment.

Various embodiments of the present disclosure will be described hereinafter in detail with reference to the accompanying drawings. However, the embodiments described herein are for illustrative purposes only and are not intended to limit the scope of the present disclosure.

Although DRAM is used as an example as a memory element in various embodiments described below, it is apparent that the present disclosure is not limited thereto. For example, the present disclosure may be equally applicable to SRAM, synchronous DRAM (SDRAM), double data rate synchronous DRAM (DDR SDRAM, DDR2 SDRAM, DDR3 SDRAM, etc.), graphics double data rate synchronous DRAM (GDDR, GDDR2, GDDR3, etc.), quad data rate DRAM (QDR DRAM), RAMBUS XDR DRAM (XDR DRAM), fast page mode DRAM (FPM DRAM), video DRAM (VDRAM), extended data output DRAM (EDO DRAM), burst EDO DRAM (BEDO DRAM), multibank DRAM (MDRAM), synchronous graphics RAM (SGRAM), and/or other various types of DRAM.

Various embodiments are directed to accumulators for high operating speed, operational logic circuits and processing-in-memory (PIM) devices including the same.

FIG. 1 is a block diagram illustrating an accumulator 100 according to an embodiment of the present disclosure. Referring to FIG. 1, the accumulator 100 may include an Input latch circuit 110, an accumulating circuit 120, and an output latch circuit 130. The input latch circuit 110 may include a first input latch (IL1) 111, a second input latch (IL2) 112, and a third input latch (IL3) 113. The output latch circuit 130 may include a first output latch (OL1) 131 and a second output latch (OL2) 132. In an example, each of the first input latch 111, the second input latch 112, the third input latch 113, the first output latch 131, and the second output latch 132 may be configured with a flip-flop. In another example, each of the first input latch 111, the second input latch 112, the third input latch 113, the first output latch 131, and the second output latch 132 may be configured with a register Including a plurality of flip-flops.

The first input latch 111 may include an input terminal receiving input data D_IN transmitted from outside the accumulator 100, a clock input terminal receiving a first clock signal CK1, and an output terminal coupled to the accumulating circuit 120. The first input latch 111 may output the input data D_IN received through the Input data D_IN through the output terminal in synchronization with the first clock signal CK1. The second input latch 112 may include an input terminal receiving odd latch data D_OL transmitted from the first output latch 131, a clock input terminal receiving a second clock signal CK2, and an output terminal coupled to the accumulating circuit 120. The second input latch 112 may output the odd latch data D_OL received through the input terminal through the output terminal in synchronization with the second clock signal CK2. The second input latch 112 may output the odd latch data D_OL received through the input terminal through the output terminal in synchronization with the second clock signal CK2. The third input latch 113 may include an input terminal receiving even latch data D_EL transmitted from the second output latch 132, a clock input terminal receiving a third clock CK3, and an output terminal coupled to the accumulating circuit 120. The third input latch 113 may output the even latch data D_EL received through the input terminal through the output terminal in synchronization with the third clock signal CK3. The output terminal of the second input latch 112 may be coupled to the output terminal of the third input latch 113. Accordingly, the second input latch 112 and the third input latch 113 may share an output line.

In the input latch circuit 110 according to the present embodiment, the timing at which the input data D_IN, the odd latch data D_OL, and the even latch data D_EL are transmitted to the accumulating circuit 120 may be appropriately adjusted by appropriately setting the pulse period of the first clock signal CK1, the pulse period of the second clock signal CK2, and the pulse period of the third clock signal CK3. In an example, when pulses of the second clock signal CK2 and pulses of the third clock signal CK3 are alternately generated, the odd latch data D_OL from the second input latch 112 and the even latch data D_EL from the third input latch 113 may be alternately transmitted to the accumulating circuit 120. When the pulses of the second clock signal CK2 and the pulses of the third clock signal CK3 are synchronized with the odd-numbered pulses and even-numbered pulses of the first clock signal CK1 under such conditions, a first data input operation in which the input data D_IN and the odd latch data D_OL are input to the accumulating circuit 120 and a second data input operation in which the input data D_IN and the even latch data D_EL are input to the accumulating circuit 120 may be alternately performed.

The accumulating circuit 120 may include at least two input terminals and at least two output terminals. The input terminals of the accumulating circuit 120 may include a first input terminal and a second input terminal. The first input terminal of the accumulating circuit 120 may be coupled to the output terminal of the first input latch 111 to receive the input data D_IN. The second input terminal of the accumulating circuit 120 may be coupled to the output terminal of the second input latch 112 and the output terminal of the third input latch 113 to receive the odd latch data D_OL or the even latch data D_EL. The output terminals of the accumulating circuit 120 may include first and second output terminals. The first output terminal of the accumulating circuit 120 may be coupled to the input terminal of the first output latch 131. The second output terminal of the accumulating circuit 120 may be coupled to the input terminal of the second output latch 132. In an example, the accumulating circuit 120 may perform an addition operation on the input data D_IN and the odd latch data D_OL and output the result data through the first output terminal as odd accumulation data D_OACC. The accumulating circuit 120 may perform an addition operation on the input data D_IN and the even latch data D_EL and output the result data through the second output terminal as even accumulation data D_EACC. The configuration of the accumulating circuit 120 will be described in more detail below.

The first output latch 131 may include an input terminal coupled to the first output terminal of the accumulating circuit 120, a clock input terminal receiving a fourth clock signal CK4, and an output terminal coupled to the input terminal of the second input latch 112. Accordingly, the first output latch 131 may latch the odd accumulation data D_OACC transmitted through the first output terminal of the accumulating circuit 120. The first output latch 131 may transmit the odd accumulation data D_OACC to the second input latch 112 as the odd latch data D_OL in response to the fourth clock signal CK4. The second output latch 132 may include an input terminal coupled to the second output terminal of the accumulating circuit 120, a clock input terminal for receiving a fifth clock signal CK5, and an output terminal coupled to the input terminal of the third input latch 113. Accordingly, the second output latch 132 may latch the even accumulation data D_EACC transmitted through the second output terminal of the accumulating circuit 120. The second output latch 132 may transmit the even accumulation data D_EACC as the even latch data D_EL to the third input latch 113 in response to the fifth clock signal CK5.

Figure 2:
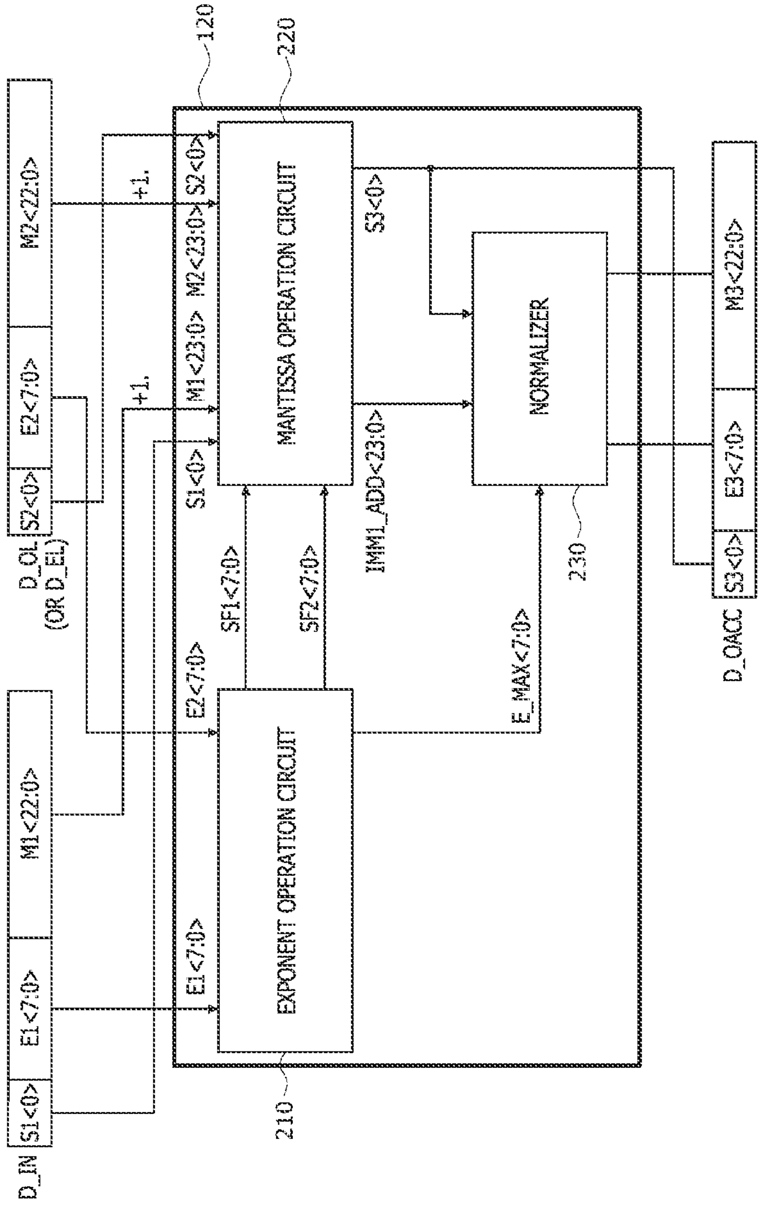
FIG. 2 is a diagram illustrating an example of a configuration of an accumulating circuit of the accumulator of FIG. 1.

FIG. 2 is a diagram illustrating an example of a configuration of the accumulating circuit 120 of the accumulator 100 of FIG. 1. In the following description of the accumulating circuit 120, a case in which the input data D_IN and the odd latch data D_OL are input will be exemplified. The following description may be equally applied even when the input data D_IN and the even latch data D_EL are input. Therefore, hereinafter, "odd latch data D_OL" and "odd accumulation data D_OACC" may be replaced with "even latch data D_EL" and "even accumulation data D_EACC", respectively.

In this example, it is presupposed that each of the input data D_IN and the odd latch data D_OL has the floating-point format of 32-bit single-precision. Accordingly, the input data D_IN may include a 1-bit first sign bit S1<0>, 8-bit first exponent bits E1<7:0>, and 23-bit first mantissa bits M1<22:0>. Similarly, the odd latch data D_OL may include a 1-bit second sign bit S2<0>, 8-bit second exponent bits E2<7:0>, and 23-bit second mantissa bits M2<22:0>. In addition, the odd accumulation data D_OACC output from the accumulating circuit 120 may include a 1-bit third sign bit S3<0>, 8-bit third exponent bits E3<7:0>, and 23-bit third mantissa bits M3<22:0>. Each of the 23-bit first mantissa bits M1<22:0> of the input data D_IN and the 23-bit second mantissa bits M2<22:0> of the odd latch data D_OL may include a 1-bit implicit bit 1. before being input to the accumulating circuit 120, and as a result, may be input to the accumulating circuit 120 in the form of 24-bit first mantissa bits M1<23:0> and 24-bit second mantissa bits M2<23:0>, respectively.

Referring to FIG. 2, the accumulating circuit 120 may include an exponent operation circuit 210, a mantissa operation circuit 220, and a normalizer 230. The exponent operation circuit 210 may receive the first exponent bits E1<7:0> of the input data D_IN and the second exponent bits E2<7:0> of the odd latch data D_OL from the first input latch 111 of FIG. 1 and the second input latch 112 of FIG. 1, respectively. The exponent operation circuit 210 may perform an exponent calculation operation on the first exponent bits E1<7:0> and the second exponent bits E2<7:0>. The exponent operation circuit 210 may generate and output maximum exponent bits E_MAX<7:0>, first shift bits SF1<7:0>, and second shift bits SF2<7:0> through the exponent calculation operation. The maximum exponent bits E_MAX<7:0> may include exponent bits having a larger value among the first exponent bits E1<7:0> and the second exponent bits E2<7:0>. The first shift bits SF1<7:0> may have a first shift value. The first shift value is a value corresponding to the number of bits by which the first mantissa bits M1<23:0> of the input data D_IN are to be shifted. The second shift bits SF2<7:0> may have a second shift value. The second shift value is a value corresponding to the number of bits by which the second mantissa bits M2<23:0> of the odd latch data D_OL are to be shifted. The first shift bits SF1<7:0> and the second shift bits SF2<7:0> output from the exponent operation circuit 210 may be transmitted to the mantissa operation circuit 220. The maximum exponent bits E_MAX<7:0> output from the exponent operation circuit 210 may be transmitted to the normalizer 230.

The mantissa operation circuit 220 may receive the first sign bit S1<0> and the first mantissa bits M1<23:0> of the input data D_IN. The mantissa operation circuit 220 may receive the second sign bit S2<0> and the second mantissa bits M2<23:0> of the odd latch data D_OL. In addition, the mantissa operation circuit 220 may receive the first shift bits SF1<7:0> and the second shift bits SF2<7:0> from the exponent operation circuit 210. The mantissa operation circuit 220 may perform a mantissa calculation operation on the first mantissa bits M1<23:0> and the second mantissa bits M2<23:0>. As a result of the mantissa calculation operation, a third sign bit S3<0> of the odd accumulation data D_OACC and first intermediate mantissa addition bits IMM1_ADD<23:0> are generated. The third sign bit S3<0> of the odd accumulation data D_OACC may be transmitted to the normalizer 230 and output through the output terminal of the accumulating circuit 120. The first intermediate mantissa addition bits IMM1_ADD<23:0> may be transmitted to the normalizer 230.

The normalizer 230 may receive the first intermediate mantissa addition bits IMM1_ADD<23:0> and the third sign bit S3<0> of the odd accumulation data D_OACC from the mantissa operation circuit 220. The normalizer 230 may receive the maximum exponent bits E_MAX<7:0> from the exponent operation circuit 210. The normalizer 230 may perform a normalization operation using the first intermediate mantissa addition bits IMM1_ADD<23:0>, the third sign bit S3<0>, and the maximum exponent bits E_MAX<7:0>. The normalizer 230 may generate and output 8-bit third exponent bits E3<7:0> and 23-bit third mantissa bits M3<22:0> of the odd accumulation data D_OACC according to the normalization operation. The third sign bit S3<0> output from the mantissa operation circuit 220 and the third exponent bits E3<7:0> and third mantissa bits M3<22:0> output from the normalizer 230 may constitute odd accumulation data D_OACC.

Figure 3:
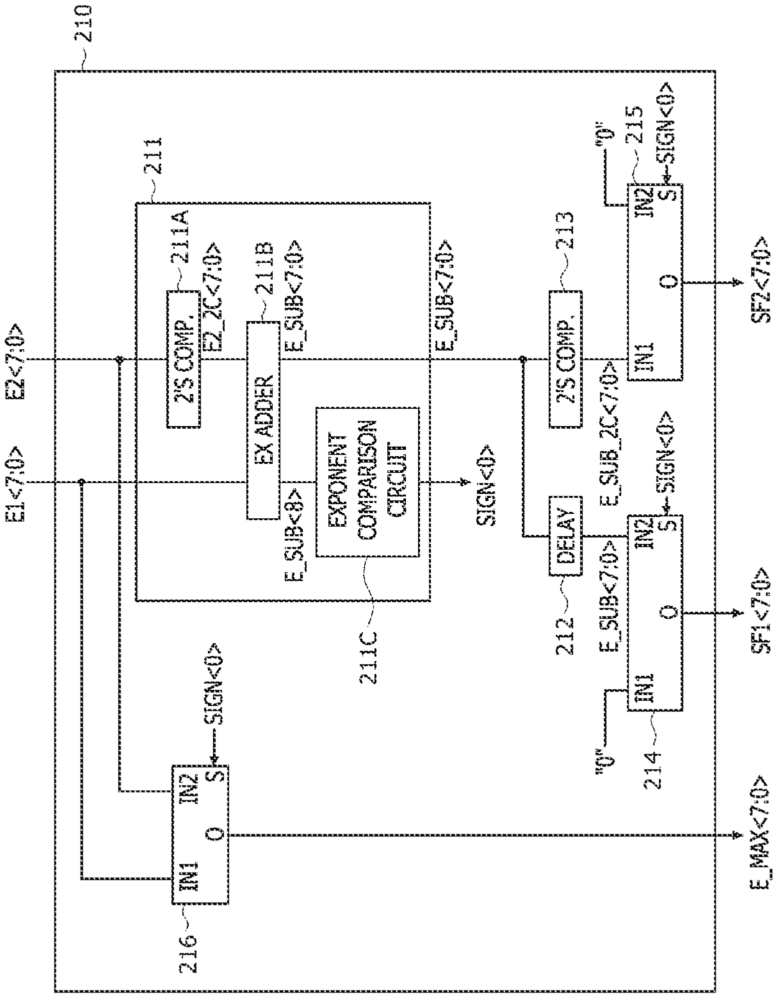
FIG. 3 is a diagram illustrating an example of a configuration of an exponent operation circuit of the accumulating circuit of FIG. 2.

FIG. 3 is a circuit diagram Illustrating an example of a configuration of the exponent operation circuit 210 of the accumulating circuit 120 of FIG. 2. Referring to FIG. 3, the exponent operation circuit 210 may include an exponent subtraction circuit 211, a delay circuit (DELAY) 212, a 2's complement circuit (2'S COMP.) 213, a first selector 214, a second selector 215, and a third selector 216. In an example, each of the first selector 214, the second selector 215, and the third selector 216 may include a 2:1 multiplexer. The exponent subtraction circuit 211 may include a 2's complement circuit 211A, an exponent adder (EX ADDER) 211B, and an exponent comparison circuit 211C. In this embodiment, the exponent adder 211B may include an adder that performs an integer addition operation.

The exponent subtraction circuit 211 may receive the first exponent bits E1<7:0> of the input data D_IN and the second exponent bits E2<7:0> of the odd latch data D_OL. The exponent subtraction circuit 211 may generate 2's complement bits of the second exponent bits E2<7:0> in order to perform a subtraction operation on the first exponent bits E1<7:0> and the second exponent bits E2<7:0>, that is, an operation of "E1<7:0>-E2<7:0>", In addition, the exponent subtraction circuit 211 may perform an addition operation on the first exponent bits E1<7:0> and the 2's complement bits of the second exponent bits E2<7:0>, More specifically, the first exponent bits E1<7:0> may be transmitted to a first input terminal of the exponent adder 211B. The second exponent bits E2<7:0> may be transmitted to the 2's complement circuit 211A. The 2's complement circuit 211A may perform an operation of generating the 2's complement of the second exponent bits E2<7:0> to output the 2's complement bits E2_2C<7:0> of the second exponent bits. The 2's complement bits E2_2C<7:0> of the second exponent bits may be transmitted to a second input terminal of the exponent adder 211B.

The exponent adder 211B may perform an addition operation on the first exponent bits E1<7:0> and the 2's complement bits E2_2C<7:0> of the second exponent bits to generate 9-bit exponent subtraction bits E_SUB<8:0>. The exponent adder 211B may separate the 9-bit exponent subtraction bits E_SUB<8:0> into a most significant bit (MSB) E_SUB<8> and remaining 8-bit exponent subtraction bits E_SUB<7:0>. The exponent adder 211B may transmit the most significant bit (MSB) E_SUB<8> to the exponent comparison circuit 211C. The exponent adder 211B may transmit the 8-bit exponent subtraction bits E_SUB<7:0> to the delay circuit 212 and the 2's complement circuit 213.

The exponent comparison circuit 211C may compare the magnitudes of the first exponent bits E1<7:0> and the second exponent bits E2<7:0> through the most significant bit (MSB) E_SUB<8> transmitted from the exponent adder 211B and generate and output a sign bit SIGN<0> according to a comparison result. Specifically, when the first exponent bits E1<7:0> have a greater value than the second exponent bits E2<7:0>, carry-over may occur as a result of the addition operation in the exponent adder 211B. In this case, the most significant bit (MSB) E_SUB<8> may have a value of "1". When the most significant bit (MSB) E_SUB<8> has a value of "1", the exponent comparison circuit 211C may output "0" indicating that the 8-bit exponent subtraction bits E_SUB<7:0> are positive numbers as the sign bit SIGN<0>. In this case, by shifting the second mantissa bits M2<23:0> by the number of bits corresponding to a difference between the absolute values of the two exponent bits, the absolute value of the second exponent bits E2<7:0> may become equal to the absolute value of the first exponent bits E1<7:0>. On the other hand, when the first exponent bits E1<7:0> have a smaller value than the second exponent bits E2<7:0>, carry-over might not occur as a result of the addition operation in the exponent adder 211B. In this case, the most significant bit (MSB) E_SUB<8> may have a value of "0". When the most significant bit (MSB) E_SUB<8> has a value of "0", the exponent comparison circuit 211C may output "1" indicating that the 8-bit exponent subtraction bits E_SUB<7:0> are negative numbers as the sign bit SIGN<0>. In this case, by shifting the first mantissa bits M1<23:0> by the number of bits corresponding to a difference between the absolute values of the two exponent bits, the absolute value of the first exponent bits E1<7:0> may become equal to the absolute value of the second exponent bits E2<7:0>. The sign bit SIGN<0> output from the exponent comparison circuit 211C may be transmitted a selection terminal S of the first selector 214, a selection terminal S of the second selector 215, and a selection terminal S of the third selector 216.

The delay circuit 212 may output the exponent subtraction bits E_SUB<7:0> transmitted from the exponent adder 211B of the exponent subtraction circuit 211 at a time point when a delay time elapses. In an example, the delay time may be set to a time required for 2's complement operation in the 2's complement circuit 213. The exponent subtraction bits E_SUB<7:0> output from the delay circuit 212 may be transmitted to a second input terminal IN2 of the first selector 214. The 2's complement circuit 213 may perform a 2's complement operation on the exponent subtraction bits E_SUB<7:0> transmitted from the exponent adder 211B to generate 2's complement bits E_SUB_2C<7:0> of the exponent subtraction bits. The 2's complement bits E_SUB_2C<7:0> of the exponent subtraction bits may have an absolute value corresponding to a difference between the value of the first exponent vits E1<7:0> and the value of the second exponent bits E2<7:0>. The 2's complement circuit 213 may transmit the 2's complement bits E_SUB_2C<7:0> of the exponent subtraction bits generated as a result of the 2's complement operation to a first input terminal IN1 of the second selector 215.

The first selector 214 may receive "0" through a first input terminal IN1. The first selector 214 may receive the exponent subtraction bits E_SUB<7:0> transmitted from the delay circuit 212 through a second input terminal IN2. The second selector 215 may receive the 2's complement bits E_SUB_2C<7:0> of the exponent subtraction bits output from the 2's complement circuit 213 through the first input terminal IN1. The second selector 215 may receive "0" through the second input terminal IN2. Each of the first selector 214 and the second selector 215 may output one of the two input data according to the sign bit SIGN<0> input through a selection terminal S. In this embodiment, the data output through an output terminal O of the first selector 214 will be referred to as "first shift bits SF1<7:0>". In addition, the data output through an output terminal O of the second selector 214 will be referred to as "second shift bits SF2<7:0>".

When the sign bit SIGN<0> is "0", that is, when the second mantissa bits M2<23:0> are to be shifted, each of the first selector 214 and the second selector 215 may output data input through the first input terminal IN1. Accordingly, the first selector 214 may output "0" as the first shift bits SF1<7:0> through the output terminal O. The second selector 215 may output the 2's complement bits E_SUB_2C<7:0> of the exponent subtraction bits as the second shift bits SF2<7:0>. When the sign bit SIGN<0> is "1", that is, when the first mantissa bits M1<23:0> are to be shifted, each of the first selector 214 and the second selector 215 may output data input through the second input terminal IN2. Accordingly, the first selector 214 may output the exponent subtraction bits E_SUB<7:0> as the first shift bits SF1<7:0> through the output terminal O. The second selector 215 may output "0" as the second shift bits SF2<7:0>, The first shift bits SF1<7:0> output from the first selector 214 and the second shift bits SF2<7:0> output from the second selector 215 may be transmitted to the mantissa operation circuit 220.

The third selector 216 may receive the first exponent bits E1<7:0> of the input data D_IN and the second exponent bits E2<7:0> of the odd latch data D_OL through a first input terminal IN1 and a second input terminal IN2, respectively. The third selector 216 may output exponent bits having a greater value among the first exponent bits E1<7:0> and the second exponent bits E2<7:0> according to the sign bit SIGN<0> input through a selection terminal S through an output terminal O. In this example, the exponent bits output from the third selector 216 will be referred to as "maximum exponent bits E_MAX<7:0>". When the sign bit SIGN<0> is "0" indicating a "positive number", the first exponent bits E1<7:0> may be greater than the second exponent bits E2<7:0>. In this case, the third selector 216 may output the first exponent bits E1<7:0> as the maximum exponent bits E_MAX<7:0>. On the other hand, when the sign bit SIGN<0> is "1" indicating a "negative number", the second exponent bits E2<7:0> may be greater than the first exponent bits E1<7:0>. In this case, the third selector 216 may output the second exponent bits E2<7:0> as the maximum exponent bits E_MAX<7:0>. The third selector 216 may transmit the maximum exponent bits E_MAX<7:0> to the normalizer 230.

Figure 4:
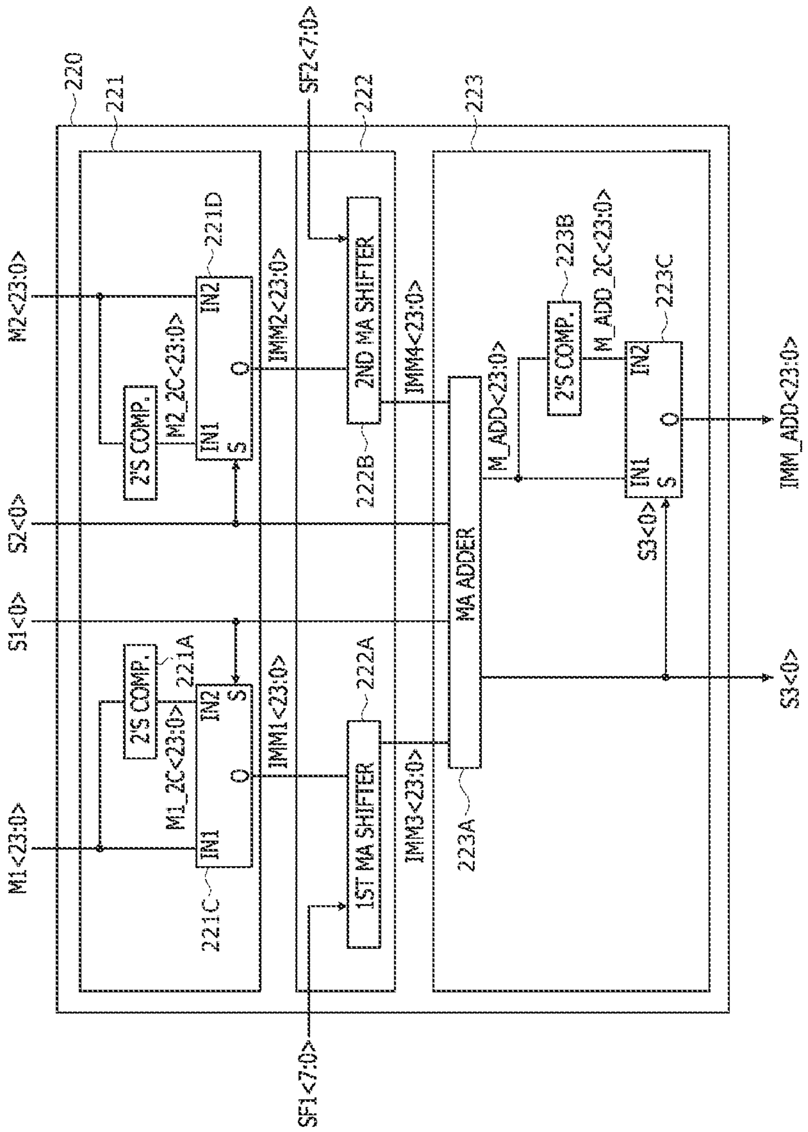
FIG. 4 is a diagram illustrating an example of a configuration of a mantissa operation circuit of the accumulating circuit of FIG. 2.

FIG. 4 is a circuit diagram Illustrating an example of a configuration of the mantissa operation circuit 220 of the accumulating circuit 120 of FIG. 2. Referring to FIG. 4, the mantissa operation circuit 220 may include a negative number processing circuit 221, a shift circuit 222, and a mantissa addition circuit 223. The negative number processing circuit 221 may include a first 2's complement circuit 221A, a second 2's complement circuit 221B, a first selector 221C, and a second selector 221D. The shift circuit 222 may include a first mantissa shifter 222A and a second mantissa shifter 222B. The mantissa addition circuit 223 may include a mantissa adder 223A, a third 2's complement circuit 223B, and a third selector 223C.

The first 2's complement circuit 221A of the negative number processing circuit 221 may receive the first mantissa bits M1<23:0> of the input data D_IN. The first 2's complement circuit 221A may perform a 2's complement operation on the first mantissa bits M1<23:0> to output 2's complement bits M1_2C<23:0> of the first mantissa bits. The first selector 221C may receive the first mantissa bits M1<23:0> of the input data D_IN through a first input terminal IN1. The first selector 221C may receive the 2's complement bits M1_2C<23:0> output from the first 2's complement circuit 221A through a second input terminal IN2. The first selector 221C may receive a first sign bit S1<0> of the input data D_IN through a selection terminal S. When the first sign bit S1<0> is "0" indicating a positive number, the first selector 221C may output the first mantissa bits M1<23:0> received through the first input terminal IN1. On the other hand, when the first sign bit S1<0> is "1" indicating a negative number, the first selector 221C may output the 2's complement bits M1_2C<23:0> received through the second input terminal IN2. In this embodiment, the output data from the first selectorselect output unit 221C will be referred to as "first intermediate mantissa bits IMM1<23:0>".

The second 2's complement circuit 221B of the negative number processing circuit 221 may receive the second mantissa bits M2<23:0> of the odd latch data D_OL. The second 2's complement circuit 221B may perform a 2's complement operation on the second mantissa bits M2<23:0> to output 2's complement bits M2_2C<23:0> of the second mantissa bits. The second selector 221D may receive the second mantissa bits M2<23:0> of the odd latch data D_OL through a first input terminal IN1. The second selector 221D may receive the 2's complement bits M2_2C<23:0> output from the second 2's complement circuit 221B through a second terminal IN2. The second selector 221D may receive a second sign bit S2<0> of the odd latch data D_OL through a selection terminal S. When the second sign bit S2<0> is "0" indicating a positive number, the second selector 221D may output the second mantissa bits M2<23:0> received through the first input terminal IN1. On the other hand, when the second sign bit S2<0> is "1" indicating a negative number, the second selector 221D may output the 2's complement bits M2_2C<23:0> received through the second input terminal IN2. In this embodiment, the output data from the second selector 221D will be referred to as "second intermediate mantissa bits IMM2<23:0>".

The first mantissa shifter 222A of the shift circuit 222 may receive the first intermediate mantissa bits IMM1<23:0> output from the first selector 221C of the negative number processing circuit 221. In addition, the first mantissa shifter 222A may receive the first shift bits SF1<7:0> output from the first selector 214 of FIG. 3 of the exponent operation circuit 210 of FIG. 3. The first mantissa shifter 222A may shift the first intermediate mantissa bits IMM1<23:0> by the number of bits corresponding to an absolute value of the first shift bits SF1<7:0> to output the shifted bits. Hereinafter, the data output from the first mantissa shifter 222A will be referred to as "third intermediate mantissa bits IMM3<23:0>. When the first shift bits SF1<7:0> is "0", the third intermediate mantissa bits IMM3<23:0> may be the same as the first intermediate mantissa bits IMM1<23:0>, On the other hand, when the first shift bits SF1<7:0> are the exponent subtraction bits E_SUB<7:0>, the third Intermediate mantissa bits IMM3<23:0> may be generated by shifting the first intermediate mantissa bits IMM1<23:0> by the number of bits corresponding to an absolute value of the exponent subtraction bits E_SUB<7:0>. The third intermediate mantissa bits IMM3<23:0> output from the first mantissa shifter 222A may be transmitted to the mantissa addition circuit 223.

The second mantissa shifter 222B of the shift circuit 222 may receive the second intermediate mantissa bits IMM2<23:0> output from the second selector 221D of the negative processing circuit 221. In addition, the second mantissa shifter 222B may receive the second shift bits SF2<7:0> output from the second selector 215 of FIG. 3 of the exponent operation circuit 210 of FIG. 3. The second mantissa shifter 222B may shift the second intermediate mantissa bits IMM2<23:0> by the number of bits corresponding to an absolute value of the second shift bits SF2<7:0>. Hereinafter, the data output from the second mantissa shifter 222B will be referred to as "fourth intermediate mantissa bits IMM4<23:0>". When the second shift bits SF2<7:0> are "0", the fourth intermediate mantissa bits IMM4<23:0> may be the same as the second intermediate mantissa bits IMM2<23:0>. On the other hand, when the second shift bits SF2<7:0> are 2's complement bits E_SUB_2C<7:0> for the exponent subtraction bits E_SUB<7:0>, the fourth intermediate mantissa bits IMM4<23:0> may be generated by shifting the second intermediate mantissa bits IMM2<23:0> by the number of bits corresponding to the absolute value of the 2's complement bits E_SUB_2C<7:0>. The fourth intermediate mantissa bits IMM4<23:0> output from the second mantissa shifter 222B may be transmitted to the mantissa addition circuit 223.

The mantissa adder 223A of the mantissa addition circuit 223 may receive the third intermediate mantissa bits IMM3<23:0> and the fourth intermediate mantissa bits IMM4<23:0> output from the first mantissa shifter 222A and the second mantissa shifter 222B, respectively. In addition, the mantissa adder 223A may receive the first sign bit S1<0> and the second sign bit S2<0>. The mantissa adder 223A may generate and output third sign bit S3<0>, In addition, the mantissa adder 223A may add the third intermediate mantissa bits IMM3<23:0> and the fourth intermediate mantissa bits IMM4<23:0> and output mantissa addition bits M_ADD<23:0> generated as resultant data. When both the first sign bit S1<0> and the second sign bit S2<0> are "0" indicating a positive number, the mantissa adder 223A may output "0" as the third sign bit S3<0>. When both the first sign bit S1<0> and the second sign bit S2<0> are "1" indicating a negative number, the mantissa adder 223A may output "1" as the third sign bit S3<0>. When one of the first sign bit S1<0> and the second sign bit S2<0> is "0" and the other is "1", the mantissa adder 223A may output "0" as the third sign bit S3<0> when carry occurs in the result of the addition operation on the third intermediate mantissa bits IMM3<23:0> and the fourth intermediate mantissa bits IMM4<23:0>, and output "1" as the third sign bit S3<0> when carry does not occur. The third sign bit S3<0> output from the mantissa adder 223A may constitute a sign bit of the odd accumulation data D_OACC output from the accumulating circuit 120 of FIG. 2. The third sign bit S3<0> output from the mantissa adder 223A may be transmitted to a selection terminal S of the third selector 223C. The mantissa addition bits M_ADD<23:0> output from the mantissa adder 223A may be transmitted to the third 2's complement circuit 223B and the third selector 223C.

The third 2's complement circuit 223B of the mantissa adder 223 may receive the mantissa addition bits M_ADD<23:0> output from the mantissa adder 223A. The third 2's complement circuit 223B may perform a 2's complement operation on the mantissa addition bits M_ADD<23:0> to output 2's complement bits M_ADD_2C<23:0> for the mantissa addition bits. The third selector 223C may receive the mantissa addition bits M_ADD<23:0> transmitted from the mantissa adder 223A and the 2's complement bits M_ADD_2C<23:0> transmitted from the third 2's complement circuit 223B through a first input terminal IN1 and a second input terminal IN2, respectively. The third selector 223C may receive the third sign bit S3<0> transmitted from the mantissa adder 223A through a selection terminal S. When the third sign bit S3<0> is "0" indicating a positive number, the third selector 223C may output the mantissa addition bits M_ADD<23:0> through an output terminal O. When the third sign bit S3<0> is "1" indicating a negative number, the third selector 223C may output the 2's complement bits M_ADD_2C<23:0> through the output terminal O. Hereinafter, the data output from the third selector 223C will be referred to as "intermediate mantissa addition bits IMM_ADD<23:0>".

Figure 5:
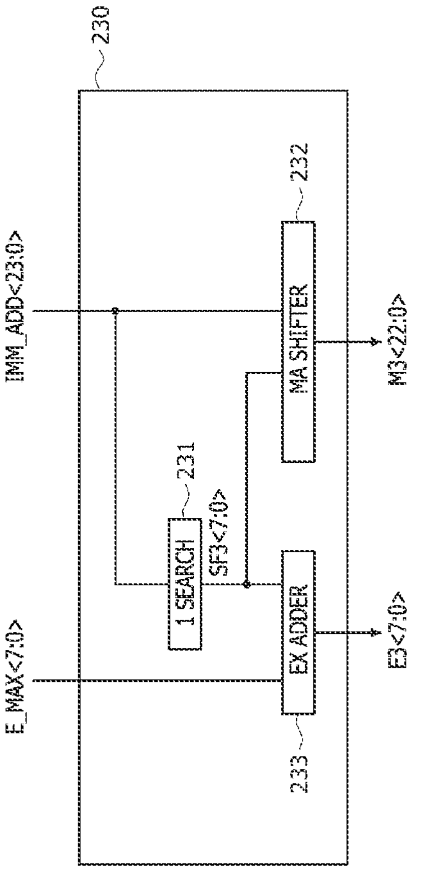
FIG. 5 is a diagram illustrating an example of a configuration of a normalizer of the accumulating circuit of FIG. 2.

FIG. 5 is a circuit diagram illustrating an example of a configuration of the normalizer 230 of the accumulating circuit 120 of FIG. 2. Referring to FIG. 5, the normalizer 230 may include a "1" search circuit (1 SEARCH) 231, a mantissa shifter (MA SHIFTER) 232, and an exponent adder (EX ADDER) 233. The "1" search circuit 231 of the normalizer 230 may receive the intermediate mantissa addition bits IMM_ADD<23:0> from the third selector 223C of FIG. 4 of the mantissa addition circuit 223 of FIG. 4. The "1" search circuit 231 may search where the bit having "1" is located from the beginning of the middle mantissa addition bits IMM_ADD<23:0> and generate the third shift bits SF3<7:0> according to the result. The third shift bits SF3<7:0> may have a value corresponding to the number of bits for shifting the intermediate mantissa addition bits IMM_ADD<23:0> so that the intermediate mantissa addition bits IMM_ADD<23:0> have a standard form of "1.mantissa". In an example, the number of bits of the third shift bits SF3<7:0> may be set arbitrarily, but in this example, it is presupposed that the number of bits of the third shift bits SF3<7:0> are set to 8 bits. The third shift bits SF3<7:0> output from the "1" search circuit 231 may be transmitted to the mantissa shifter 232 and the exponent adder 233.

The mantissa shifter 232 of the normalizer 230 may perform a shift operation on the intermediate mantissa addition bits IMM_ADD<23:0> so that the intermediate mantissa addition bits IMM_ADD<23:0> are in the standard form of "1.mantissa", The mantissa shifter 232 may receive the third shift bits SF3<7:0> output from the "1" search circuit 231 and the intermediate mantissa addition bits IMM_ADD<23:0> output from the third selector 223C of FIG. 4 of the mantissa addition circuit 223 of FIG. 4. The mantissa shifter 232 may shift the intermediate mantissa addition bits IMM_ADD<23:0> by the number of bits corresponding to a value of the third shift bits SF3<7:0> to generate the third mantissa bits M3<22:0> of the odd accumulation data D_OACC output from the accumulating circuit 120. Although not shown, a rounding process may be performed during the shift operation in the mantissa shifter 232.

The exponent adder 233 of the normalizer 230 may compensate for the change in the maximum exponent bits E_MAX<7:0> as the intermediate mantissa bits IMM_ADD<23:0> are shifted by the number of bits corresponding to the value of the third shift bits SF3<7:0>. The exponent adder 233 may receive the maximum exponent bits E_MAX<7:0> output from the third selector 216 of FIG. 3 of the exponent operation circuit 210 of FIG. 3 and the third shift bits SF3<7:0> output from the "1" search circuit 231. The exponent adder 233 may perform an addition operation on the maximum exponent bits E_MAX<7:0> and the third shift bits SF3<7:0> to generate the third exponent bits E3<7:0> of the odd accumulation data D_OACC output from the accumulating circuit 120.

Figure 6:
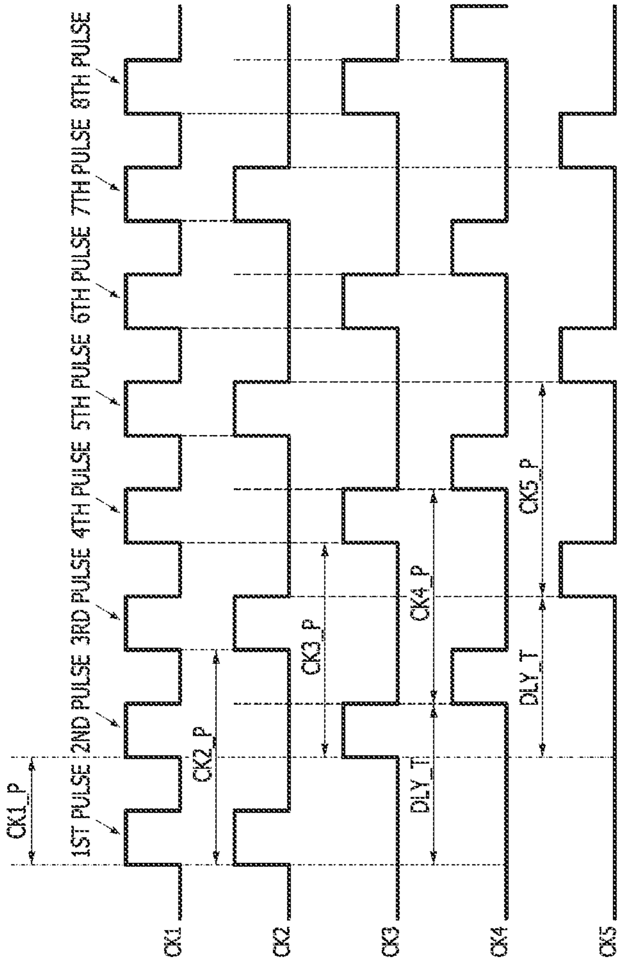
FIG. 6 is a diagram illustrating first to fifth clock signals provided to the accumulator of FIG. 1.

FIG. 6 is a timing diagram illustrating first to fifth clock signals CK1-CK5 provided to the accumulator 100 of FIG. 1. Referring to FIG. 6, the first clock signal CK1 may have a first clock period CK1_P. That is, when the first clock period CK_P elapses from a point in time when a rising edge of a first pulse of the first clock signal CK1 is generated, a rising edge of a second pulse is generated. The second clock signal CK2 may include the same pulses as odd pulses of the first clock signal CK1. Accordingly, the second clock signal CK2 may have a second clock period CK2_P that is twice the first clock period CK1_Px2. The third clock signal CK3 may include the same pulses as even pulses of the first clock signal CK1. Accordingly, the third clock signal CK3 may have a third clock period CK3_P that is twice the first clock period CK1_Px2.

The fourth clock signal CK4 and the fifth clock signal CK5 may include pulses that are delayed by a delay time DLY_T from the second clock signal CK2 and the third clock signal CK3, respectively. The delay time DLY_T may correspond to the time required for an exponent operation, a mantissa operation, and a normalization operation in the accumulating circuit 120. In an example, a rising edge of each of the pulses constituting the fourth clock signal CK4 may be synchronized with a falling edge of each of the pulses constituting the third clock signal CK3. A rising edge of each of the pulses constituting the fifth clock signal CK5 may be synchronized with a falling edge of each of the remaining pulses except for the first pulse among the pulses constituting the second clock signal CK2. The fourth clock signal CK4 and the fifth clock signal CK5 may have a fourth clock period CK4_P and a fifth clock period CK5_P that are twice the first clock period CK1_Px2, respectively.

Figure 7:
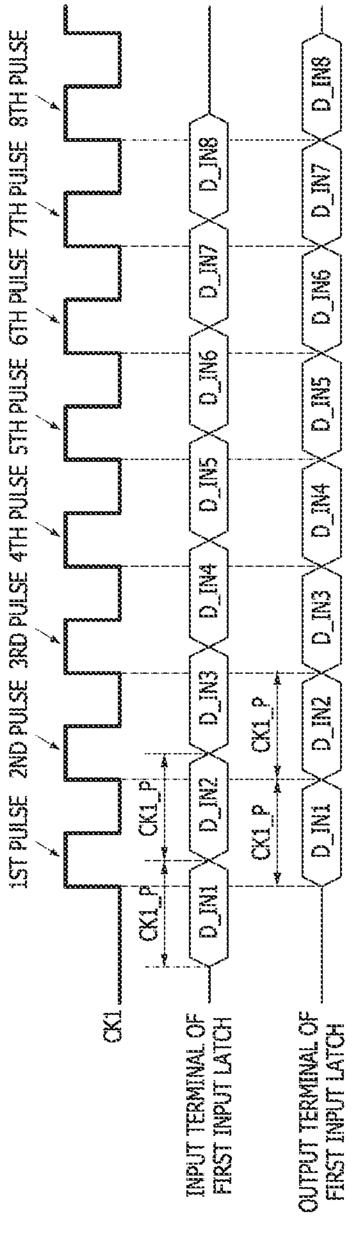
FIG. 7 is a diagram illustrating timing at which input data are input to and output from a first input latch of an input latch circuit in the accumulator of FIG. 1.

FIG. 7 is a timing diagram illustrating timing at which input data D_IN1-D_IN8 are input to and output from the first input latch 111 of the input latch circuit 110 in the accumulator 100 of FIG. 1. In this example, it is presupposed that eight input data D_IN1-D_IN8 are sequentially input to the first Input latch 111 at an interval of a first clock period CK1_P. Referring to FIG. 7, the first input data D_IN1 may start to be transmitted to an input terminal of the first input latch 111 before a rising edge of a first pulse of the first clock signal CK1 occurs. During the first pulse of the first clock signal CK1 while maintaining the "high" level, the transmission of the first input data D_IN1 to the first input latch 111 may be completed. When the transmission of the first input data D_IN1 is completed (that is, when the first clock period CK1_P has elapsed), the second input data D_IN2 may start to be transmitted to the input terminal of the first input latch 111. That is, the second input data D_IN2 may start to be transmitted to the input terminal of the first input latch 111 before a rising edge of a second pulse of the first clock signal CK1 occurs. During the second pulse of the first clock signal CK1 while maintaining the "high" level, the transmission of the second input data D_IN2 to the first input latch 111 may be completed. When the transmission of the second input data D_IN2 is completed, the third input data D_IN3 may start to be transmitted to the input terminal of the first input latch 111. That is, the third input data D_IN3 may start to be transmitted to the input terminal of the first input latch 111 before a rising edge of a third pulse of the first clock signal CK1 occurs. During the third pulse of the first clock signal CK1 while maintaining the "high" level, the transmission of the third input data D_IN3 to the first input latch 111 may be completed. When the transmission of the third input data D_IN3 is completed, the fourth input data D_IN4 may start to be transmitted to the input terminal of the first input latch 111. That is, the fourth input data D_IN4 may start to be transmitted to the input terminal of the first input latch 111 before a rising edge of a fourth pulse of the first clock signal CK1 occurs. During the fourth pulse of the first clock signal CK1 while maintaining the “high” level, the transmission of the fourth input data D_IN4 to the first input latch 111 may be completed.

When the transmission of the fourth input data D_IN4 is completed, the fifth input data D_IN5 may start to be transmitted to the input terminal of the first input latch 111. That is, the fifth input data D_IN5 may start to be transmitted to the input terminal of the first input latch 111 before a rising edge of a fifth pulse of the first clock signal CK1 occurs. During the fifth pulse of the first clock signal CK1 while maintaining the “high” level, the transmission of the fifth input data D_IN5 to the first input latch 111 may be completed. When the transmission of the fifth input data D_IN5 is completed, the sixth input data D_IN6 may start to be transmitted to the input terminal of the first input latch 111. That is, the sixth input data D_IN6 may start to be transmitted to the input terminal of the first input latch 111 before a rising edge of a sixth pulse of the first clock signal CK1 occurs. During the sixth pulse of the first clock signal CK1 while maintaining the “high” level, the transmission of the sixth input data D_IN6 to the first input latch 111 may be completed. When the transmission of the sixth input data D_IN6 is completed, the seventh input data D_IN7 may start to be transmitted to the input terminal of the first input latch 111. That is, the seventh input data D_IN7 may start to be transmitted to the input terminal of the first input latch 111 before a rising edge of a seventh pulse of the first clock signal CK1 occurs. During the seventh pulse while maintaining the “high” level, the transmission of the seventh input data D_IN7 to the first input latch 111 may be completed. Finally, when the transmission of the seventh input data D_IN7 is completed, the eighth input data D_IN8 may start to be transmitted to the input terminal of the first input latch 111. That is, the eighth input data D_IN8 may start to be transmitted to the input terminal of the first input latch 111 before a rising edge of an eighth pulse of the first clock signal CK1 occurs. During the eighth pulse of the first clock signal CK1 while maintaining the “high” level, the transmission of the eighth input data D_IN8 of the first clock signal CK1 may be completed.

The first input latch 111 may sequentially latch the first input data to the eighth input data D_IN1-D_IN8 transmitted from outside the accumulator 100. The first input latch 111 may start to output the first input data D_IN1 through an output terminal in synchronization with the rising edge of the first pulse of the first clock signal CK1. When the first input data D_IN1 is output, the first input latch 111 may start to output the second input data D_IN2 through the output terminal in synchronization with the rising edge of the second pulse of the first clock signal CK1. When the second input data D_IN2 is output, the first input latch 111 may start to output the third input data D_IN3 through the output terminal in synchronization with the rising edge of the third pulse of the first clock signal CK1. When the third input data D_IN3 is output, the first input latch 111 may start to output the fourth input data D_IN4 through the output terminal in synchronization with the rising edge of the fourth pulse of the first clock signal CK1. When the fourth input data D_IN4 is output, the first input latch 111 may start to output the fifth input data D_IN5 through the output terminal in synchronization with the rising edge of the fifth pulse of the first clock signal CK1. When the fifth input data D_IN5 is output, the first input latch 111 may start to output the sixth input data D_IN6 through the output terminal in synchronization with the rising edge of the sixth pulse of the first clock signal CK1. When the sixth input data D_IN6 is output, the first input latch 111 may start to output the seventh input data D_IN7 through the output terminal in synchronization with the rising edge of the seventh pulse of the first clock signal CK1. When the seventh input data D_IN6 is output, the first input latch 111 may start to output the eighth input data D_IN8 through the output terminal in synchronization with the rising edge of the eighth pulse of the first clock signal CK1.

As described with reference to FIG. 7, the odd-numbered input data D_IN1, D_IN3, D_IN5, and D_IN7 among the input data D_IN1-D_IN8 may start to be output from the first input latch 111 in synchronization with the rising edge of each of the odd-numbered pulses of the first clock signal CK1. On the other hand, the even-numbered input data D_IN2, D_IN4, D_IN6, and D_IN8 among the input data D_IN1-D_IN8 may start to be output from the first input latch 111 in synchronization with the rising edge of each of the even-numbered pulses of the first clock signal CK1. As described with reference to FIG. 6, as the second clock signal CK2 includes pulses having the same timing as the odd-numbered pulses of the first clock signal CK1, the points in time when the odd-numbered input data D_IN1, D_IN3, D_IN5, and D_IN7 of the input data D_IN1-D_IN8 are output from the first input latch 111 may be synchronized with the points in time when the rising edges of the pulses of the second clock signal CK2 are generated. This means that the points in time when the odd-numbered input data D_IN1, D_IN3, D_IN5, and D_IN7 are output from the first input latch 111 and the points in time when the odd latch data are output from the second input latch 112 may be substantially the same. In addition, as the third clock signal CK3 includes pulses having the same timing as the even-numbered pulses of the first clock signal CK1, the points in time when the even-numbered input data D_IN2, D_IN4, D_IN6, and D_IN8 of the input data D_IN1-D_IN8 are output from the first input latch 111 may be synchronized with the points in time when the rising edges of the pulses of the third clock signal CK3 are generated. This means that the point in time when each of the even-numbered input data D_IN2, D_IN4, D_IN6, and D_IN8 is output from the first input latch 111 and the point in time when each of the even latch data is output from the third input latch 113 are substantially the same.

Figure 8:
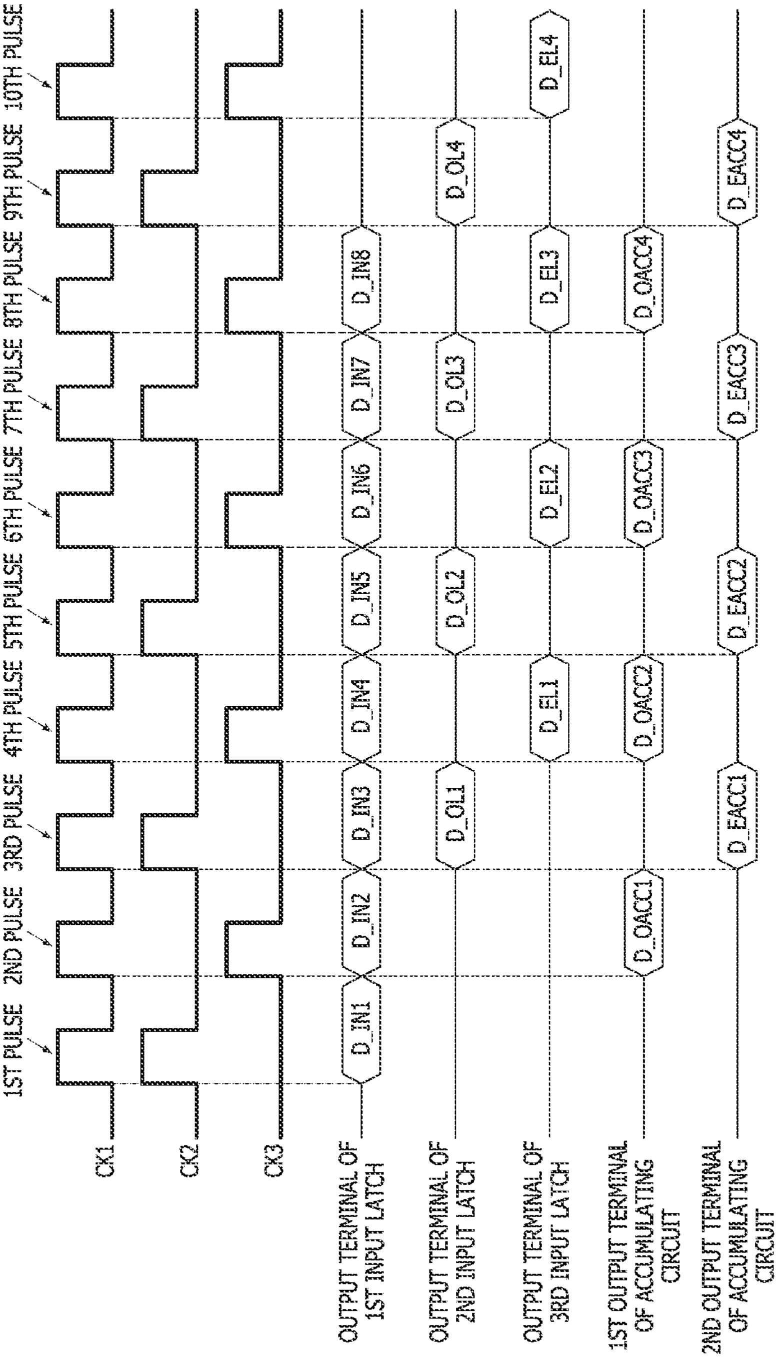
FIG. 8 is a diagram illustrating data output timing of the first input latch, a second input latch, a third input latch, and the accumulating circuit of the input latch circuit in the accumulator of FIG. 1.
Figure 9:
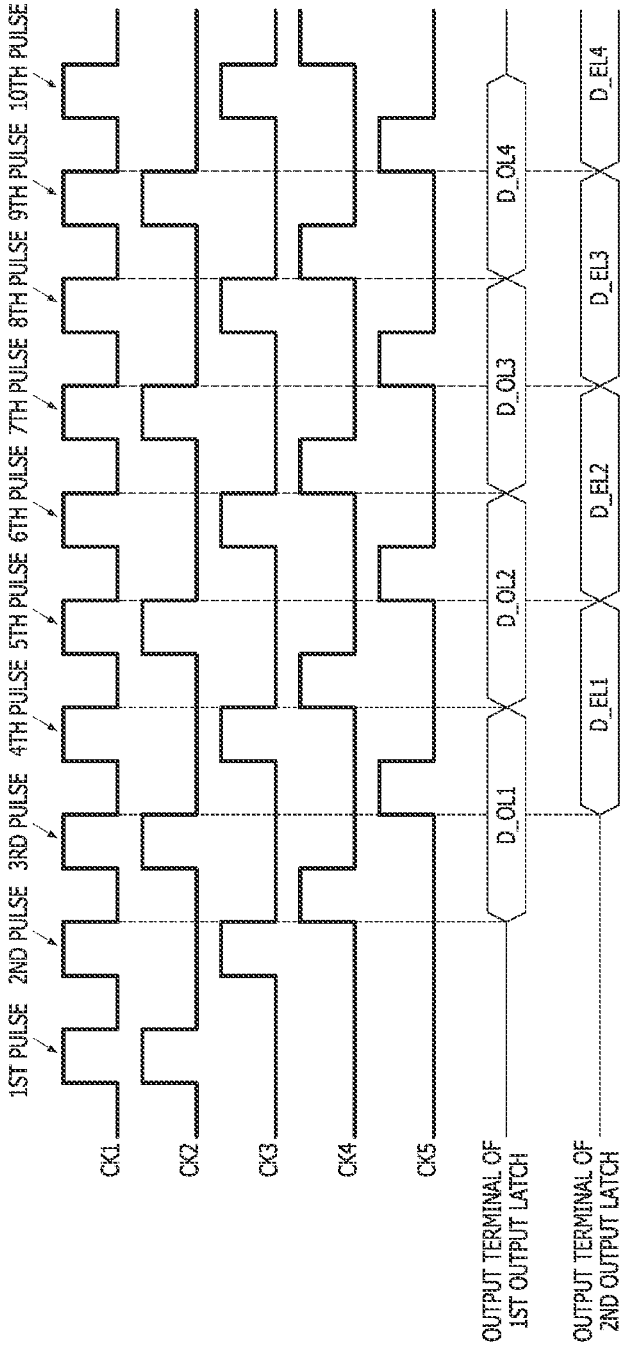
FIG. 9 is a diagram illustrating data output timing from a first output latch and a second output latch of an output latch circuit in the accumulator of FIG. 1.

FIG. 8 is a timing diagram illustrating data output timing from the first input latch 111, the second input latch 112, the third input latch 113, and the accumulating circuit 120 of the input latch circuit 110 in the accumulator 100 of FIG. 1, FIG. 9 is a timing diagram illustrating data output timing from the first output latch 131 and the second output latch 132 of the output latch circuit 130 in the accumulator 100 of FIG. 1. FIGS. 10 to 26 are diagrams illustrating operation processes of the accumulator 100 corresponding to the timing diagrams of FIGS. 8 and 9. In this example, it is presupposed that the configuration of the first to third clock signals CK1 to CK3 is the same as described with reference to FIG. 6. In this example, it is presupposed that an accumulation operation is performed on the first to eighth input data D_IN1-D_IN8. In addition, in this embodiment, it is presupposed that the input timing and output timing of the first to eighth input data D_IN1-D_IN8 to the first input latch 111 are the same as those described with reference to FIG. 7.

Figure 10:
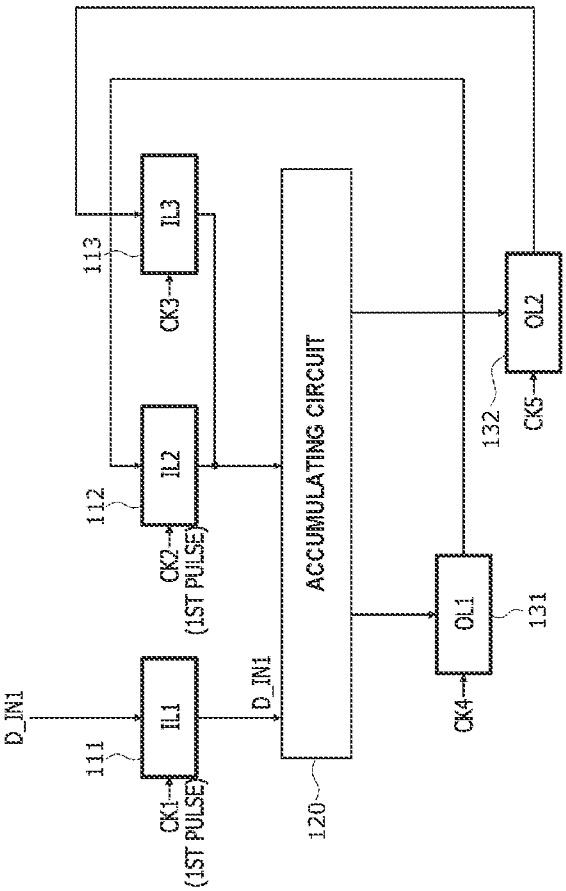
FIGS. 10 to 26 are diagrams illustrating the operation processes of the accumulator corresponding to the timing diagrams of FIGS. 8 and 9.

Referring to FIG. 10 along with FIGS. 8 and 9, at a point in time when the first pulse of the first clock signal CK1 may start to be transmitted to the first input latch 111 (hereinafter, referred to as "first time point"), the first input latch 111 starts to output the latched first input data D_IN1 through an output terminal. That is, at the first time point, the first input data D_IN1 may start to be input to the first input terminal of the accumulating circuit 120. At the first time point, the first pulse of the second clock signal CK2 may also be transmitted to the second input latch 112, but because there is no latch data latched in the second input latch 112, the latch data might not be transmitted from the second input latch 112 to the accumulating circuit 120. Because the first time point is before the first pulse of the third clock signal CK3 is transmitted to the third input latch 113, the latch data might not be output from the third input latch 113 regardless of the presence of the latch data. At the first time point, the accumulating circuit 120 may start to perform a first accumulation operation on the first input data D_IN1 to generate first odd accumulation data D_OACC1.

Figure 11:
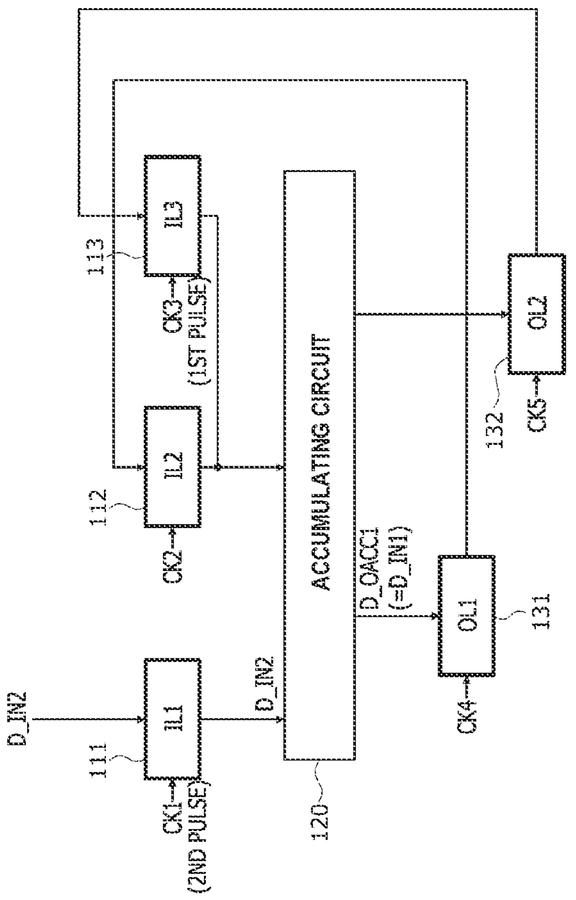

Referring to FIG. 11 along with FIGS. 8 and 9, at a point in time when the second pulse of the first clock signal CK1 starts to be transmitted to the first input latch 111 (hereinafter, referred to as "second time point"), the first input latch 111 may start to output the latched second input data D_IN2 through the output terminal. That is, at the second time point, the second input data D_IN2 may start to be input to the first input terminal of the accumulating circuit 120. Since the second time point is before the second pulse of the second clock signal CK2 is transmitted to the second input latch 112, the latch data might not be output from the second input latch 112 regardless of the presence of the latch data. At the second time point, the first pulse of the third clock signal CK3 may also be transmitted to the third input latch 113, but since there is no latch data latched in the third input latch 113, the latch data might not be transmitted from the third input latch 113 to the accumulating circuit 120. At the second time point, the accumulating circuit 120 may start to output the first odd accumulation data D_OACC1 that is the same as the first input data D_IN1 as a first operation result through the first output terminal. The first accumulation odd data D_OACC1 may be transmitted to the first output latch 131. In addition, at the second time point, the accumulating circuit 120 may start to perform a second accumulation operation on the second input data D_IN2 to generate first even accumulation data D_EACC1.

Figure 12:
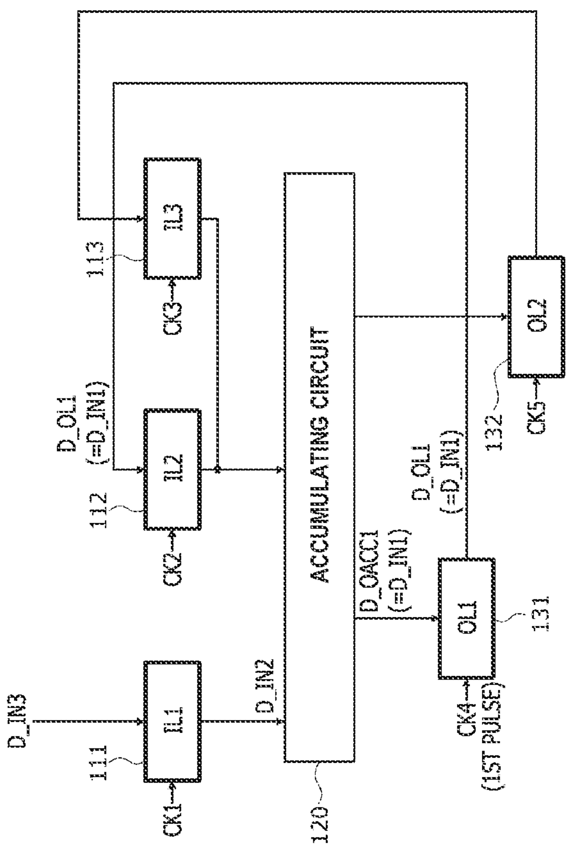

Referring to FIG. 12 along with FIGS. 8 and 9, the first output latch 131 may latch the first odd accumulation data D_OACC1 transmitted through the first output terminal of the accumulating circuit 120. At a point in time when the first pulse of the fourth clock signal CK4 starts to be transmitted to the first output latch 131 (hereinafter, referred to as "third time point"), the first output latch 131 may start to output the first odd accumulation data D_OACC1 as first odd latch data D_OL1. The first odd latch data D_OL1 output from the first output latch 131 may be transmitted to the second input latch 112. Because the first odd latch data D_OL1 is the first odd accumulation data D_OACC1, as a result, the first odd latch data D_OL1 may be the same as the first input data D_IN1. As described with reference to FIG. 7, at the third time point, the first input latch 111 may receive the third input data D_IN3 through the input terminal.

Figure 13:
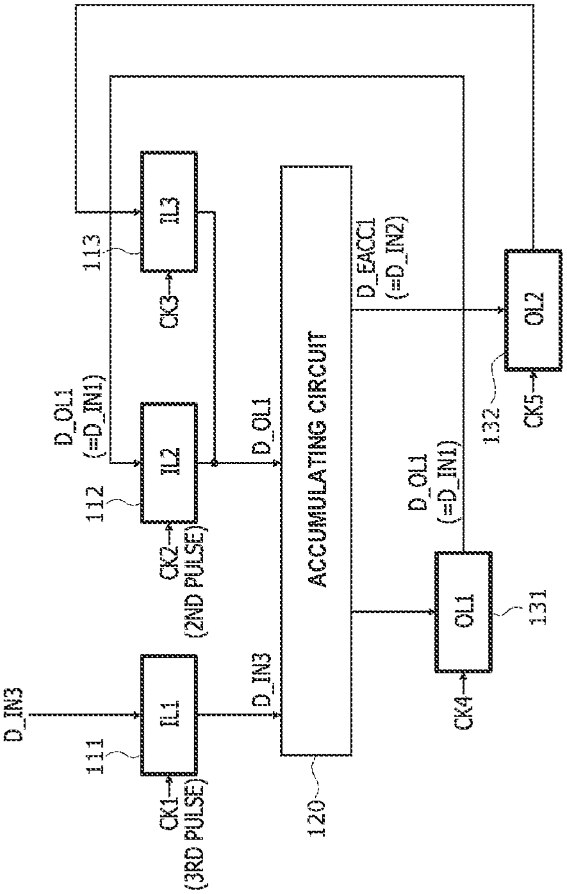

Referring to FIG. 13 along with FIGS. 8 and 9, at a point in time when the third pulse of the first clock signal CK1 starts to be transmitted to the first input latch 111 (hereinafter, referred to as "fourth time point"), the first input latch 111 may start to output the latched third input data D_IN3 through the output terminal. Because the second pulse is also transmitted to the second input latch 112 at the fourth time point, the second input latch 112 may start to output the first odd latch data D_OL1 through the output terminal. That is, at the fourth time point, the accumulating circuit 120 may start to receive the third input data D_IN3 and the first odd latch data D_OL1 through the first input terminal and the second input terminal, respectively. At the fourth time point, the accumulating circuit 120 may start to perform a third accumulation operation on the third input data D_IN3 and the first odd latch data D_OL1 to generate second odd accumulation data D_OACC2. In addition, at the fourth time point, the accumulating circuit 120 may start to output first even accumulation data D_EACC1 that is the same as the second input data D_IN2 as a result of the second operation through the second output terminal. The first even accumulation data D_EACC1 may be transmitted to the second output latch 132.

Figure 14:
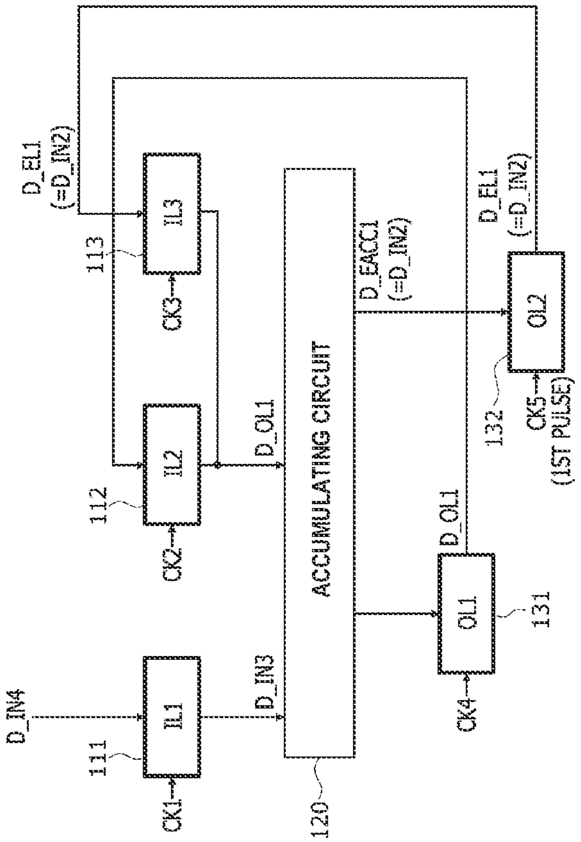

Referring to FIG. 14 along with FIGS. 8 and 9, the second output latch 132 may latch the first even accumulation data D_EACC1 transmitted through the second output terminal of the accumulating circuit 120. At a point in time when a first pulse of the fifth clock signal CK5 starts to be transmitted to the second output latch 132 (hereinafter, referred to as "fifth time point"), the second output latch 132 may start to output the first even accumulation data D_EACC1 as first even latch data D_EL1. The first even latch data D_EL1 output from the second output latch 132 may be transmitted to the third input latch 113. Because the first even latch data D_EL1 is the first even accumulation data D_EACC1, as a result, the first even latch data D_EL1 may be the same as the second input data D_IN2. Since it is before the second pulse of the fourth clock signal CK4 is generated, the output operation of the first odd latch data D_OL1 of the first output latch 131 may be maintained at the fifth time point. As described with reference to FIG. 7, at the fifth time point, the first input latch 111 may receive the fourth input data D_IN4 through the input terminal.

Figure 15:
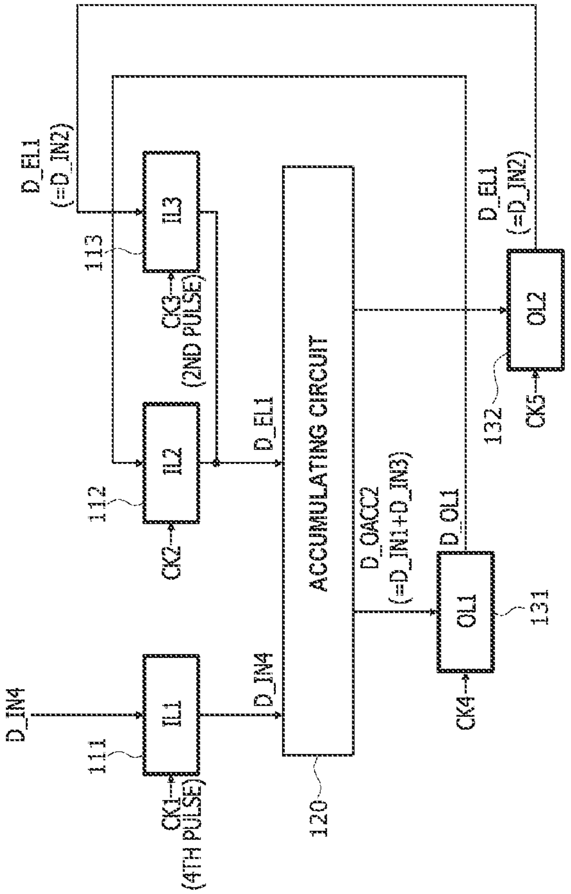

Referring to FIG. 15 along with FIGS. 8 and 9, at a point in time when the fourth pulse of the first clock signal CK1 starts to be transmitted to the first input latch 111 (hereinafter, referred to as "sixth time point"), the first input latch 111 may start to output the latched fourth input data D_IN4 through the output terminal. The second pulse of the third clock signal CK3 may also be transmitted to the third input latch 113 at the sixth time point, so that the third input latch 113 may start to output first even latch data D_EL1 through the output terminal. That is, at the sixth time point, the accumulating circuit 120 may start to receive the fourth input data D_IN4 and the first even latch data D_EL1 through the first input terminal and the second input terminal, respectively. At the sixth time point, the accumulating circuit 120 may start to perform a fourth accumulation operation on the fourth input data D_IN4 and the first even latch data D_EL1 to generate second even accumulation data D_EACC2. In addition, at the sixth time point, the accumulating circuit 120 may start to output second odd accumulation data D_OACC2 in which the first input data D_IN1 and the third input data D_IN3 are added as a third operation result through the first output terminal. The second odd accumulation data D_OACC2 may be transmitted to the first output latch 131.

Figure 16:
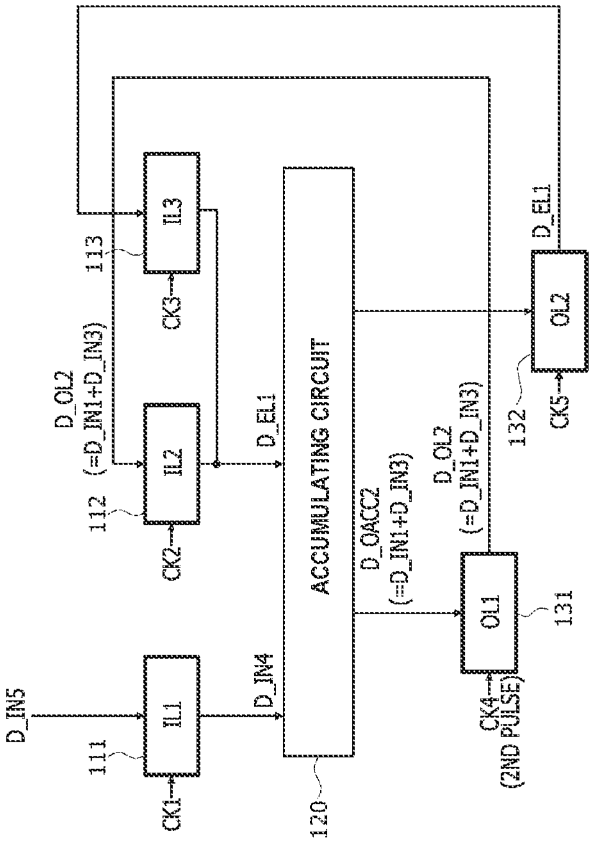

Referring to FIG. 16 along with FIGS. 8 and 9, the first output latch 131 may latch the second odd accumulation data D_OACC2 transmitted through the first output terminal of the accumulating circuit 120. The first output latch 131 may start to output the second odd accumulation data D_OACC2 as second odd latch data D_OL2 at a point in time when a second pulse of the fourth clock signal CK4 starts to be transmitted to the first output latch 131 (hereinafter, referred to as "seventh time point"). The second odd latch data D_OL2 output from the first output latch 131 may be transmitted to the second input latch 112. The second odd latch data D_OL2 is the second odd accumulation data D_OACC2, accordingly, the second odd latch data D_OL2 may become data obtained by adding the first input data D_IN1 and the third input data D_IN3. Since it is before the second pulse of the fifth clock signal CK5 is generated, the output operation for the first even latch data D_EL1 of the second output latch 132 may be maintained at the seventh time point. As described with reference to FIG. 7, at the seventh time point, the first input latch 111 may receive the fifth input data D_IN5 through the input terminal.

Figure 17:
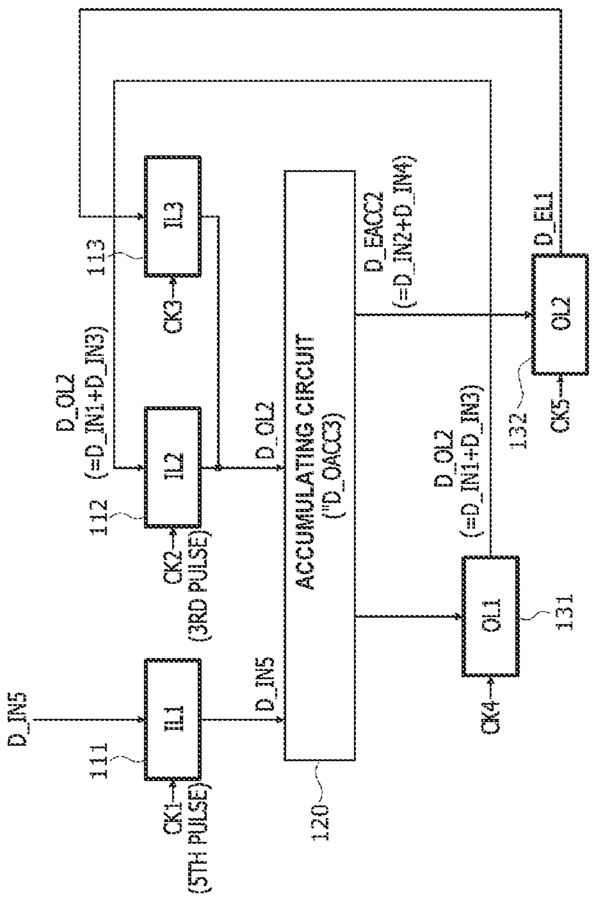

Referring to FIG. 17 along with FIGS. 8 and 9, at a point in time when a fifth pulse of the first clock signal CK1 starts to be transmitted to the first input latch 111 (hereinafter, referred to as "eighth time point"), the first input latch 111 may start to output the latched fifth input data D_IN5 through the output terminal. Since the third pulse of the second clock signal CK2 is also transmitted to the second input latch 112 at the eighth time point, the second input latch 112 may start to output the second odd latch data D_OL2 through the output terminal. That is, at the eighth time point, the accumulating circuit 120 may start to receive the fifth input data D_IN5 and the second odd latch data D_OL2 through the first input terminal and the second input terminal, respectively. At the eighth time point, the accumulating circuit 120 may start to perform a fifth accumulation operation on the fifth input data D_IN5 and the second odd latch data D_OL2 to generate third odd accumulation data D_OACC3. In addition, at the eighth time point, the accumulating circuit 120 may start to output second even accumulation data D_EACC2 in which the second input data D_IN2 and the fourth input data D_IN4 are added as the fourth operation result through the second output terminal. The second even accumulation data D_EACC2 may be transmitted to the second output latch 132.

Figure 18:
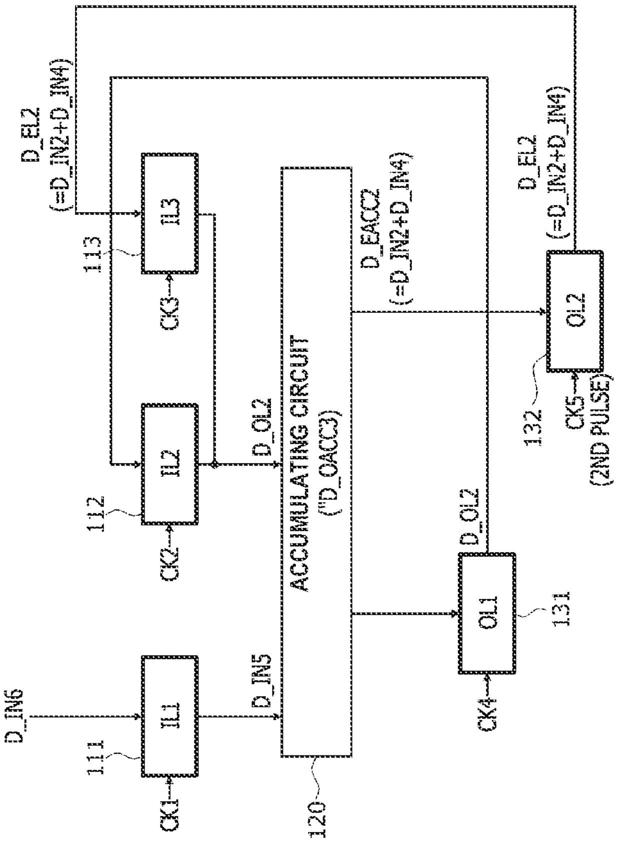

Referring to FIG. 18 along with FIGS. 8 and 9, the second output latch 132 may latch the second even accumulation data D_EACC2 transmitted through the second output terminal of the accumulating circuit 120. At a point in time when a second pulse of the fifth clock signal CK5 starts to be transmitted to the second output latch 132 (hereinafter, referred to as "ninth time point"), the second output latch 132 may start to output the second even accumulation data D_EACC2 as second even latch data D_EL2. The second even latch data D_EL2 output from the second output latch 132 may be transmitted to the third input latch 113. Since the second even latch data D_EL2 is the second even accumulation data D_EACC2, the second even latch data D_EL2 may become data obtained by adding the second input data D_IN2 and the fourth input data D_IN4. Since it is before the third pulse of the fourth clock signal CK4 is generated, the output operation for the second odd latch data D_OL2 of the first output latch 131 may be maintained at the ninth time point. As described with reference to FIG. 7, at the ninth time point, the first input latch 111 receives the sixth input data D_IN6 through the input terminal.

Figure 19:
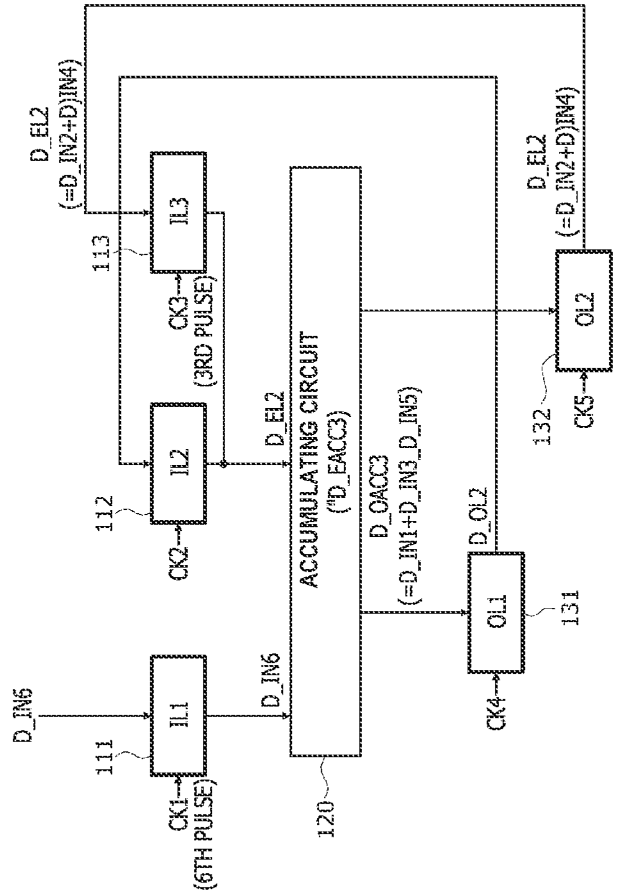

Referring to FIG. 19 along with FIGS. 8 and 9, at a point in time when a sixth pulse of the first clock signal CK1 starts to be transmitted to the first input latch 111 (hereinafter, referred to as "tenth time point"), the first input latch 111 may start to output the latched sixth input data D_IN6 through the output terminal. Since a third pulse of the third clock signal CK3 is also transmitted to the third input latch 113 at the tenth time point, the third Input latch 113 may start to output the second even latch data D_EL2 through the output terminal. That is, at the tenth time point, the accumulating circuit 120 may start to receive the sixth input data D_IN6 and the second even latch data D_EL2 through the first input terminal and the second input terminal, respectively. At the tenth time point, the accumulating circuit 120 may start to perform a sixth accumulation operation on the sixth input data D_IN6 and the second even latch data D_EL2 to generate the third even accumulation data D_EACC3. In addition, at the tenth time point, the accumulating circuit 120 may start to output the third odd accumulation data D_OACC3 in which the first input data D_IN1, the third input data D_IN3, and the fifth input data D_IN5 are added as the fifth operation result through the first output terminal. The third odd accumulation data D_OACC3 may be transmitted to the first output latch 131.

Figure 20:
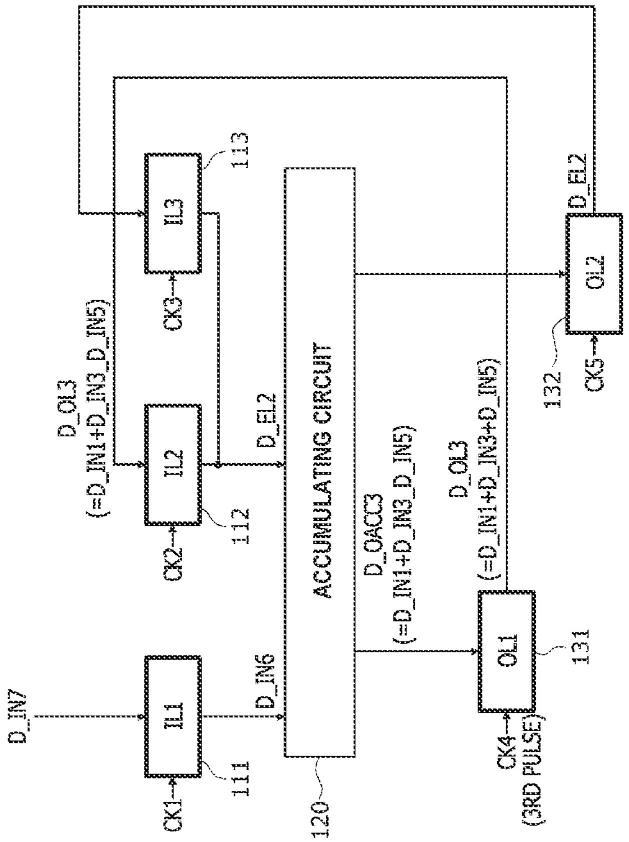

Referring to FIG. 20 along with FIGS. 8 and 9, the first output latch 131 may latch the third odd accumulation data D_OACC3 transmitted through the first output terminal of the accumulating circuit 120. At a point in time when the third pulse of the fourth clock signal CK4 starts to be transmitted to the first output latch 131 (hereinafter, referred to as "eleventh time point"), the first output latch 131 may start to output the third odd accumulation data D_OACC3 as third odd latch data D_OL3. The third odd latch data D_OL3 output from the first output latch 131 may be transmitted to the second input latch 112. Since the third odd latch data D_OL3 is the third odd accumulation data D_OACC3, as a result, the third odd latch data D_OL3 may become data in which the first Input data D_IN1, the third input data D_IN3, and the fifth input data D_IN5 are added. Since it is before the third pulse of the fifth clock signal CK5 is generated, the output operation for the second even latch data D_EL2 of the second output latch 132 may be maintained at the eleventh time point. As described with reference to FIG. 7, at the eleventh time point, the first input latch 111 may receive the seventh input data D_IN7 through the input terminal.

Figure 21:
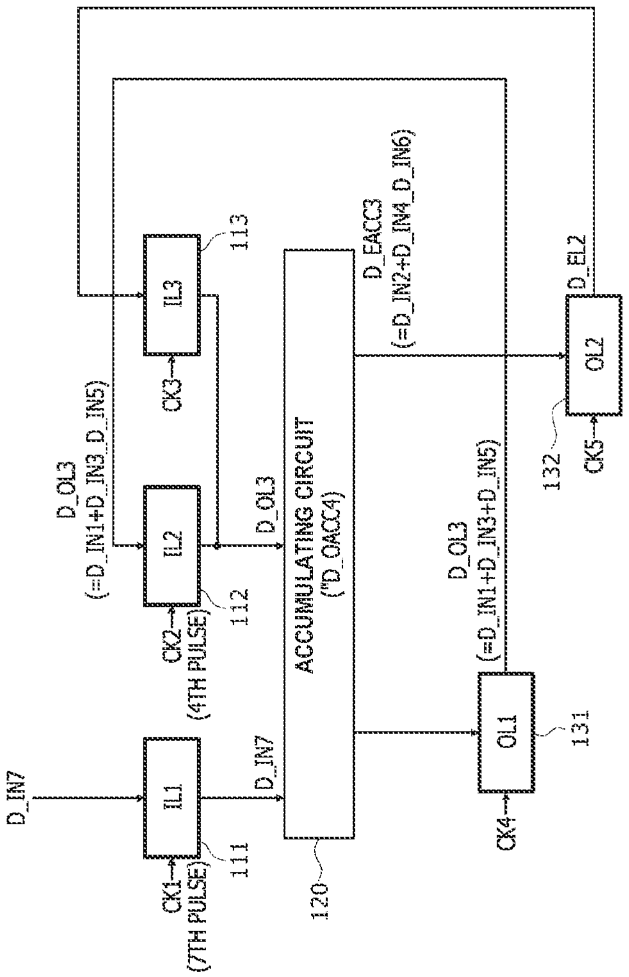

Referring to FIG. 21 along with FIGS. 8 and 9, at a point in time when a seventh pulse of the first clock signal CK1 starts to be transmitted to the first input latch 111 (hereinafter, referred to as "twelfth time point"), the first input latch 111 may start to output the latched seventh input data D_IN7 through the output terminal. Since the fourth pulse of the second clock signal CK2 is also transmitted to the second input latch 112 at the twelfth time point, the second input latch 112 may start to output the third odd latch data D_OL3 through the output terminal. That is, at the twelfth time point, the accumulating circuit 120 may start to receive the seventh input data D_IN7 and the third odd latch data D_OL3 through the first input terminal and the second input terminal, respectively. At the twelfth time point, the accumulating circuit 120 may start to perform a seventh accumulation operation on the seventh input data D_IN7 and the third odd latch data D_OL3 to generate fourth odd accumulation data D_OACC4. In addition, at the twelfth time point, the accumulating circuit 120 may start to output the third even accumulation data D_EACC3 in which the second input data D_IN2, the fourth input data D_IN4, and the sixth input data D_IN6 are added as a seventh operation result through the second output terminal. The third even accumulation data D_EACC3 may be transmitted to the second output latch 132.

Figure 22:
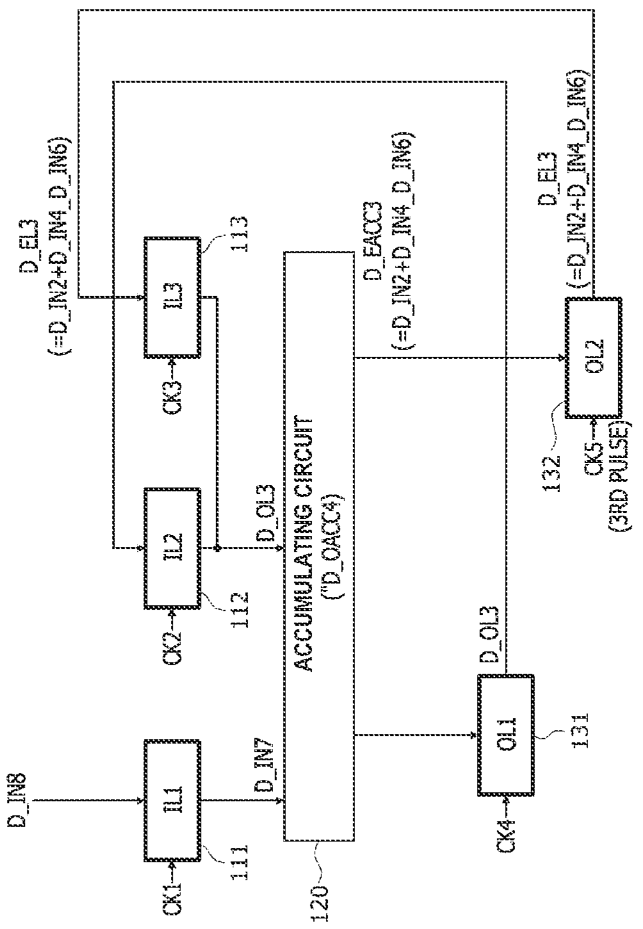

Referring to FIG. 22 along with FIGS. 8 and 9, the second output latch 132 may latch the third even accumulation data D_EACC3 transmitted through the second output terminal of the accumulating circuit 120. At a point in time when the third pulse of the fifth clock signal CK5 starts to be transmitted to the second output latch 132 (hereinafter, referred to as "thirteenth time point"), the second output latch 132 may start to output the third even accumulation data D_EACC3 as third even latch data D_EL3. The third even latch data D_EL3 output from the second output latch 132 may be transmitted to the third input latch 113. Since the third even latch data D_EL3 is the third even accumulation data D_EACC3, the third even latch data D_EL3 may become data in which the second input data D_IN2, the fourth input data D_IN4, and the sixth input data D_IN6 are added. Since it is before the fourth pulse of the fourth clock signal CK4 is generated, the output operation for the third odd latch data D_OL3 of the first output latch 131 may be maintained at the twelfth time point. As described with reference to FIG. 7, at the twelfth time point, the first input latch 111 may receive the eighth input data D_IN8 through the input terminal.

Figure 23:
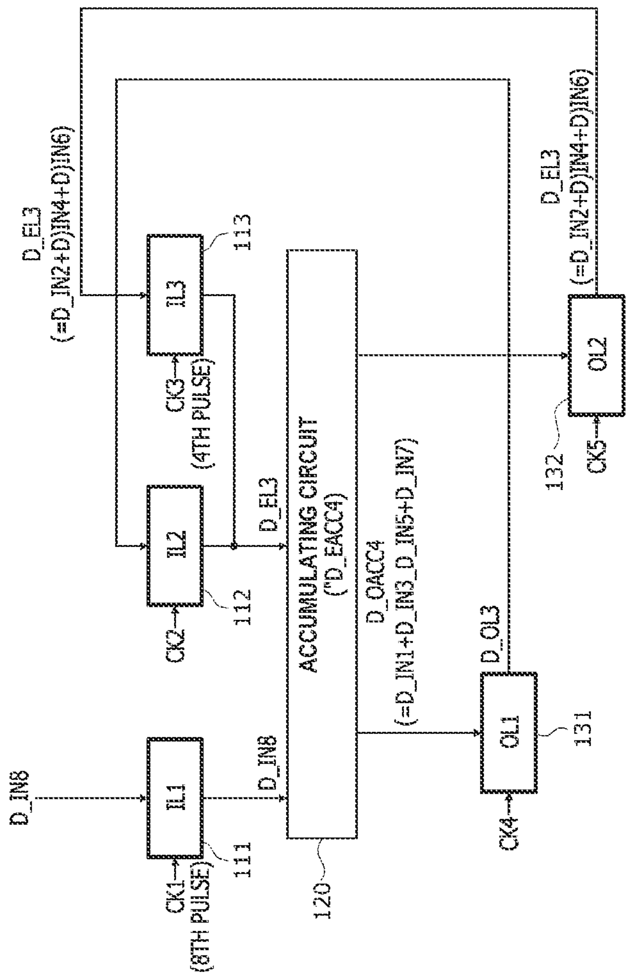

Referring to FIG. 23 along with FIGS. 8 and 9, at a point in time when an eighth pulse of the first clock signal CK1 starts to be transmitted to the first input latch 111 (hereinafter, referred to as "fourteenth time point"), the first input latch 111 may start to output the latched eighth input data D_IN8 through the output terminal. Since the fourth pulse of the third clock signal CK3 is also transmitted to the third input latch 113 at the fourteenth time point, the third input latch 113 may start to output the third even latch data D_EL3 through the output terminal. That is, at the fourteenth time point, the accumulating circuit 120 may start to receive the eighth input data D_IN8 and the third even latch data D_EL3 through the first input terminal and the second input terminal, respectively. At the fourteenth time point, the accumulating circuit 120 may start to perform an eighth accumulation operation on the eighth input data D_IN8 and the third even latch data D_EL3 to generate fourth even accumulation data D_EACC4. In addition, at the fourteenth time point, the accumulating circuit 120 may start to output fourth odd accumulation data D_OACC4 in which the first input data D_IN1, the third input data D_IN3, the fifth input data D_IN5, and the seventh input data D_IN7 are added as the seventh operation result through the first output terminal. The fourth odd accumulation data D_OACC4 may be transmitted to the first output latch 131.

Figure 24:
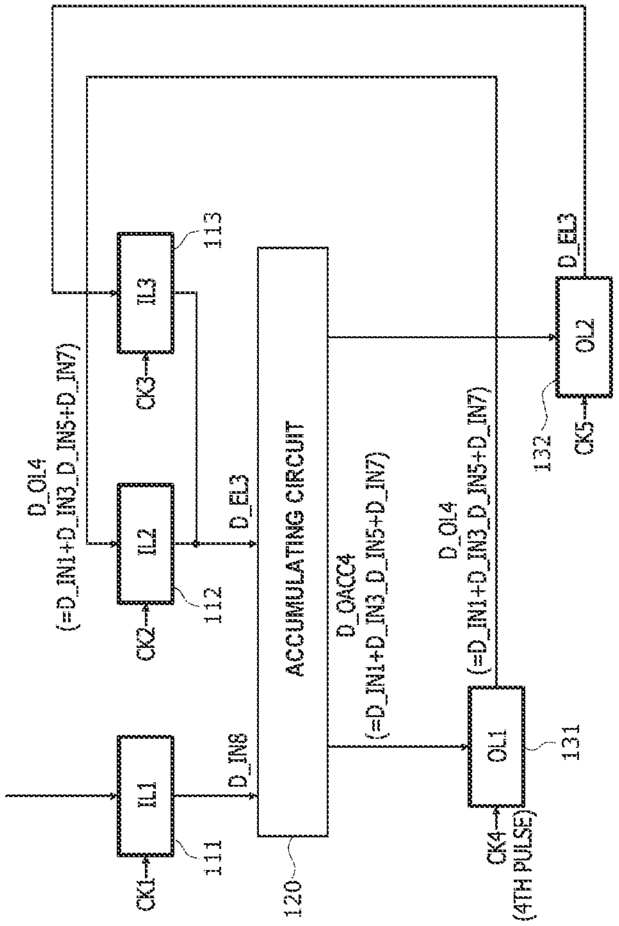

Referring to FIG. 24 along with FIGS. 8 and 9, the first output latch 131 may latch the fourth odd accumulation data D_OACC4 transmitted through the first output terminal of the accumulating circuit 120. At a point in time when the fourth pulse of the fourth clock signal CK4 starts to be transmitted to the first output latch 131 (hereinafter, referred to as "fifteenth time point"), the first output latch 131 may start to output the fourth odd accumulation data D_OACC4 as fourth odd latch data D_OL4. Since the fourth odd latch data D_OL4 is the fourth odd accumulation data D_OACC4, as a result, the fourth odd latch data D_OL4 may become data in which the first input data D_IN1, the third input data D_IN3, the fifth input data D_IN5, and the seventh input data D_IN7 are added. That is, the fourth odd latch data D_OL4 output from the first output latch 131 at the fifteenth time point may become data in which the odd-numbered input data D_IN1, D_IN3, D_IN5, and D_IN7 are accumulated among the first to eighth input data D_IN1-D_IN8. The fourth odd latch data D_OL4 output from the first output latch 131 may be transmitted to the second input latch 112, but no longer used for an accumulation operation in the accumulating circuit 120. Since it is before the fourth pulse of the fifth clock signal CK5 is generated, the output operation for the third even latch data D_EL3 of the second output latch 132 may be maintained at the fifteenth time point.

Figure 25:
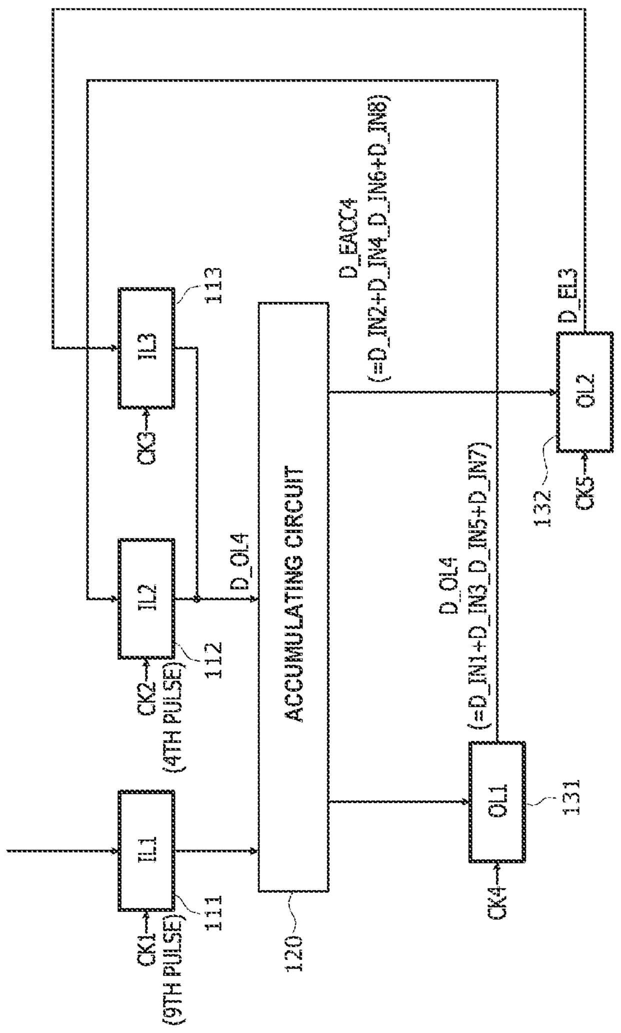

Referring to FIG. 25 along with FIGS. 8 and 9, at a point in time when a ninth pulse of the first clock signal CK1 starts to be transmitted to the first input latch 111 (hereinafter, referred to as "sixteenth time point"), the first input latch 111 may no longer output input data. Since the fourth pulse of the second clock signal CK2 is also transmitted to the second input latch 112 at the sixteenth time point, the second input latch 112 may start to output the fourth odd latch data D_OL4 through the output terminal. However, as described with reference to FIG. 24, the fourth odd latch data D_OL4 may no longer be used for the accumulation operation in the accumulating circuit 120. At the sixteenth time point, the accumulating circuit 120 may start to output the fourth even accumulation data D_EACC4 in which the second input data D_IN2, the fourth input data D_IN4, the sixth input data D_IN6, and the eighth input data D_IN8 are added as the eighth operation result. The fourth even accumulation data D_EACC4 may be transmitted to the second output latch 132.

Figure 26:
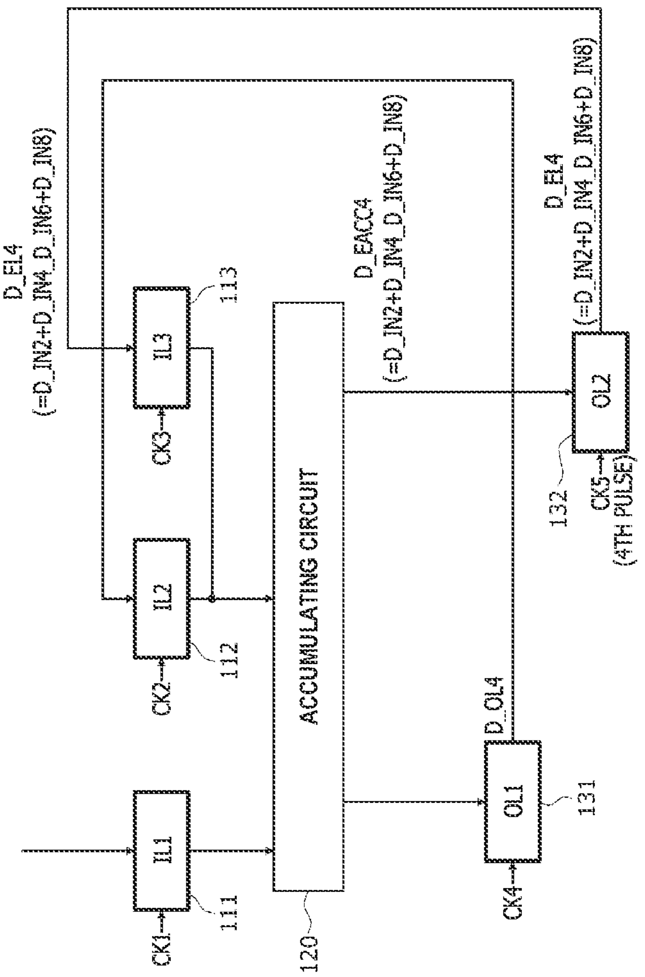

Referring to FIG. 26 along with FIGS. 8 and 9, the second output latch 132 may latch the fourth even accumulation data D_EACC4 transmitted through the second output terminal of the accumulating circuit 120. At a point in time when the fourth pulse of the fifth clock signal CK5 starts to be transmitted to the second output latch 132 (hereinafter, referred to as "seventeenth time point"), the second output latch 132 may start to output the fourth even accumulation data D_EACC4 as fourth even latch data D_EL4. Since the fourth even latch data D_EL4 is the fourth even accumulation data D_EACC4, as a result, the fourth even latch data D_EL4 may become data in which the second input data D_IN2, the fourth input data D_IN4, the sixth input data D_IN6, and the eighth input data D_IN8 are added. That is, the fourth even latch data D_EL4 output from the second output latch 132 at the seventeenth time point may become result data in which the even-numbered input data D_IN2, D_IN4, D_IN6, and D_IN8 are accumulated among the first to eighth input data D_IN1-D_IN8. The fourth even latch data DEL4 output from the second output latch 132 may be transmitted to the third input latch 113, but may no longer be used for an accumulation operation in the accumulating circuit 120. Since it is before the fifth pulse of the fourth clock signal CK4 is generated, the output operation for the fourth odd latch data D_OL4 of the first output latch 131 may be maintained at the seventeenth time point.

Figure 27:
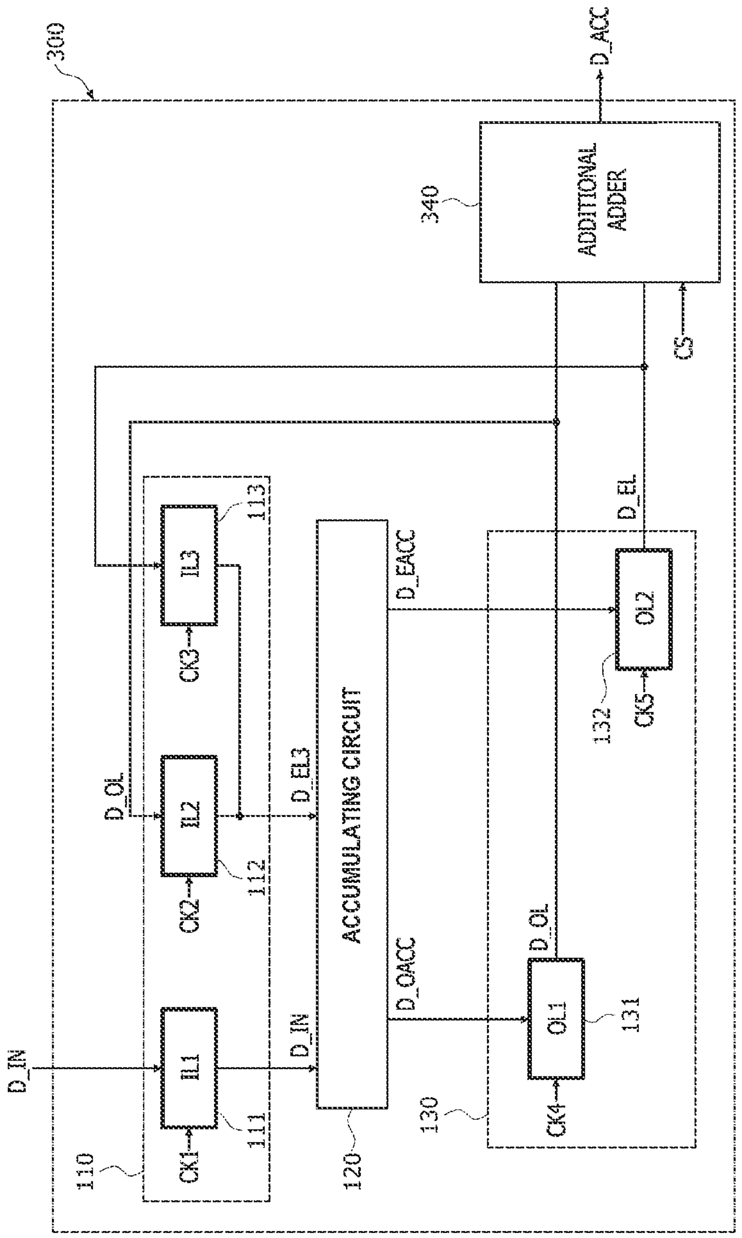
FIG. 27 is a diagram illustrating an accumulator according to another embodiment of the present disclosure.

FIG. 27 is a diagram Illustrating an accumulator 300 according to another embodiment of the present disclosure. In FIG. 27, the same reference numerals as those of FIG. 1 denote the same components, and thus overlapping descriptions will be omitted. Referring to FIG. 27, the accumulator 300 according to this example may further include an additional adder 340. The additional adder 340 may include a first input terminal, a second input terminal, a third Input terminal, and an output terminal. The first input terminal of the additional adder 340 may be coupled to an output terminal of a first output latch 131. Accordingly, the additional adder 340 may receive odd latch data D_OL from the first output latch 131 through the first input terminal. The second input terminal of the additional adder 340 may be coupled to an output terminal of a second output latch 132. Accordingly, the additional adder 340 may receive even latch data D_EL from the second output latch 132 through the second input terminal. The third input terminal of the additional adder 340 may be coupled to a control signal CS transmission line. Accordingly, the additional adder 340 may receive the control signal CS through the third input terminal. The output terminal of the additional adder 340 may be coupled to an accumulator output line extending outside the accumulator 300. The additional adder 340 may add the odd latch data D_OL and the even latch data D_EL respectively transmitted through the first input terminal and the second input terminal in response to a logic level of the control signal CS, for example, the high level. Thereafter, the additional adder 340 may output the result data as accumulation data D_ACC through the output terminal.

Figure 28:
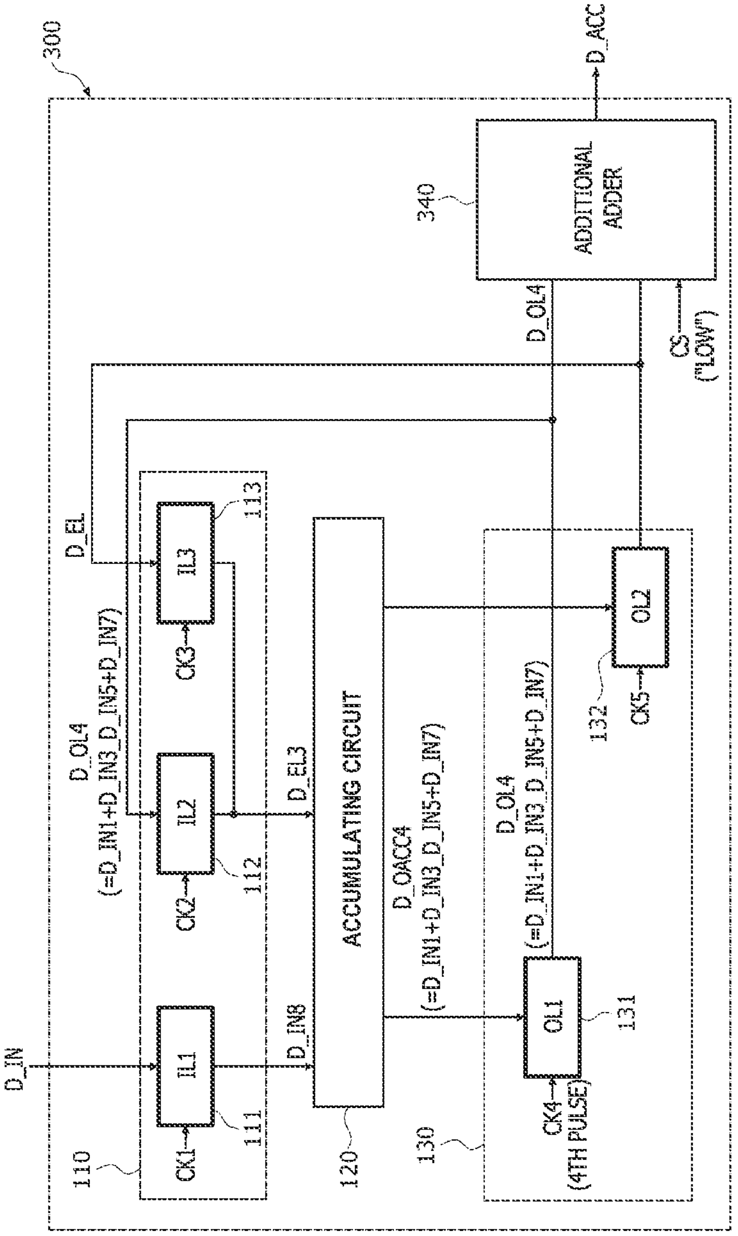
FIGS. 28 and 29 are diagrams illustrating operations of the accumulator of FIG. 27.
Figure 29:
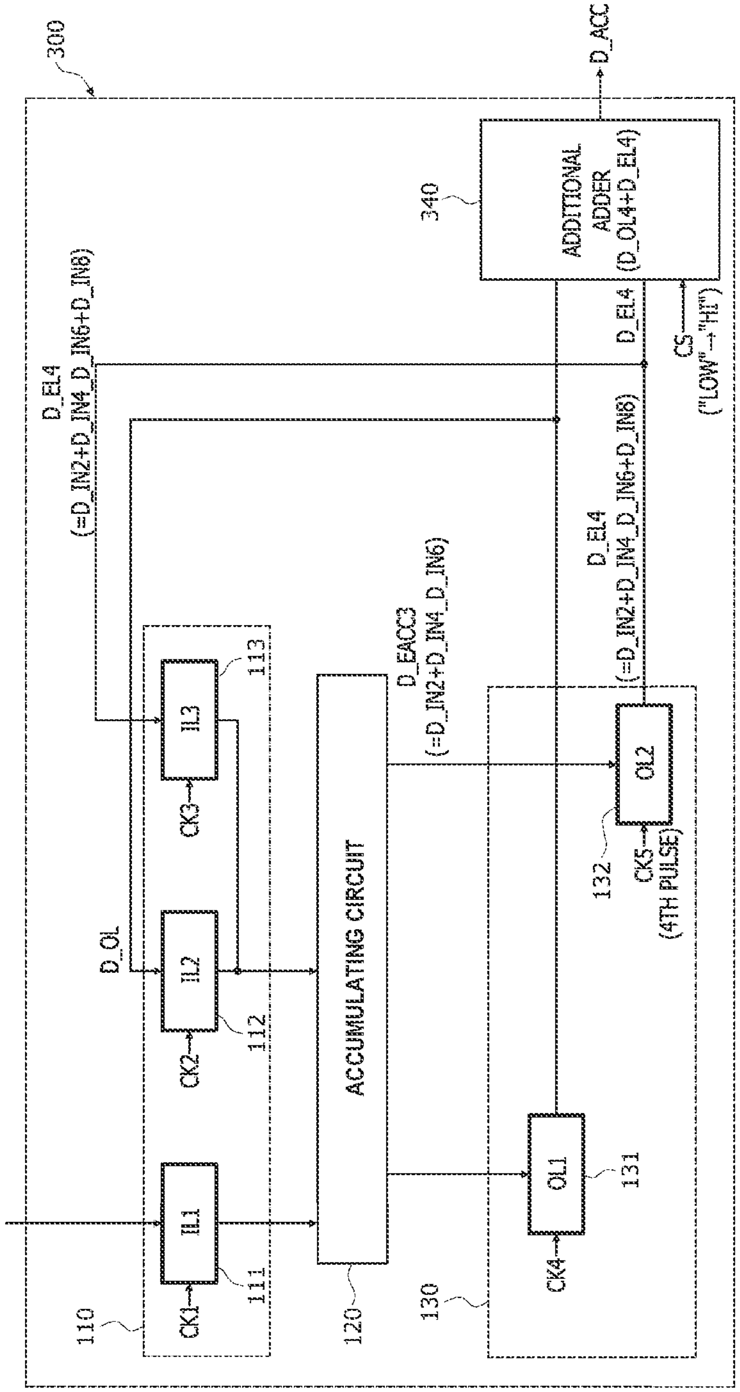

FIGS. 28 and 29 are diagrams illustrating an operation of the accumulator 300 of FIG. 27. It is presupposed that the accumulator 300 according to this embodiment performs all the operations of the accumulator 100 described with reference to FIGS. 8 to 26 in the same manner. First, referring first to FIG. 28, as described with reference to FIG. 24, at the fifteenth time point when the fourth pulse of the fourth clock signal CK4 starts to be transmitted to the first output latch 131, the first output latch 131 may start to output the fourth odd accumulation data D_OACC4 as the fourth odd latch data D_OL4. The fourth odd latch data D_OL4 output from the first output latch 131 may be transmitted to an input terminal of the second input latch 112 and the first input terminal of the additional adder 340. The fourth odd latch data D_OL4 transmitted to the first input terminal of the additional adder 340 may become result data in which the odd-numbered input data D_IN1, D_IN3, D_IN5, and D_IN7 are accumulated among the first to eighth input data D_IN1-D_IN8. The control signal CS transmitted to the third input terminal of the additional adder 340 may maintain a logic "low" level LOW state, accordingly, the additional adder 340 may not perform an addition operation.

Next, referring to FIG. 29, as described with reference to FIG. 26, at a point in time when the fourth pulse of the fifth clock signal CK5 starts to be transmitted to the second latch 132, the second output latch 132 may start to output the fourth even accumulation data D_EACC4 as the fourth even latch data D_EL4. The fourth even latch data D_EL4 output from the second output latch 132 may be transmitted to an input terminal of the third input latch 113 and the second input terminal of the additional adder 340. The fourth even latch data D_EL4 transmitted to the second input terminal of the additional adder 340 may be result data in which the even-numbered input data D_IN2, D_IN4, D_IN6, and D_IN8 are accumulated among the first to eighth Input data D_IN1-D_IN8. The control signal CS transmitted to the third input terminal of the additional adder 340 may transition from a "low" level LOW state to a "high" level HI state, and accordingly, the additional adder 340 may perform an addition operation on the fourth odd latch data D_OL4 and the fourth even latch data D_EL4. The additional adder 340 may output an addition result, that is, "D_OL4+D_EL4" as accumulation data D_ACC through the output terminal. The accumulation data D_ACC output from the additional adder 340 may become data in which all of the first to eighth input data D_IN1-D_IN8 are accumulated.

Figure 30:
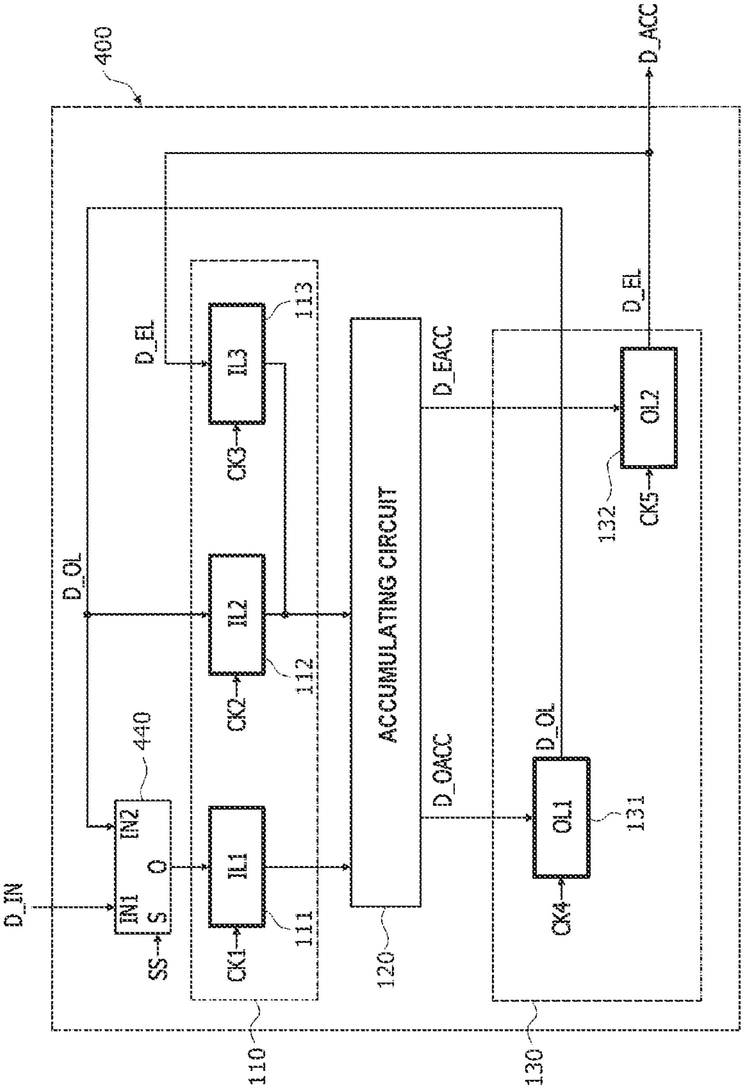
FIG. 30 is a diagram illustrating an accumulator according to another embodiment of the present disclosure.

FIG. 30 is a diagram illustrating an accumulator 400 according to another embodiment of the present disclosure. In FIG. 30, the same reference numerals as those of FIG. 1 denote the same components, and thus overlapping descriptions will be omitted. Referring to FIG. 30, the accumulator 400 according to the present example may be different from the accumulator 100 described with reference to FIG. 1 in that the accumulator 400 further includes a selector 440, an output terminal of the first output latch 131 is coupled to the selector 440, and an output terminal of the second output latch 132 is coupled to an external output line of the accumulator 400. The selector 440 may include a first input terminal IN1, a second input terminal IN2, a selection signal input terminal S, and an output terminal O. In an example, the selector 440 may include a 2:1 multiplexer. The first input terminal IN1 of the selector 440 may be coupled to a transmission line through which input data D_IN is transmitted. The second input terminal IN2 of the selector 440 may be coupled to the output terminal of the first output latch 131. The selection signal input terminal S of the selector 440 may be coupled to a transmission line through which a selection signal SS is transmitted. The output terminal O of the selector 440 may be coupled to the input terminal of the input latch 111.

The selector 440 may select one of the input data D_IN and the odd latch data D_OL received through the first input terminal IN1 and the second input terminal IN2, respectively, as selected data according to a logic level of the selection signal SS to output the selected data through the output terminal O. In an example, when a selection signal SS of a "low" level is transmitted, the selector 440 may output the input data D_IN received through the first input terminal IN1 as the selected data through the output terminal O. In this case, the first input latch 111 may receive the input data D_IN through the input terminal from the selector 440. On the other hand, when a selection signal SS of a "high" level is transmitted, the selector 440 may output the odd latch data D_OL received through the second input terminal IN2 through the output terminal O. In this case, the first input latch 111 may receive the odd latch data D_OL through the input terminal from the selector 440.

The output terminal of the first output latch 131 may be commonly coupled to the input terminal of the second input latch 112 and the second input terminal IN2 of the selector 440. Accordingly, the odd latch data D_OL output from the first output latch 131 may be commonly transmitted to the second input latch 112 and the selector 440. The output terminal of the second output latch 132 may be commonly coupled to an input terminal of the third input latch 113 and an output line of the accumulator 400. Accordingly, the even latch data D_EL output from the second output latch 132 may be transmitted to the third input latch 113 and may also be transmitted to the outside of the accumulator 400 through the output line of the accumulator 400.

Figure 31:
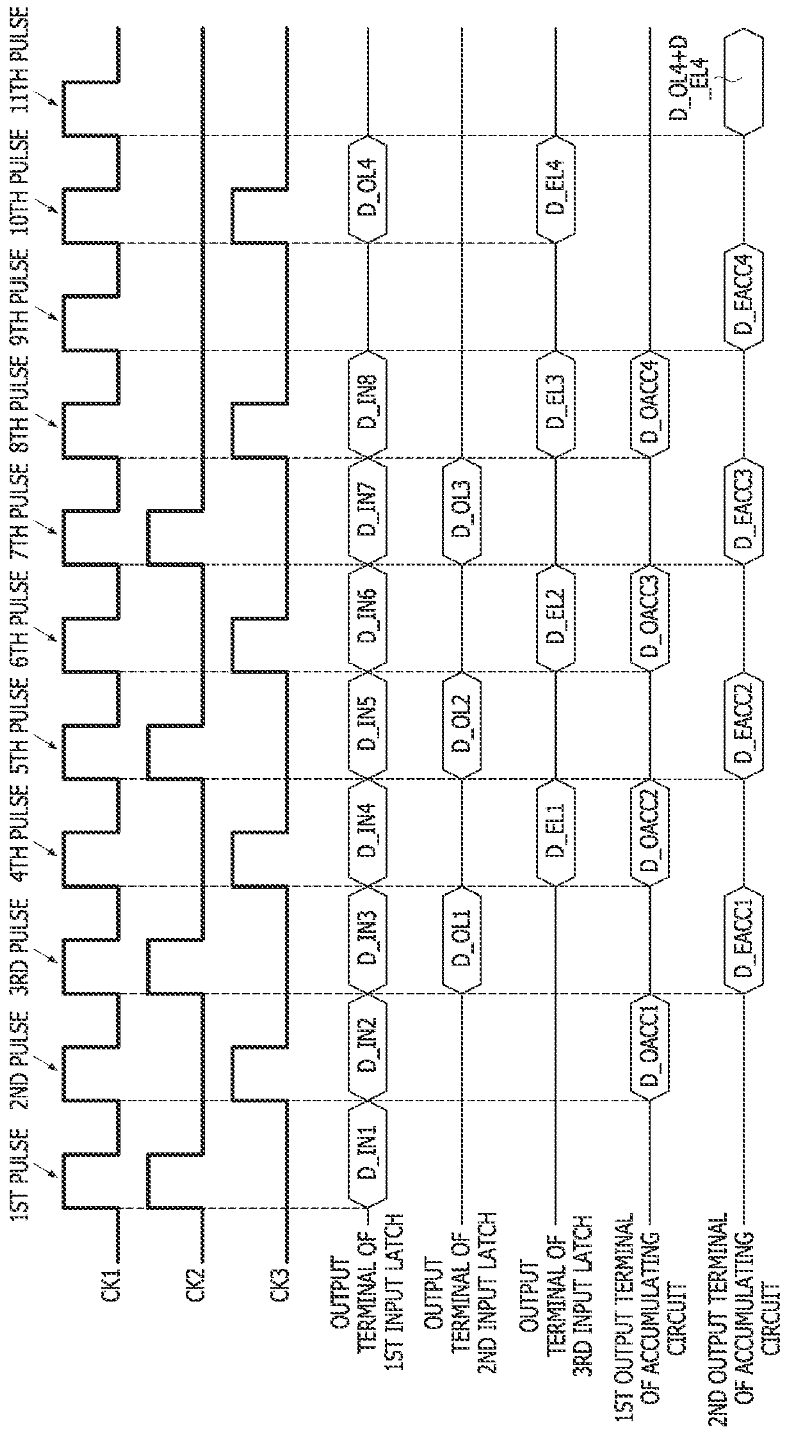
FIGS. 31 and 32 are diagrams illustrating operations of the accumulator of FIG. 30.
Figure 32:
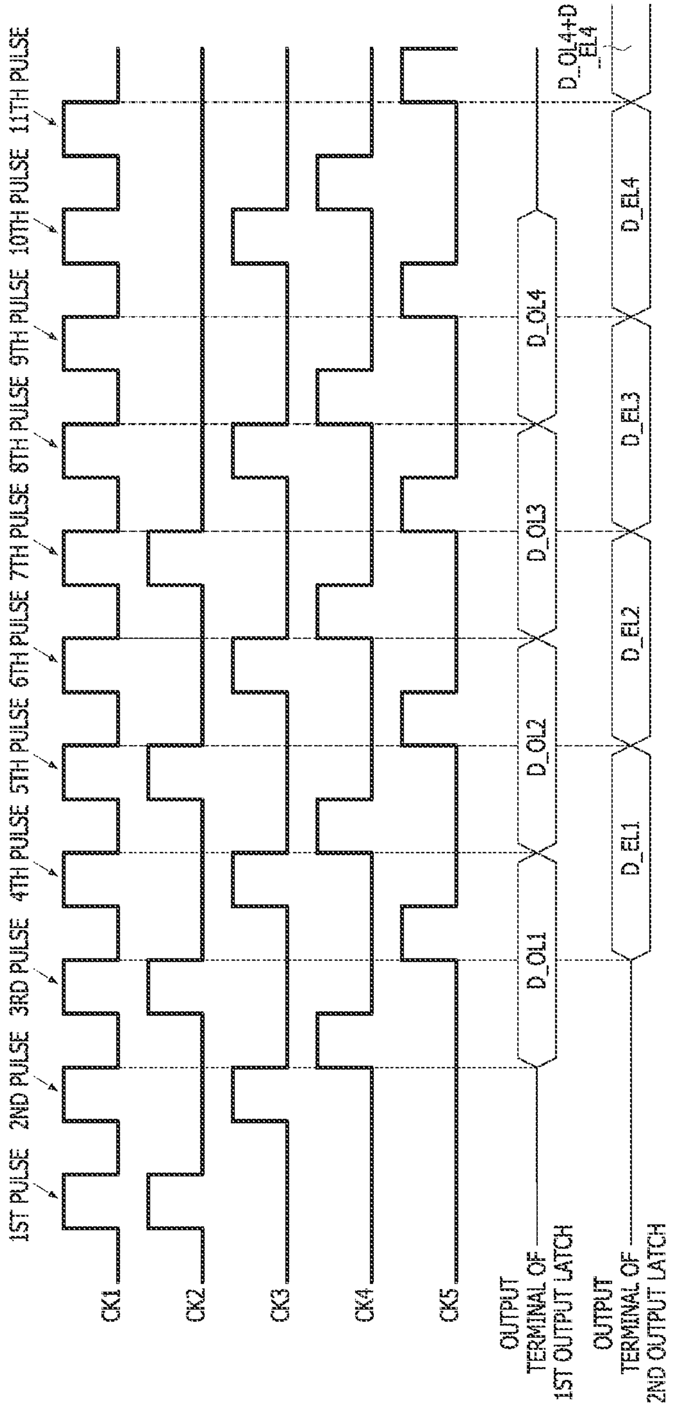

FIGS. 31 and 32 are timing diagrams illustrating operations of the accumulator 400 of FIG. 30. FIGS. 33 to 38 are diagrams illustrating operations of the accumulator 400 of FIG. 30. In FIGS. 31 and 32, from a first time point at which a first pulse of the first clock signal CK1 is transmitted to the first input latch 111 to a fifteenth time point at which a fourth pulse of the fourth clock signal CK4 starts to be transmitted to the first output latch 131, the selection signal SS transmitted to the selection terminal S of the selector 440 may maintain a "low" level LOW state. Accordingly, the operations of the accumulator 400 from the first time point to the fifteenth time point may be substantially the same as the operations of the accumulator 100 described with reference to FIGS. 10 and 24, and hereinafter, overlapping descriptions will be omitted.

Figure 33:
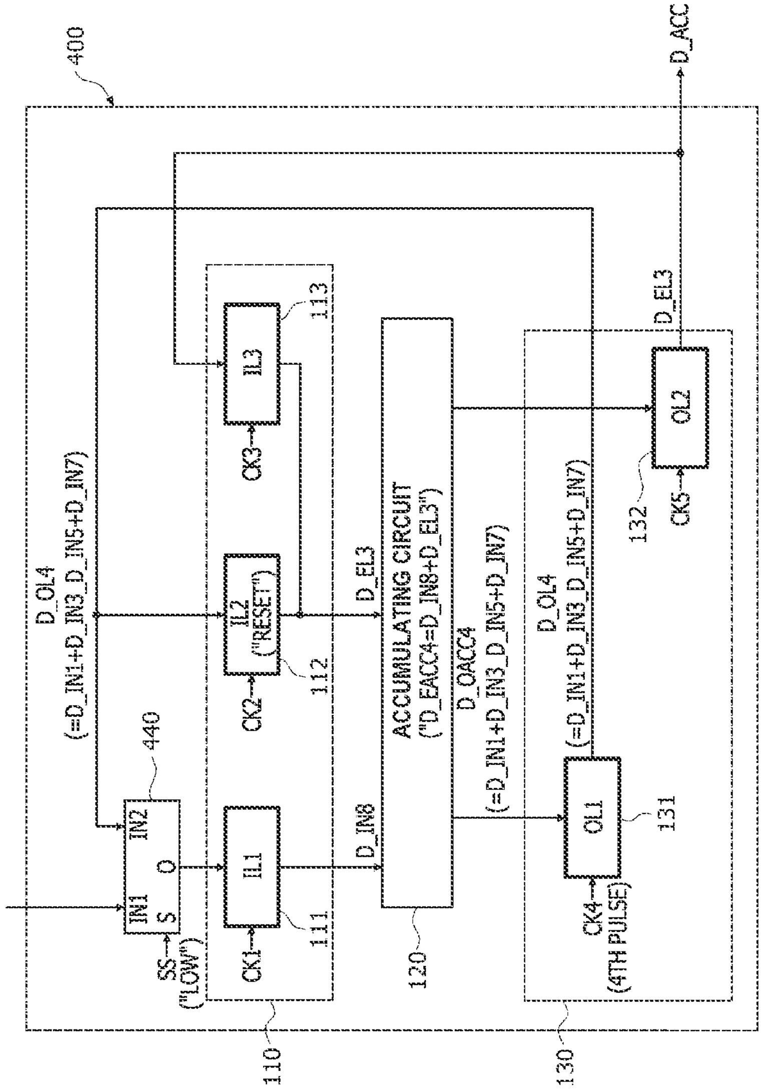
FIGS. 33 to 38 are diagrams illustrating operations of the accumulator of FIG. 30.

Referring to FIG. 33 along with FIGS. 31 and 32, after the fifteenth time point at which the fourth pulse of the fourth clock signal CK4 starts to be transmitted to the first output latch 131, the pulse of the second clock signal CK2 may no longer be generated. That is, the second input latch 112 may maintain a reset state after the fifteenth time point. Accordingly, the second input latch 112 may no longer output the odd latch data after the fifteenth time point. At the fifteenth time point, the first input latch 111 may still transmit the eighth input data D_IN8 to the first input terminal of the accumulating circuit 120. In addition, the third input latch 113 may still transmit the third even latch data D_EL3 to the second input terminal of the accumulating circuit 120. The accumulating circuit 120 may start to perform an accumulation operation on the eighth input data D_IN8 and the third even latch data D_EL3 to generate fourth even accumulation data D_EACC4. Since the input data is no longer latched, no data may be output. At the fifteenth time point, the fourth odd accumulation data D_OACC4 may still be transmitted from the first output terminal of the accumulating circuit 120 to the first output latch 131. As the fourth pulse of the fourth clock signal CK4 is transmitted to the first output latch 131 at the fifteenth time point, the first output latch 131 may start to output the fourth odd accumulation data D_OACC4 as the fourth odd latch data D_OL4. The fourth odd latch data D_OL4 output from the first output latch 131 at the fifteenth time point may become data in which the odd-numbered input data D_IN1, D_IN3, D_IN5, and D_IN7 are accumulated among the first to eighth input data D_IN1-D_IN8. The fourth odd latch data D_OL4 output from the first output latch 131 may be transmitted to the second input latch 112 and the second input terminal IN2 of the selector 440. Even though the fourth odd latch data D_OL4 is transmitted to the second input latch 112, as the second input latch 112 maintains the reset state after the fifteenth time point, the fourth odd latch data D_OL4 may not output from the second input latch 112. The fourth odd latch data D_OL4 transmitted to the second input terminal IN2 of the selector 440 may become in an output standby state in the selector 440.

Figure 34:
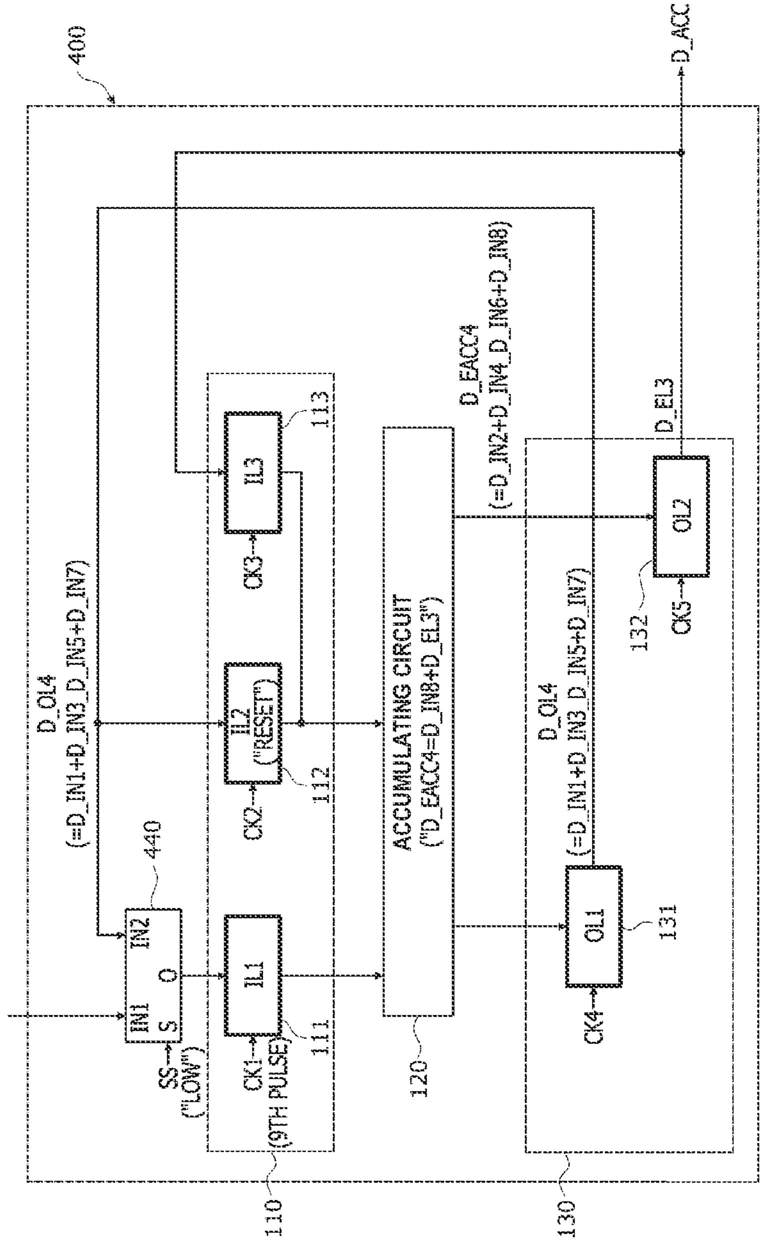

Referring to FIG. 34 along with FIGS. 31 and 32, at a sixteenth time point at which the ninth pulse of the first clock signal CK1 is transmitted to the first input latch 111, the transmission of the fourth odd latch data D_OL4 from the first output latch 131 to the second input terminal IN2 of the selector 440 may be continued. At the sixteenth time point, since there is no data input to the first input terminal IN1 of the selector 440 and the selection signal SS transmitted to the selector 440 maintains a "low" level LOW state, data may not be transmitted from the selector 440 to the first input latch 111. Accordingly, even if the ninth pulse of the first clock signal CK1 is transmitted to the first input latch 111, data may not be output from the first input latch 111. At the sixteenth time point, the accumulating circuit 120 may start to output the fourth even accumulation data D_EACC4 generated by the accumulation operation through the second output terminal. The fourth even accumulation data D_EACC4 may be transmitted to the second output latch 132.

Figure 35:
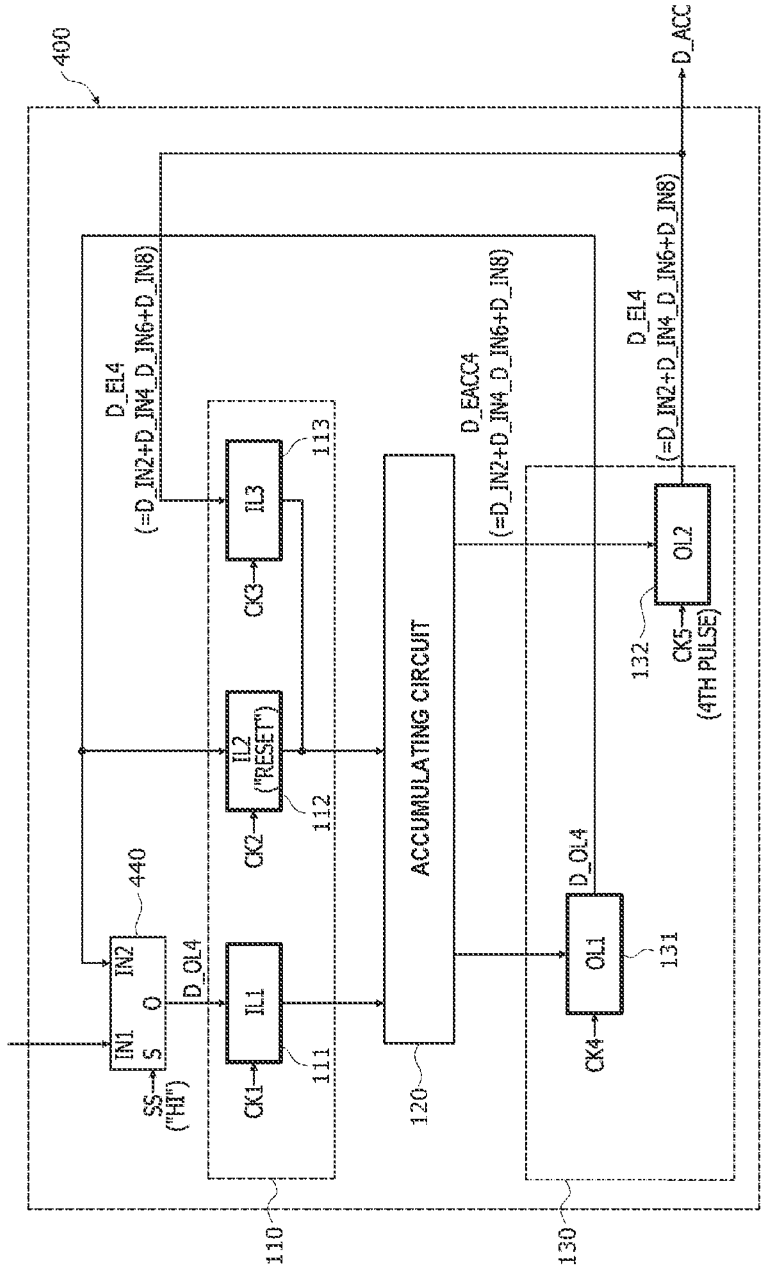

Referring to FIG. 35 along with FIGS. 31 and 32, at a seventeenth time point at which the fourth pulse of the fifth clock signal CK5 starts to be transmitted to the second output latch 132, the output of the fourth even accumulation data D_EACC4 from the accumulating circuit 120 may be continued. The second output latch 132 may start to output the fourth even accumulation data D_EACC4 as the fourth even latch data D_EL4 in synchronization with the fourth pulse of the fifth clock signal CK5. The fourth even latch data D_EL4 output from the second output latch 132 may be transmitted to the third input latch 113. Since the fourth even latch data D_EL4 is the fourth even accumulation data D_EACC4, the fourth even latch data D_EL4 may become data in which the second input data D_IN2, the fourth input data D_IN4, the sixth input data D_IN6, and the eighth input data D_IN8 are accumulated. At the seventeenth time point, the logic level of the selection signal SS input to the selection terminal S of the selector 440 may be changed from a "low" level LOW to a "high" level HI. Accordingly, the selector 440 may output the fourth odd latch data D_OL4 input through the second input terminal IN2 through the output terminal O. The fourth odd latch data D_OL4 output from the selector 440 may be transmitted to the first input latch 111.

Figure 36:
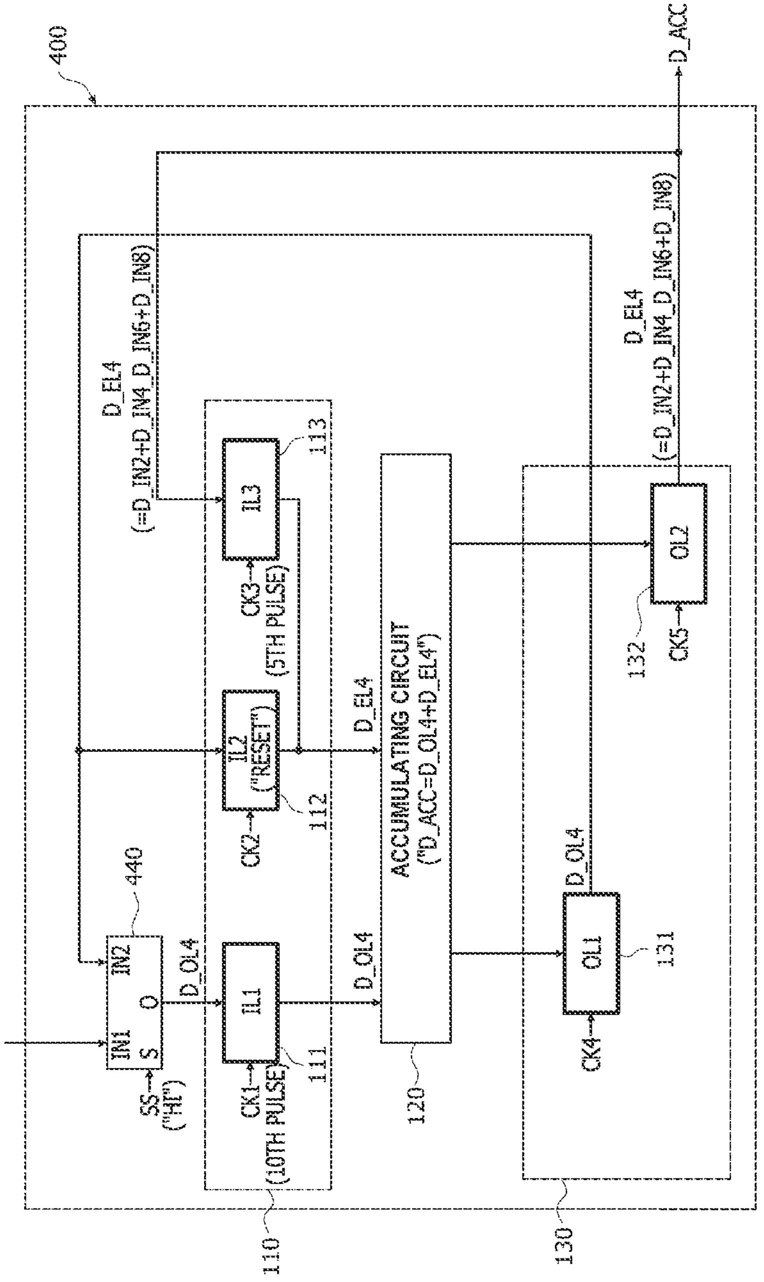

Referring to FIG. 36 along with FIGS. 31 and 32, at a point in time when the tenth pulse of the first clock signal CK1 starts to be transmitted to the first input latch 111 (hereinafter, referred to as "eighteenth time point"), the selection signal SS may maintain a "high" level HI, and accordingly, the transmission for the fourth odd latch data D_OL4 from the selector 440 to the first input latch 111 may be continued. Although not shown, when the transmission for the fourth odd latch data D_OL4 from the selector 440 to the first input latch 111 is completed, the logic level of the selection signal SS may be changed from a "high" level HI to a "low" level LOW. At the eighteenth time point, the first input latch 111 may start to output the fourth odd latch data D_OL4 transmitted from the selector 440 in synchronization with the tenth pulse of the first clock signal CK1. Since the fifth pulse of the third clock signal CK3 is also transmitted to the third input latch 113, the third input latch 113 may start to output the fourth even latch data D_EL4 through the output terminal. That is, at the eighteenth time point, the accumulating circuit 120 may start to receive the fourth odd latch data D_OL4 and the fourth even latch data D_EL4 through the first input terminal and the second input terminal, respectively. At the eighteenth time point, the accumulating circuit 120 may start to perform an accumulation operation on the fourth odd latch data D_OL4 and the fourth even latch data D_EL4 to generate accumulation data D_ACC in which the fourth odd latch data D_OL4 and the fourth even latch data D_EL4 are added. The accumulation data D_ACC may be data in which all of the first to eighth input data D_IN1-D_IN8 are added.

Figure 37:
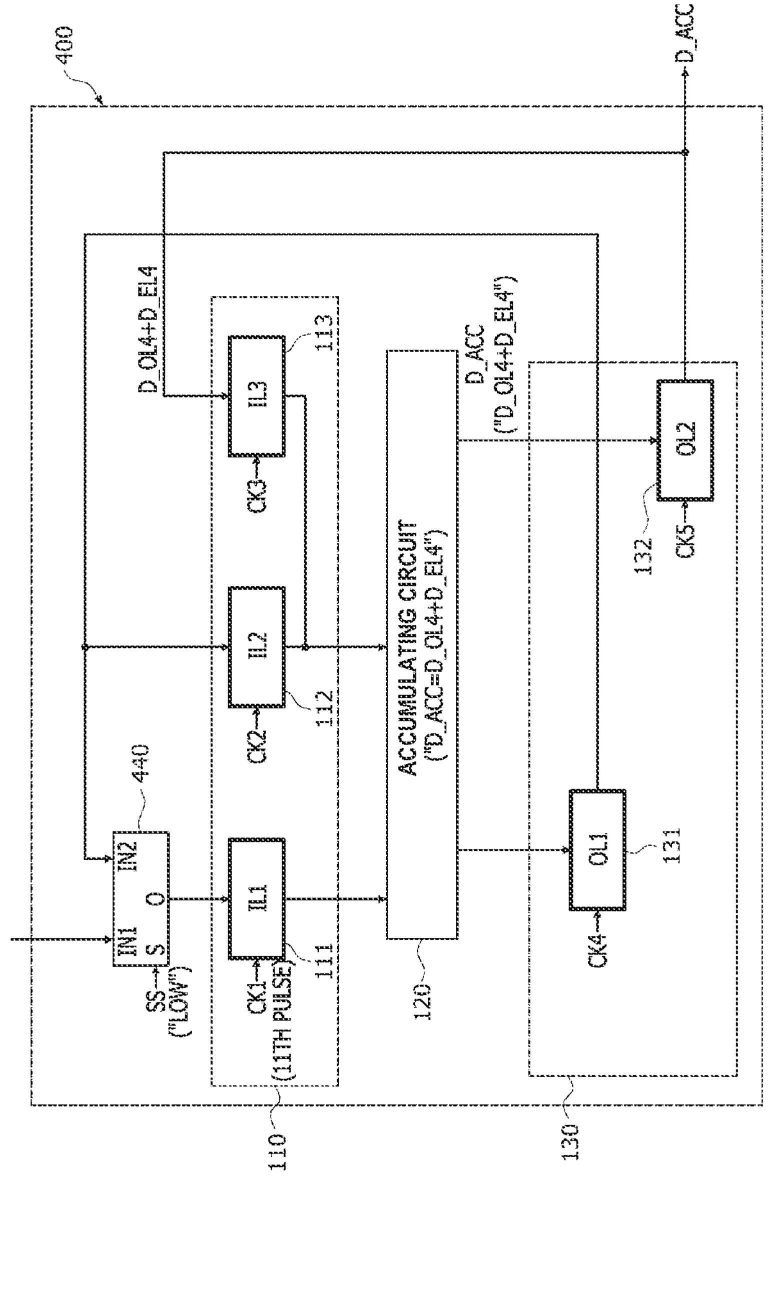

Referring to FIG. 37 along with FIGS. 31 and 32, at a point in time when the eleventh pulse of the first clock signal CK1 starts to be transmitted to the first input latch 111 (hereinafter, referred to as "nineteenth time point"), the selection signal SS may maintain a "low" level LOW. Even if the eleventh pulse of the first clock signal CK1 is transmitted to the first input latch 111, as the output for the fourth odd latch data D_OL4 from the first input latch 111 is completed at the nineteenth time point, data may no longer be output from the first input latch 111. Similarly, at the nineteenth time point, the output for the fourth even latch data D_EL4 from the third input latch 113 may also be completed, and data may no longer be output from the third input latch 113. At the nineteenth time point, the accumulating circuit 120 may start to output the accumulation data D_ACC generated by the accumulation operation through the second output terminal. The accumulation data D_ACC may be transmitted to the second output latch 132.

Figure 38:
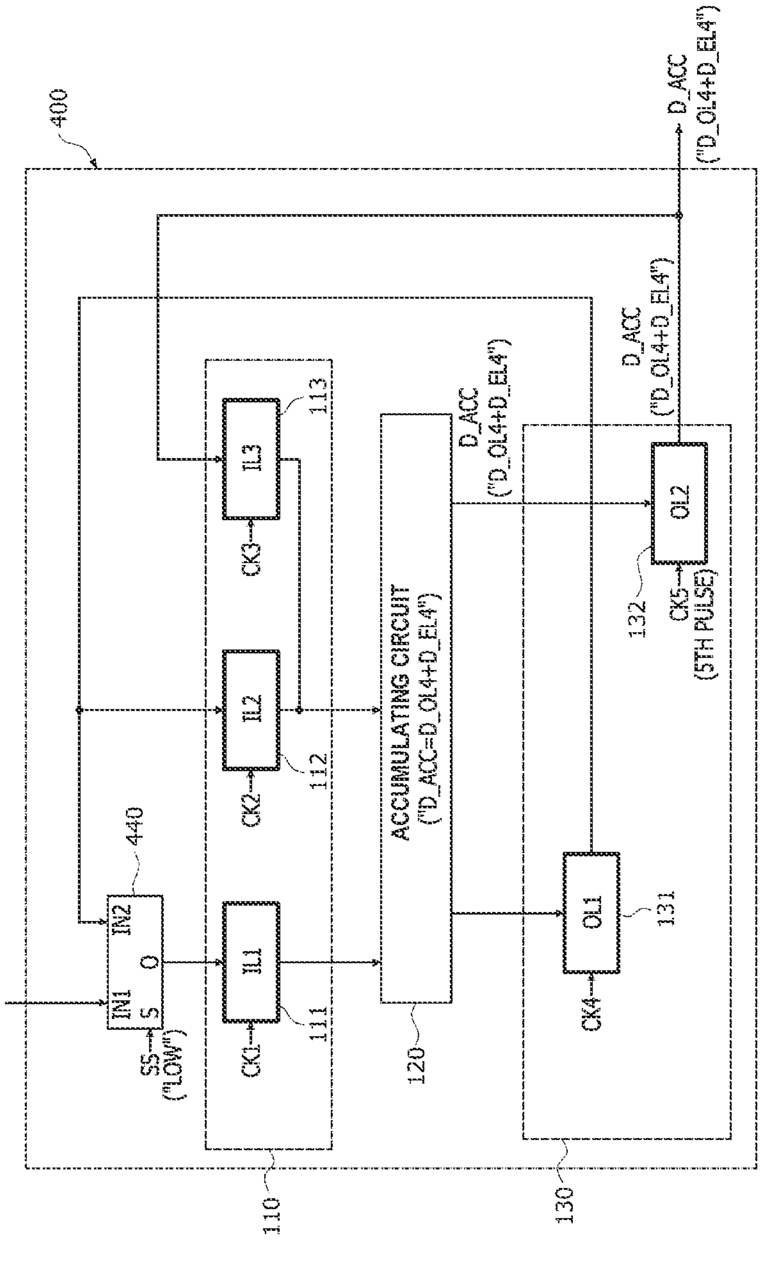

Referring to FIG. 38 along with FIGS. 31 and 32, at a point in time when the fifth pulse of the fifth clock signal CK5 starts to be transmitted to the second output latch 132 (hereinafter, referred to as "twentieth time point"), the output for the accumulation data D_ACC from the accumulating circuit 120 may be continued. The second output latch 132 may start to output the accumulation data D_ACC In synchronization with the fifth pulse of the fifth clock signal CK5. The accumulation data D_ACC output from the second output latch 132 may start to be output from the accumulator 400 through the output line of the accumulator 400. The accumulation data D_ACC output from the accumulator 400 may constitute the result data in which all of the first to eighth input data D_IN1-D_IN8 are accumulated.

Figure 39:
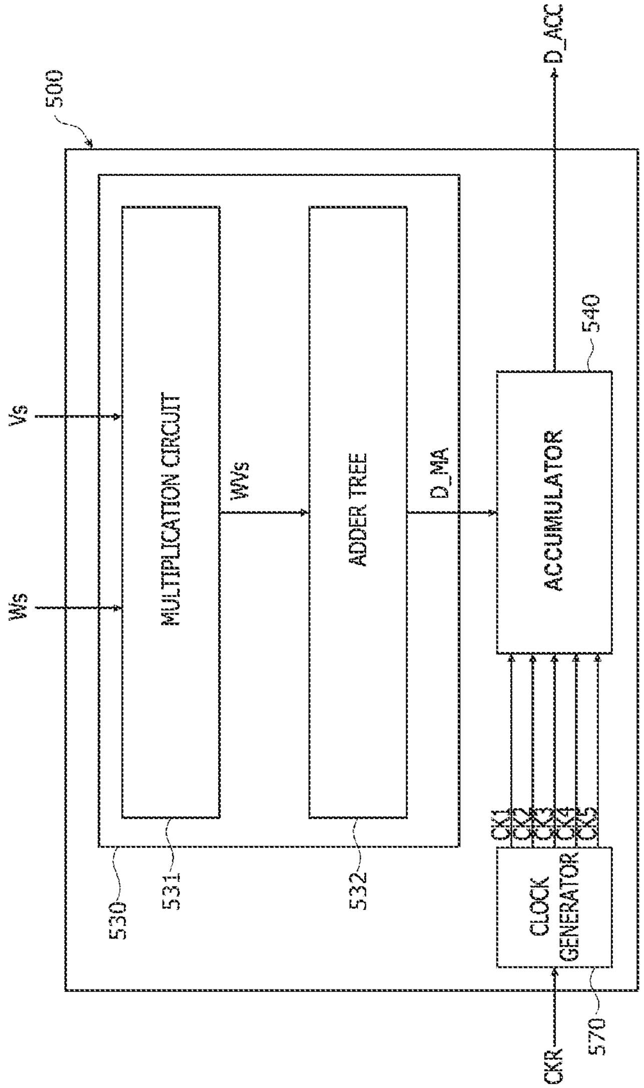
FIG. 39 is a diagram illustrating an example of a multiplication-addition (MAC) operator as an operational logic circuit according to an embodiment of the present disclosure.

FIG. 39 is a block diagram illustrating an example of a MAC operator 500 as an operation logic circuit according to an embodiment of the present disclosure. Referring to FIG. 39, the MAC operator 500 may include a multiplication and addition circuit 530, an accumulator 540, and a clock generator 570. The multiplication and addition circuit 530 may include a multiplication circuit 531 and an adder tree 532. The multiplication circuit 531 may receive first input data Ws and second input data Vs. In an example, each of the first input data Ws and the second input data Vs may be weight data and vector data used for an artificial intelligence operation, respectively. The multiplication circuit 531 may perform a multiplication operation on the first input data Ws and the second input data Vs to generate and output multiplication data WVs. The multiplication data WVs may be transmitted to the adder tree 532. The adder tree 532 may perform an addition operation on the multiplication data WVs to generate and output multiplication addition data D_MA. The multiplication addition data D_MA may be transmitted to the accumulator 540.

The accumulator 540 may perform an accumulation addition operation on latch data latched in the previous operation process and the multiplication addition data D_MA transmitted from the adder tree 532 to generate and output accumulation data D_ACC. In an example, the accumulator 540 may have the same configuration as the accumulator 300 described with reference to FIG. 29. In this case, the multiplication addition data D_MA input to the accumulator 540 may correspond to the input data D_IN described with reference to FIG. 29. In an example, the accumulator 540 may have the same configuration as the accumulator 400 described with reference to FIG. 33. In this case, the multiplication addition data D_MA input to the accumulator 540 may correspond to the input data D_IN described with reference to FIG. 33.

The clock generator 570 may generate and output a first clock signal CK1, a second clock signal CK2, a third clock signal CK3, a fourth clock signal CK4, and a fifth clock signal CK5, based on a reference clock signal CKR input to the MAC operator 500. The first clock signal CK1 may be the same as the reference clock signal CKR. The second clock signal CK2 may have the same pulses as the odd-numbered pulses of the first lock signal CK1. The third clock signal CK3 may have the same pulses as the even-numbered pulses of the first clock signal CK1. The fourth clock signal CK4 may have pulses generated with a predetermined time delay from the pulses of the second clock signal CK2. Here, the delay time may correspond to a time required for the accumulation operation in the accumulator 540. The fifth clock signal CK5 may have pulses generated with a predetermined time delay from the pulses of the third clock signal CK3. Similarly, here, the delay time may correspond to a time required for the accumulation operation in the accumulator 540. The first to fifth clock signals CK1-CK5 may be transmitted to the accumulator 540. The first to fifth clock signals CK1-CK5 generated by the clock generator 570 may be the same as those described with reference to FIG. 6, and thus, a redundant description will be omitted.

Figure 40:
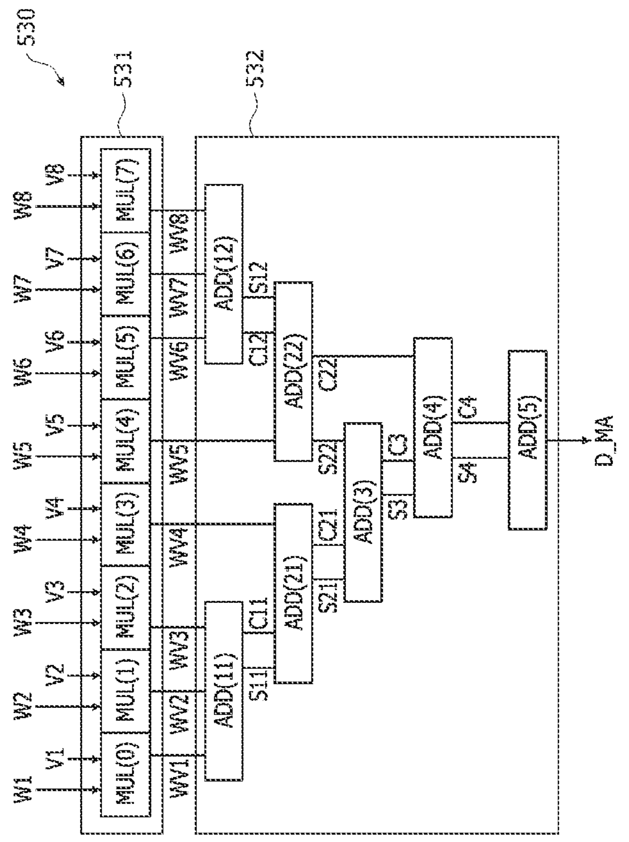
FIG. 40 is a diagram illustrating an example of the configuration and operation of a multiplication and addition circuit of FIG. 39.

FIG. 40 is a block diagram illustrating an example of the configuration and operation of the multiplication and addition circuit 530 of FIG. 39. Referring to FIG. 40, the multiplication and addition circuit 530 may include the multiplication circuit 531 and the adder tree 532. The multiplication circuit 531 may include a plurality of multipliers, for example, first to eighth multipliers MUL(0)-MUL(7). Each of the first to eighth multipliers MUL(0)-MUL(7) may receive first to eighth weight data W1-W8 and first to eighth vector data V1-V8. The first to eighth weight data W1-W8 may constitute the first input data Ws described with reference to FIG. 39. The first to eighth vector data V1-V8 may constitute the second input data Vs described with reference to FIG. 39. Each of the first to eighth multipliers MUL(0)-MUL(7) may perform a multiplication operation on each of the first to eighth weight data W1-W8 and each of the first to eighth vector data V1-V8 to generate first to eighth multiplication data WV1-WV8. For example, the first multiplier MUL(0) may perform a multiplication on the first weight data W1 and the first vector data V1 to generate the first multiplication data WV1. The second multiplier MUL(1) may perform a multiplication on the second weight data W2 and the second vector data V2 to generate the second multiplication data WV2. Each of the remaining third to eighth multipliers MUL(2)-MUL(7) may also perform a multiplication operation in the same manner to generate the third to eighth multiplication data WV3-WV8, respectively. The first to eighth multiplication data WV1-WV8 generated from the first to eighth multipliers MUL(0)-MUL(7) may be transmitted to the adder tree 532.

The adder tree 532 may perform an addition operation on the first to eighth multiplication data WV1-WV8 transmitted from the multiplication circuit 531. The adder tree 532 may output the multiplication addition data D_MA generated as a result of the addition operation. The adder tree 532 may be configured by arranging a plurality of adders ADDs in a hierarchical structure such as a tree structure. In this example, the adder tree 532 may be composed of a plurality of full-adders and half-adders. However, this is only an example, and the adder tree 532 may be composed of only half-adders. In this example, two full-adders ADD(11)-ADD(12) may be disposed in a first stage at the top of the adder tree 532. Two full-adders ADD(21)-ADD(22) may also be disposed in a second stage of the next lower level of the adder tree 532. One full-adder ADD(3) may be disposed in a third stage of the next lower level of the adder tree 532. One full-adder ADD(4) may also be disposed in a fourth stage of the next lower level of the adder tree 532. In addition, one half-adder ADD(5) may be disposed in a fifth stage of the lowest level of the adder tree 532.

The first full-adder ADD(11) of the first stage may perform an addition operation on the first multiplication data WV1, the second multiplication data WV2, and the third multiplication data WV3 transmitted from the first to third multipliers MUL(0)-MUL(2), respectively, to output an addition value S11 and a carry value C11. The second full-adder ADD(12) of the first stage may perform an addition operation on the sixth multiplication data WV6, the seventh multiplication data WV7, and the eighth multiplication data WV8 transmitted from the sixth to eighth multipliers MUL(5)-MUL(7), respectively, to output an addition value S12 and a carry value C12. The first full-adder ADD(21) of the second stage may perform an addition operation on the addition value S11 and carry value C11 transmitted from the first full-adder ADD(11) of the first stage and the fourth multiplication data WV4 transmitted from the fourth multiplier MUL(3) of the multiplication circuit 531 to output an addition value S21 and a carry value C21. The second full-adder ADD(22) of the second stage may perform an addition operation on the addition value S12 and carry value C12 transmitted from the second full-adder ADD(12) of the first stage and the fifth multiplication data WV5 transmitted from the fifth multiplier MUL(4) of the multiplication circuit 531 to output an addition value S22 and a carry value C22. The full-adder ADD(3) of the third stage may perform an addition operation on the addition value S21 and carry value C21 transmitted from the first full-adder ADD(21) of the second stage and the addition value S22 transmitted from the second full-adder ADD(22) of the second stage to output an addition value S3 and a carry value C3. The full-adder ADD(4) of the fourth stage may perform an addition operation on the addition value S3 and carry value C3 transmitted from the full-adder ADD(3) of the third stage and the carry value C22 transmitted from the second full-adder ADD(22) of the second stage to output an addition value S4 and a carry value C4. The half-adder ADD(5) of the fifth stage may perform an addition operation on the addition value S4 and carry value C4 transmitted from the full-adder ADD(4) of the fourth stage to output result data thereof as the multiplication addition data D_MA.

Figure 41:
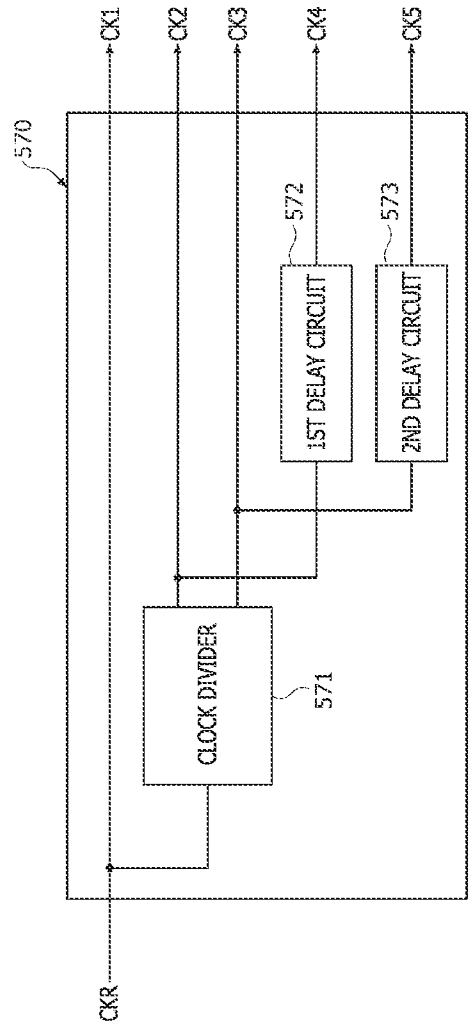
FIG. 41 is a diagram illustrating an example of the configuration and operation of a clock generator of FIG. 39.

FIG. 41 is a diagram illustrating an example of the configuration and operation of the clock generator 570 of FIG. 39. Referring to FIG. 41, the clock generator 570 may include a clock divider 571, a first delay circuit 572, and a second delay circuit 573. As described with reference to FIG. 39, the clock generator 570 may receive a reference clock signal CKR and output first to fifth clock signals CK1-CK5. The clock generator 570 may output the reference clock signal CKR as the first clock signal CK1 as it is. The clock divider 571 may divide the reference clock signal CKR input to the accumulator 540 of FIG. 39 to output the second clock signal CK2 and the third clock signal CK3. The second clock signal CK2 may include only odd-numbered pulses among the pulses constituting the first clock signal CK1 (i.e., the reference clock signal CKR). The third clock signal CK3 may include only even-numbered pulses among the pulses constituting the first clock signal CK1. Accordingly, the second clock signal CK2 and the third clock signal CK3 may each have a period corresponding to twice the period of the first clock signal CK1. In an example, the clock divider 571 may delay the first clock signal CK1 by a predetermined time to generate and output the second clock signal CK2 and the third clock signal CK3 having a period that is twice the period of the first clock signal CK1.

The first delay circuit 572 may receive the second clock signal CK2 output from the clock divider 571 and delay the second clock signal CK2 by a first delay time to generate and output the fourth clock signal CK4. The second delay circuit 573 may receive the third clock signal CK3 output from the clock divider 571 and delay the third clock signal CK3 by a second delay time to generate and output the fifth clock signal CK5. In each of the first delay circuit 572 and the second delay circuit 573, the first delay time and the second delay time may be set to be the same. As described with reference to FIG. 6, the delay time may be set to a time required for an exponent operation, a mantissa operation, and a normalization in the accumulating circuit in the accumulator 540. In an example, the first delay time may be set such that a rising edge of each of the pulses constituting the fourth clock signal CK4 is synchronized with a falling edge of each of the pulses constituting the third clock signal CK3. In an example, the second delay time may be set such that a rising edge of each of the pulses constituting the fifth clock signal CK5 is synchronized with the falling edge of each of the remaining pulses except the first pulse among the pulses constituting the second clock signal CK2.

Figure 42:
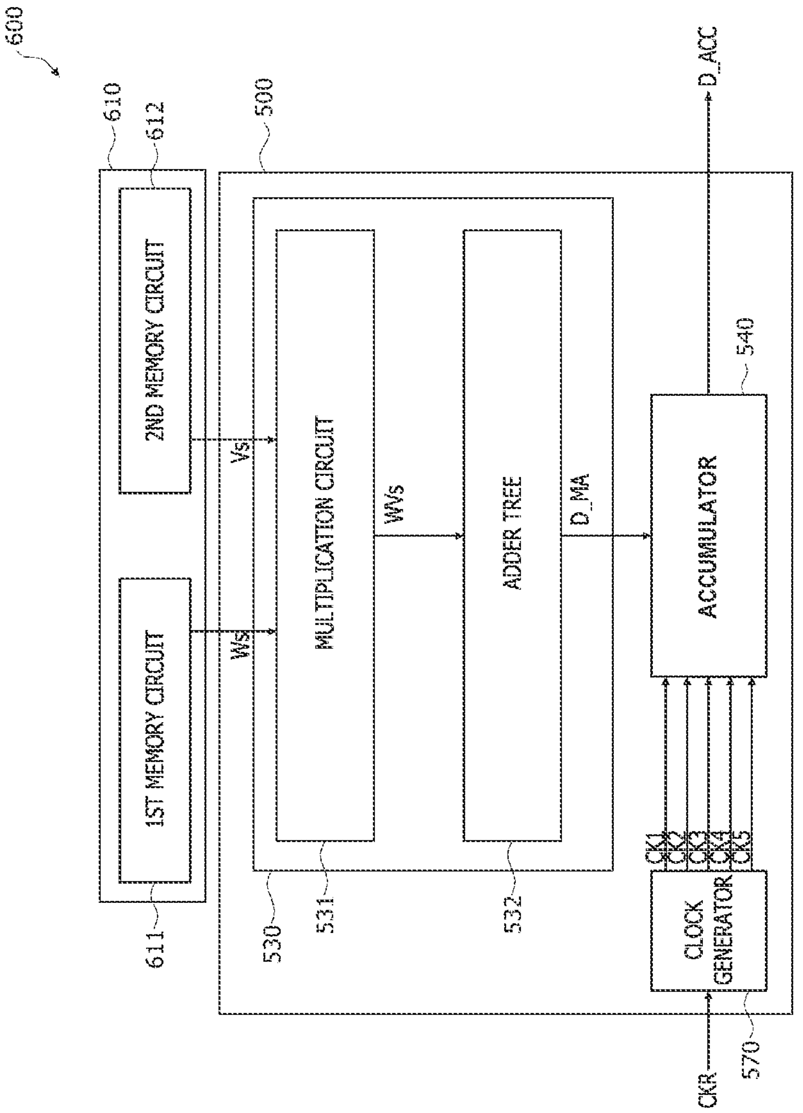
FIG. 42 is a diagram illustrating a PIM device according to an embodiment of the present disclosure.

FIG. 42 is a block diagram illustrating a PIM device 600 according to an embodiment of the present disclosure. Referring to FIG. 42, the PIM device 600 may include a MAC operator 500 and a memory circuit 610. The memory circuit 610 may include a first memory circuit 611 and a second memory circuit 612. In an example, each of the first memory circuit 611 and the second memory circuit 612 may be a memory bank. In another example, the first memory circuit 611 and the second memory circuit 612 may be a memory bank and a global buffer, respectively. Each of the first memory circuit 611 and the second memory circuit 612 may store weight data Ws and vector data Vs for a MAC operation. The first memory circuit 611 and the second memory circuit 612 may transmit the weight data Ws and the vector data Vs to the multiplication circuit 531 of the MAC operator 500, respectively, in response to a control signal controlling the MAC operation. The MAC operator 500 may be the same as described with reference to FIGS. 39 to 41. Accordingly, the multiplication and addition circuit 530 of the MAC operator 500 may output and transmit the multiplication addition data D_MA to the accumulator 540. The accumulator 540 may be synchronized with the first to fifth clock signals CK1-CK5 transmitted from the clock generator 570 to generate even latch data in which all of the odd-numbered multiplication and addition data of the multiplication addition data D_MAs are added and even latch data in which all of the even-numbered multiplication and addition data are added. In addition, the accumulator 540 may output the accumulation data D_ACC in which the odd latch data and the even latch data are added.

Figure 43:
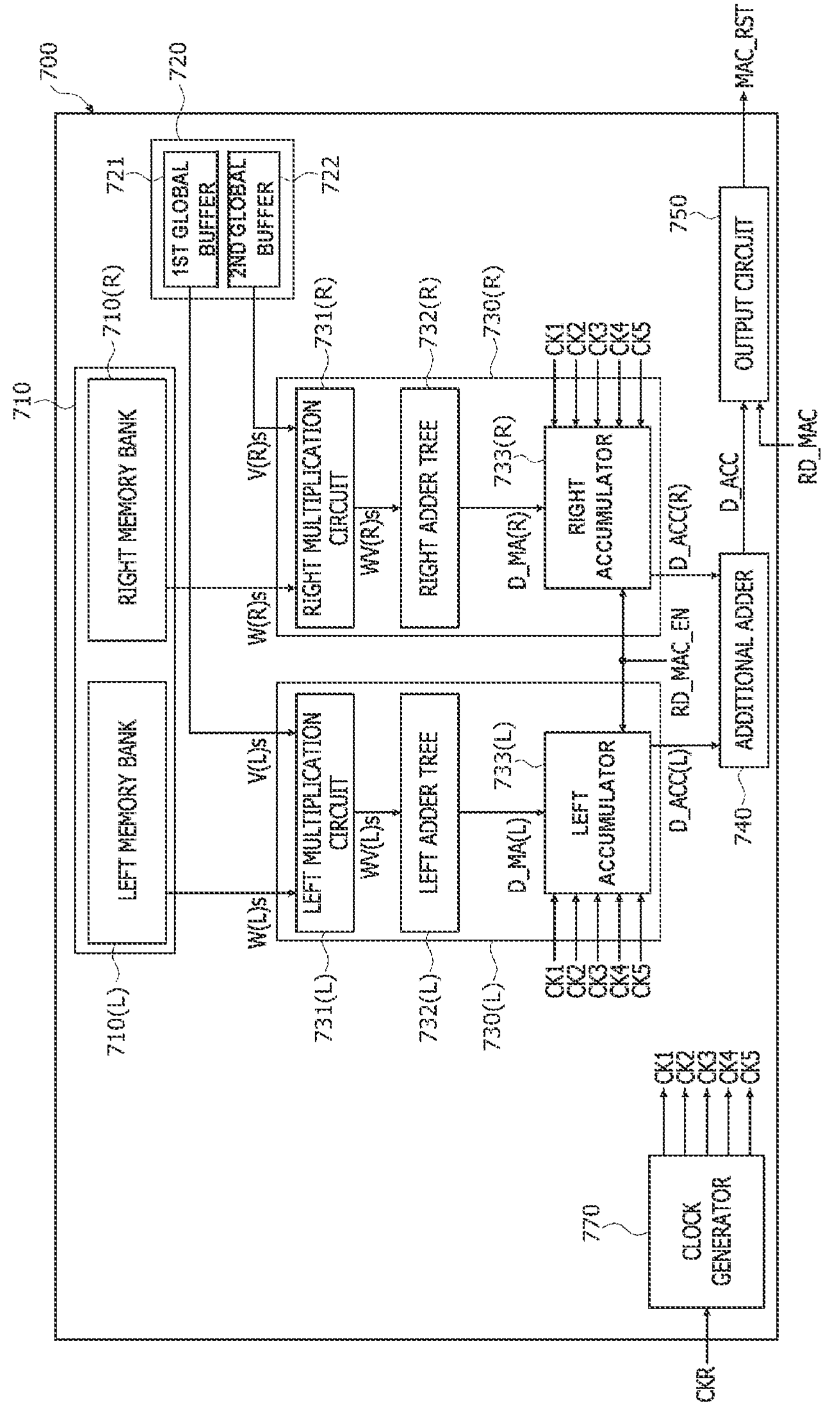
FIG. 43 is a diagram illustrating a PIM device according to another embodiment of the present disclosure.

FIG. 43 is a diagram illustrating a PIM device 700 according to another embodiment of the present disclosure. Referring to FIG. 43, the PIM device 700 may include a first memory circuit 710, a second memory circuit 720, a left MAC operator 730(L), a right MAC operator 730(R), an additional adder 740, an output circuit 750, and a clock generator 770. The first memory circuit 710 may include a left memory bank 710(L) and a right memory bank 710(R) that are physically separated from each other. That is, the left memory bank 710(L) and the right memory bank 710(R) may be distinguished from the memory regions that are logically separated from each other. The total memory size of the first memory circuit 710 may be equally distributed to the left memory bank 710(L) and the right memory bank 710(R). The left memory bank 710(L) and the right memory bank 710(R) may store left weight data W(L) s and right weight data W(R) s for a MAC operation, respectively. The left memory bank 710(L) and the right memory bank 710(R) may transmit the left weight data W(L) s and the right weight data W(R) s to the left MAC operator 730(L) and the right MAC operator 730(R), respectively, in response to a control signal input that controls the MAC operation. The second memory circuit 720 may include a first global buffer 721 and a second global buffer 722. The first global buffer 721 and the second global buffer 722 may store left vector data V(L) s and right vector data V(R)s for the MAC operation, respectively. The first global buffer 721 and the second global buffer 722 may transmit the left vector data V(L) s and the right vector data V(R)s to the left MAC operator 730(L) and the right MAC operator 730(R), respectively, in response to the control signal input that controls the MAC operation.

The left MAC operator 730(L) may include a left multiplication circuit 731(L), a left adder tree 732(L), and a left accumulator 733(L). The left multiplication circuit 731(L) may receive the left weight data W(L) s and the left vector data V(L) s from the first memory bank 710(L) and the first global buffer 721, respectively. The left multiplication circuit 731(L) may perform a multiplication operation on the left weight data W(L) s and the left vector data V(L) s to generate and output left multiplication data WV(L) s. The left multiplication data WV(L) s may be transmitted to the left adder tree 732(L). The left adder tree 732(L) may perform an addition operation on the left multiplication data WV(L) s transmitted from the left multiplication circuit 731(L) to generate and output left multiplication addition data D_MA(L). The left accumulator 733(L) may perform an accumulation operation on latch data latched in the previous operation process and the left multiplication addition data D_MA(L) transmitted from the left adder tree 732(L) to generate and output left accumulation data D_ACC(L). The left accumulation data D_ACC(L) may be transmitted to the additional adder 740.

The right MAC operator 730(R) may include a right multiplication circuit 731(R), a right adder tree 732(R), and a right accumulator 733(R). The right multiplication circuit 731(R) may receive the right weight data W(R) s and the right vector data V(R)s from the right memory bank 710(R) and the second global buffer 722, respectively. The right multiplication circuit 731(R) may perform a multiplication operation on the right weight data W(R) s and the right vector data V(R)s to generate and output right multiplication data WV(R)s. The right multiplication data WV(R)s may be transmitted to the right adder tree 732(R). The right adder tree 732(R) may perform an addition operation on the right multiplication data WV(R)s transmitted from the right multiplication circuit 731(R) to generate and output right multiplication addition data D_MA(R). The right accumulator 733(R) may perform an accumulation operation on the latch data latched in the previous operation process and the right multiplication addition data D_MA(R) transmitted from the right adder tree 732(R) to generate and output right accumulation data D_ACC(R). The right accumulation data D_ACC(R) may be transmitted to the additional adder 740.

The additional adder 740 may perform an addition operation on the left accumulation data D_ACC(L) and the right accumulation data D_ACC(R) transmitted from the left accumulator 733(L) of the left MAC operator 730(L) and the right accumulator 733(R) of the right MAC operator 730(R). The additional adder 740 may output data generated as a result of the addition operation as the accumulation data D_ACC. The accumulation data D_ACC may be transmitted to the output circuit 750. The output circuit 750 may output the accumulation data D_ACC as MAC result data MAC_RST which is the final MAC operation result in response to the input of a MAC result data read signal RD_MAC of a first logic level, for example, a "high" level.

The clock generator 770 may generate and output a first clock signal CK1, a second clock signal CK2, a third clock signal CK3, a fourth clock signal CK4, and a fifth clock signal CK5, based on a reference clock signal CKR input to the PIM device 700. The first clock signal CK1 may be the same as the reference clock signal CKR. The second clock signal CK2 may have the same pulses as odd-numbered pulses of the first clock signal CK1. The third clock signal CK3 may have the same pulses as even-numbered pulses of the first clock signal CK1. The fourth clock signal CK4 may have pulses generated with a predetermined time delay from the pulses of the second clock signal CK2. The fifth clock signal CK5 may have pulses generated with a predetermined time delay from the pulses of the third clock signal CK3. The delay time of the fourth clock signal CK4 and the fifth clock signal CK5 may be set to a time required for the accumulation operation in the left accumulator 733(L) and the right accumulator 733(R). The first to fifth clock signals CK1-CK5 may be transmitted to the left accumulator 733(L) and the right accumulator 733(R).

In the PIM device 700 according to the present embodiment, the left multiplication circuit 731(L) and the right multiplication circuit 731(R) may have the same configuration as the multiplication circuit 531 described with reference to FIG. 40. The left adder tree 732(L) and the right adder tree 732(R) of the PIM device 700 may have the same configuration as the adder tree 532 described with reference to FIG. 40. The left accumulator 733(L) and the right accumulator 733(R) of the PIM device 700 may have the same configuration as the accumulator 400 described with reference to FIG. 30. Accordingly, the left accumulator 733(L) and the right accumulator 733(R) may perform the same operations as the accumulator 400 described with reference to FIGS. 31 to 38. In this case, the left multiplication addition data D_MA(L) s in the left accumulator 733(L) may correspond to the input data D_INs in FIGS. 31 to 38. Similarly, the right multiplication addition data D_MA(R) s in the right accumulator 733(R) may also correspond to the input data D_INs in FIGS. 31 to 38.

Figure 44:
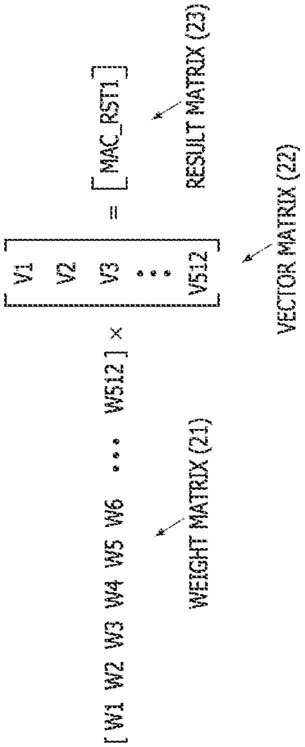
FIG. 44 is a diagram illustrating an example of matrix multiplication performed by a MAC operation of the PIM device of FIG. 43.

FIG. 44 is a diagram illustrating an example of matrix multiplication performed by a MAC operation of the PIM device 700 of FIG. 43. Referring to FIG. 44, the PIM device 700 may perform a matrix-vector multiplication on a weight matrix 21 and a vector matrix 22 to generate a result matrix 23. In this example, the weight matrix 21 may have one row and 512 columns, the vector matrix 22 may have 512 rows and one column, and the result matrix 23 may have one row and one column. The weight matrix 21 may have elements composed of 512 weight data W1-W512. The vector matrix 22 may have elements composed of 512 vector data V1-V512. The result matrix 23 may have an element composed of one MAC result data MAC_RST. The MAC result data MAC_RST of the result matrix 23 may be generated by a matrix-vector multiplication operation on the weight data W1-W512 and the vector data V1-V512. In an example, each of the weight data W1-W512 and the vector data V1-V512 may have an IEEE 754 format, that is, a 32-bit single-precision floating-point format.

Figure 45:
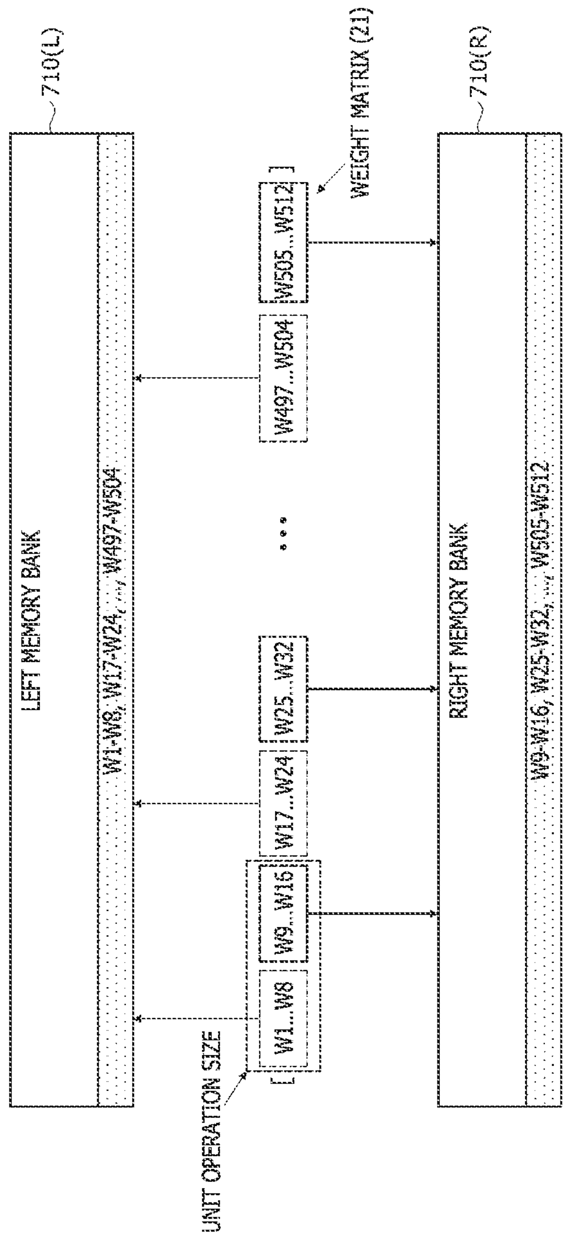
FIG. 45 is a diagram illustrating a method in which weight data of FIG. 44 are stored in a left memory bank and a right memory bank of the PIM device of FIG. 43.

FIG. 45 is a diagram illustrating a method in which the weight data W1-W512 of FIG. 44 are stored in the left memory bank 710(L) and the right memory bank 710(R) of the PIM device 700 of FIG. 43. As described with reference to FIG. 43, the weight data W1-W512 used in the MAC operation may be divided and stored in the left memory bank 710(L) and the right memory bank 710(R). Hereinafter, the weight data stored in the left memory bank 710(L) will be referred to as "left weight data", and the weight data stored in the right memory bank 710(R) will be referred to as "right weight data".

Referring to FIG. 45, the weight data W1-W512 of the weight matrix 21 of FIG. 44 may be equally allocated and arranged in the left memory bank 710(L) and the right memory bank 710(R) in units of unit operation size. The unit operation size may be defined as the size of weight data (or vector data) to which the PIM device 700 may perform a single MAC operation. The unit operation size may be determined depending on a hardware configuration of the components constituting the PIM device 700. Hereinafter, a case where the unit operation size is 512 bits will be taken as an example. In this case, since each of the weight data has the 32-bit floating-point format, there are 16 weight data on which the PIM device 700 may perform a single MAC operation. In this case, the weight data W1-W512 may be equally allocated and arranged to the left memory bank 710(L) and the right memory bank 710(R) in units of 16 pieces.

Specifically, the 16 pieces of the weight data of a first group, that is, first to sixteenth weight data W1-W16 may be equally allocated and stored in the left memory bank 710(L) and the right memory bank 710(R). That is, the first to eighth weight data W1-W8 may be stored in the left memory bank 710(L), and the ninth to sixteenth weight data W9-W16 may be stored in the right memory bank 710(R). The 16 pieces of the weight data of the second group, that is, the $17^{th}$ to $32^{nd}$ weight data W17-W32 may also be equally allocated and stored in the left memory bank 710(L) and the right memory bank 710(R). That is, the $17^{th}$ to $24^{th}$ weigh data W17-W24 may be stored in the left memory bank 710(L), and the $25^{th}$ to $32^{nd}$ weight data W25-W32 may be stored in the right memory bank 710(R). Similarly, the 16 pieces of the weight data of the $32^{nd}$ group, that is, the $497^{th}$ to $512^{th}$ weight data W497-W512 may equally be allocated and stored in the left memory bank 710(L) and the right memory bank 710(R). That is, the $497^{th}$ to $504^{th}$ weight data W497-W504 may be stored in the left memory bank 710(L), and the $505^{th}$ to $512^{th}$ weight data W505-W512 may be stored in the right memory bank 710(R).

Figure 46:
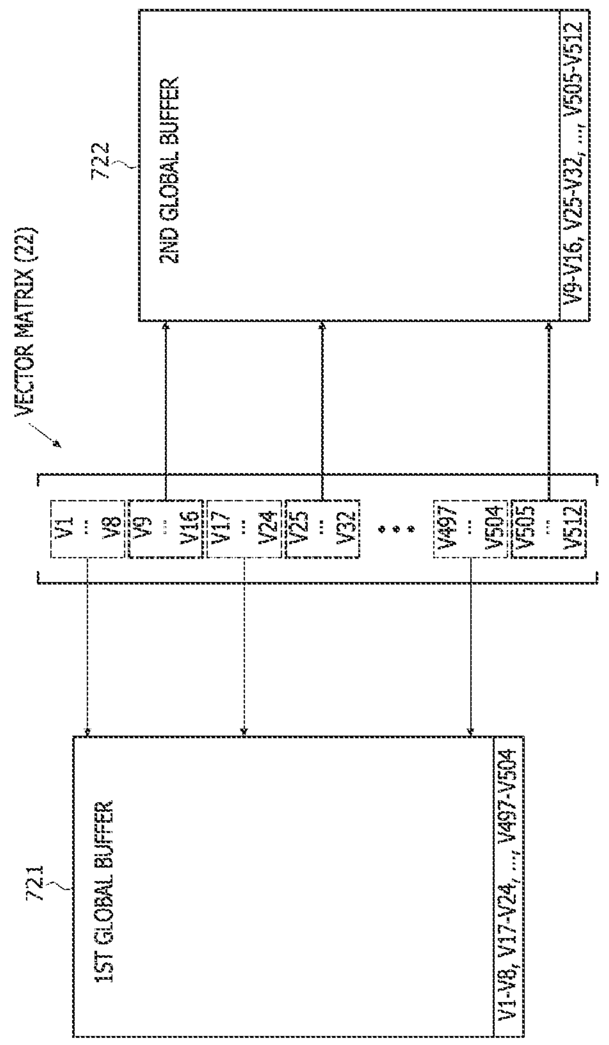
FIG. 46 is a diagram illustrating a method in which vector data of FIG. 44 are stored in a first global buffer and a second global buffer of the PIM device of FIG. 43.

FIG. 46 is a diagram illustrating a method in which the vector data V1-V512 of FIG. 44 is stored in the first global buffer 721 and the second global buffer 722 of the PIM device 700 of FIG. 43. Referring to FIG. 46, the vector data V1-V512 of the vector matrix 22 of FIG. 44 may be equally allocated and arranged in the first global buffer 721 and the second global buffer 722 in units of operation size. Since it is presupposed that the unit operation size is 512 bits in this example, the vector data V1-V512 may be equally allocated and arranged in the first global buffer 721 and the second global buffer 722 in units of 16 pieces. Specifically, the 16 pieces of the vector data of a first group, that is, the first to $16^{th}$ vector data V1-V16 may be equally allocated and stored in the first global buffer 721 and the second global buffer 722. That is, the first to eighth vector data V1-V8 may be stored in the first global buffer 721, and the ninth to sixteenth vector data V9-V16 may be stored in the second global buffer 722. The 16 pieces of the vector data of the second group, that is, the $17^{th}$ to $32^{nd}$ vector data V17-V32 may also be equally allocated and stored in the first global buffer 721 and the second global buffer 722. That is, the $17^{th}$ to $24^{th}$ vector data V17-V24 may be stored in the first global buffer 721, and the $25^{th}$ to $32^{nd}$ vector data V25-V32 may be stored in the second global buffer 722. Similarly, the 16 pieces of the vector data of the $32^{nd}$ group, that is, the $497^{th}$ to $512^{th}$ vector data V497-V512 may be equally allocated and stored in the first global buffer 721 and the second global buffer 722. That is, the $497^{th}$ to $504^{th}$ vector data V497-V504 may be stored in the first global buffer 721, and the $505^{th}$ to $512^{th}$ vector data V505-V512 may be stored in the second global buffer 722.

Figure 47:
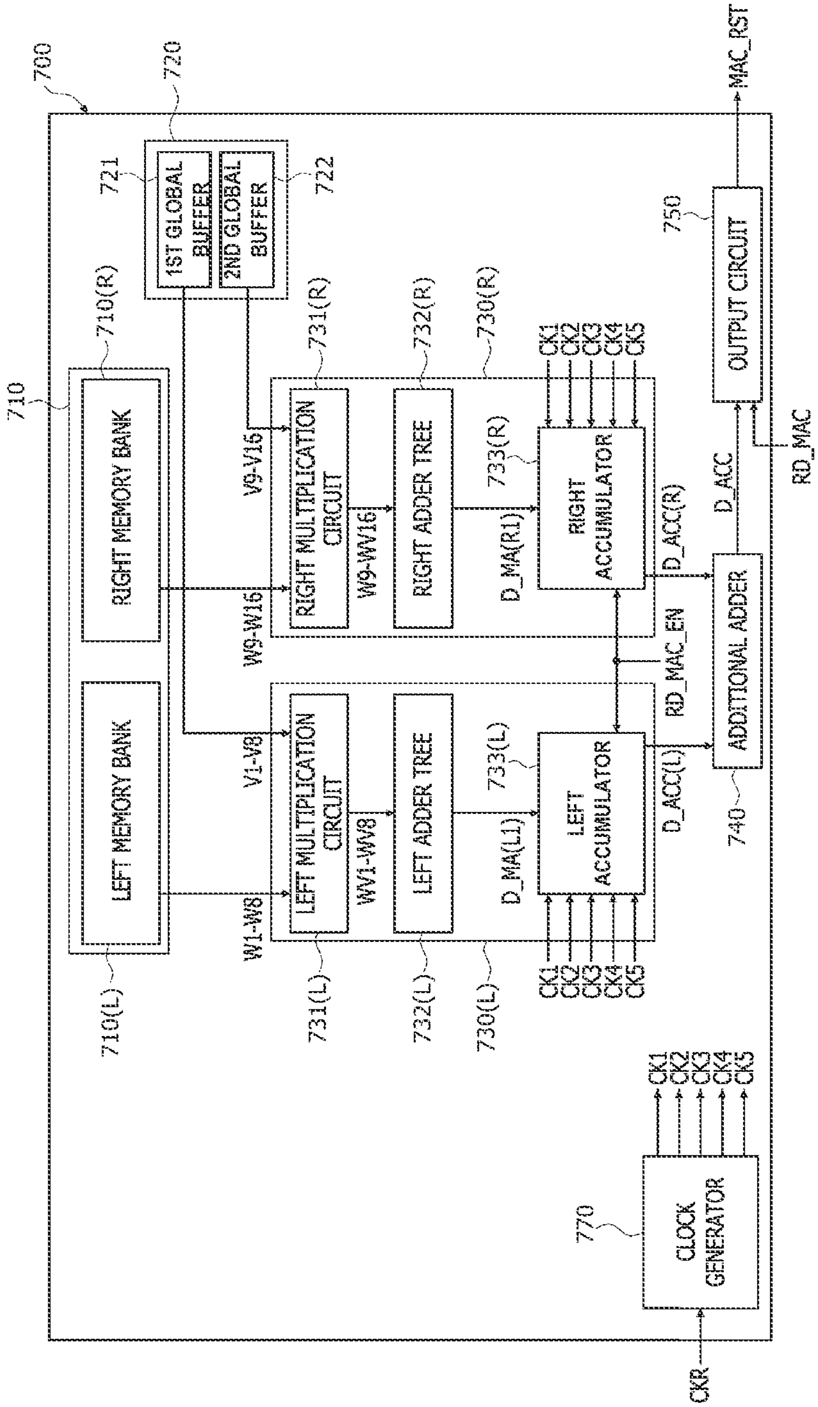
FIGS. 47 to 49 are diagrams illustrating a process in which the PIM device of FIG. 43 performs a MAC operation according to the matrix multiplication of FIG. 44.
Figure 48:
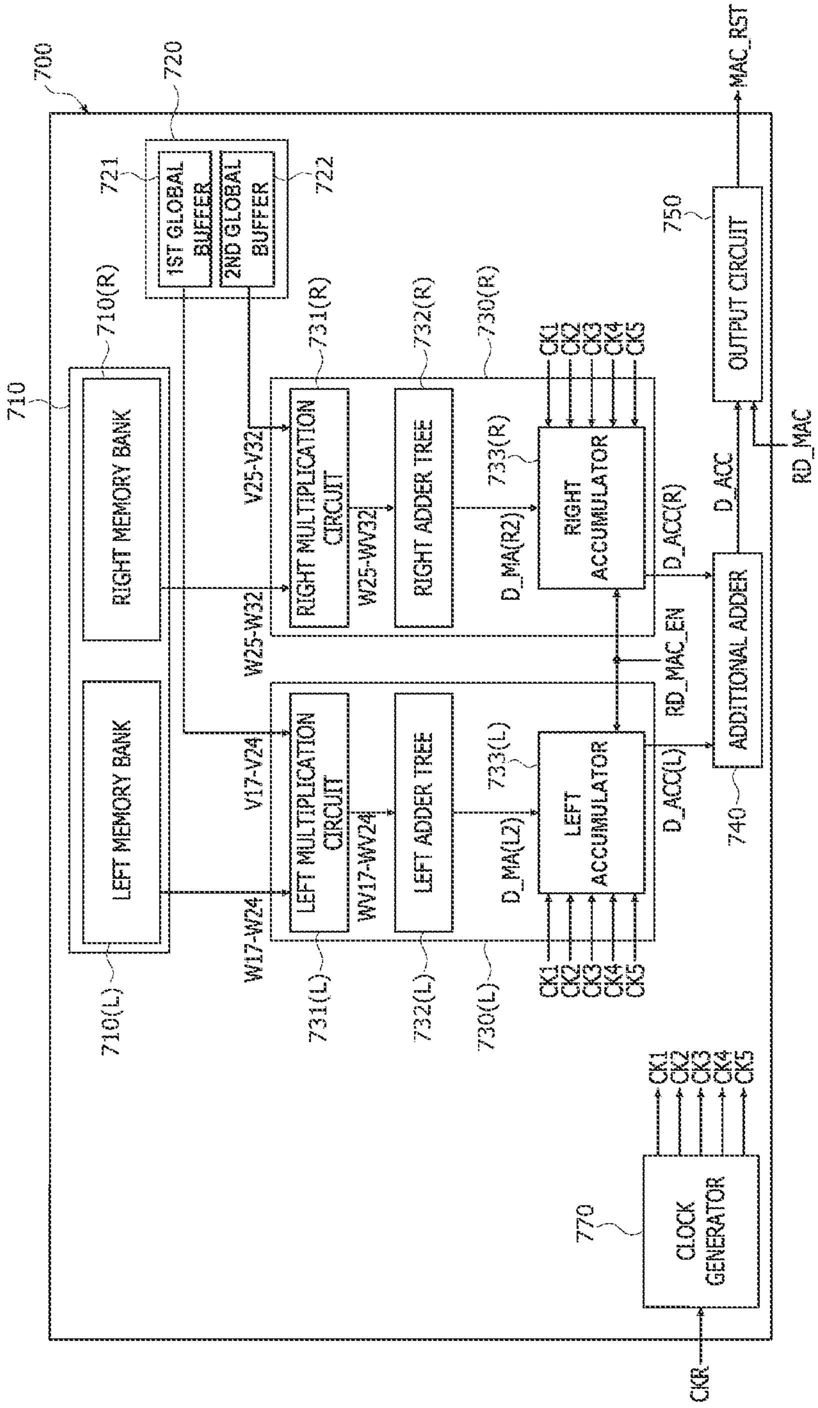
Figure 49:
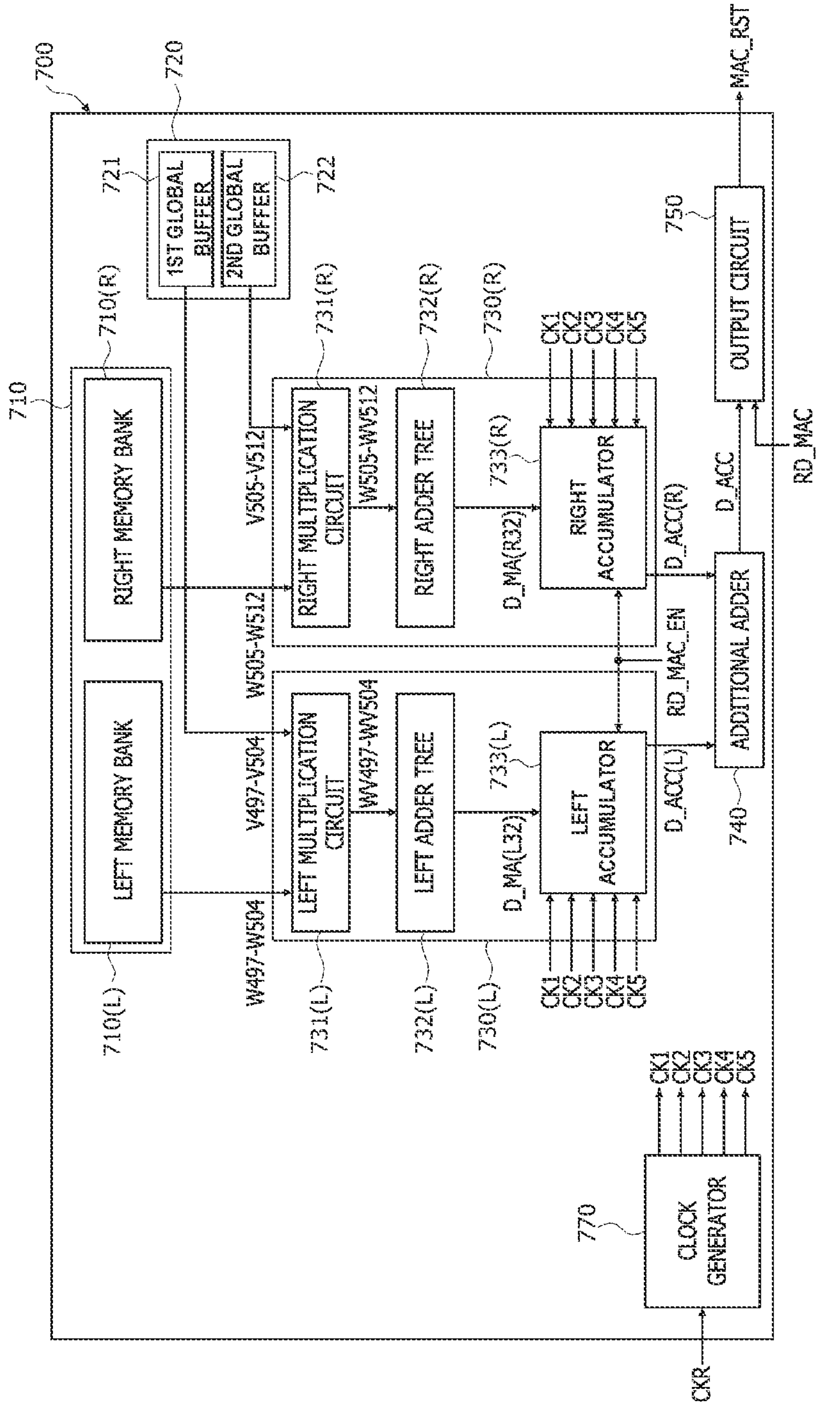

FIGS. 47 to 49 are diagrams illustrating a process in which the PIM device 700 of FIG. 43 performs a MAC operation according to the matrix multiplication of FIG. 44. In this example, since one MAC operation is performed on 16 weight data and 16 vector data, the MAC result data MAC_RST of the result matrix 23 of FIG. 44 may be generated by repeatedly performing the MAC operation 32 times.

First, referring to FIG. 47, the first MAC operation among the MAC operations of 32 times may be performed on the 16 weight data W1-W16 of the first group and 16 vector data V1-V16 of the first group. The left memory bank 710(L) may provide the first to eight weight data W1-W8 to the left multiplication circuit 731(L). The right memory bank 710(R) may provide the ninth to $16^{th}$ weight data W9-W16 to the right multiplication circuit 731(R). The first global buffer 721 may provide the first to eight vector data V1-V8 to the left multiplication circuit 731(L). The second global buffer 722 may provide the ninth to $16^{th}$ vector data V9-V16 to the right multiplication circuit 731(R). In the same manner as described with reference to FIG. 40, the left multiplication circuit 731(L) may perform a multiplication operation on the first to eighth weight data W1-W8 and the first to eighth vector data V1-V8 and transmit the resultant first to eighth multiplication data WV1-WV8 to the left adder tree 732(L). The right multiplication circuit 731(R) may perform a multiplication operation on the ninth to sixteenth weight data W9-W16 and the ninth to sixteenth vector data V9-V16 and transmit the resultant ninth to sixteenth multiplication data WV9-WV16 to the right adder tree 732(R). The left adder tree 732(L) may perform an addition operation on the first to eighth multiplication data WV1-WV8 and transmit the resultant first left multiplication addition data D_MA(L1) to the left accumulator 733(L). The right adder tree 732(R) may perform an addition operation on the ninth to sixteenth multiplication data WV9-WV16 and transmit the resultant first right multiplication addition data D_MA(R1) to the right accumulator 733(R). The accumulation operations in the left accumulator 733(L) and the right accumulator 733(R) will be described in more detail below.

Next, referring to FIG. 48, the second MAC operation among the MAC operations of 32 times may be performed on the 16 weight data W17-W32 of the second group and the 16 vector data V17-V32 of the second group. The left memory bank 710(L) may provide the $17^{th}$ to $24^{th}$ weight data W17-W24 to the left multiplication circuit 731(L). The right memory bank 710(R) may provide the $25^{th}$ to $32^{nd}$ weight data W25-W32 to the right multiplication circuit 731(R). The first global buffer 721 may provide the $17^{th}$ to $24^{th}$ vector data V17-V24 to the left multiplication circuit 731(L). The second global buffer 722 may provide the $25^{th}$ to $32^{nd}$ vector data V25-V32 to the right multiplication circuit 731(R). In the same manner as described with reference to FIG. 40, the left multiplication circuit 731(L) may perform a multiplication operation on the $17^{th}$ to $24^{th}$ weight data W17-W24 and the $17^{th}$ to $24^{th}$ vector data V17-V24 and transmit the resultant $17^{th}$ to $24^{th}$ multiplication data WV17-WV24 to the left adder tree 732(L). The right multiplication circuit 731(R) may perform a multiplication operation on the $25^{th}$ to $32^{nd}$ weight data W25-W32 and the $25^{th}$ to $32^{nd}$ vector data V25-V32 and transmit the resultant $25^{th}$ to $32^{nd}$ multiplication data WV25-WV32 to the right adder tree 732(R). The right adder tree 732(R) may perform an addition operation on the $17^{th}$ to $24^{th}$ multiplication data WV17-WV24 and transmit the resultant second left multiplication addition data D_MA(L2) to the left accumulator 733(L). The right adder tree 732(R) may perform an addition operation on the $25^{th}$ to $32^{nd}$ multiplication data WV25-WV32 and transmit the resultant second right multiplication addition data D_MA(R2) to the right accumulator 733(R).

Next, referring to FIG. 49, when all the MAC operations described with reference to FIGS. 47 and 48 are performed 31 times, the $32^{nd}$ MAC operation may be performed on the 16 weight data W497-W512 of the $32^{nd}$ group and the 16 vector data V497-V512 of the $32^{nd}$ group. The left memory bank 710(L) may provide the $497^{th}$ to $504^{th}$ weight data W497-W504 to the left multiplication circuit 731(L). The right memory bank 710(R) may provide the $505^{th}$ to $512^{th}$ weight data W505-W512 to the right multiplication circuit 731(R). The first global buffer 721 may provide the $497^{th}$ to $504^{th}$ vector data V497-V504 to the left multiplication circuit 731(L). The second global buffer 722 may provide the $505^{th}$ to $512^{th}$ vector data V505-V512 to the right multiplication circuit 731(R). In the same manner as described with reference to FIG. 40, the left multiplication circuit 731(L) may perform a multiplication operation on the $497^{th}$ to $504^{th}$ weight data W497-W504 and the $497^{th}$ to $504^{th}$ vector data V497-V504 and transmit the resultant $497^{th}$ to $504^{th}$ multiplication data WV497-WV504 to the left adder tree 732(L). The right multiplication circuit 731(R) may perform a multiplication operation on the $505^{th}$ to $512^{th}$ weight data W505-W512 and the $505^{th}$ to $512^{th}$ vector data V505-V512 and transmit the resultant $505^{th}$ to $512^{th}$ multiplication data WV505-WV512 to the right adder tree 732 (R). The left adder tree 732(L) may perform an addition operation on the $497^{th}$ to $504^{th}$ multiplication data WV497-WV504 and transmit the resultant second left multiplication addition data D_MA(L2) to the left accumulator 733(L). The right adder tree 732(R) may perform an addition operation on the $505^{th}$ $512^{th}$ multiplication data WV505-WV512 and transmit the resultant second right multiplication addition data D_MA(R2) to the right accumulator 733(R).

Figure 50:
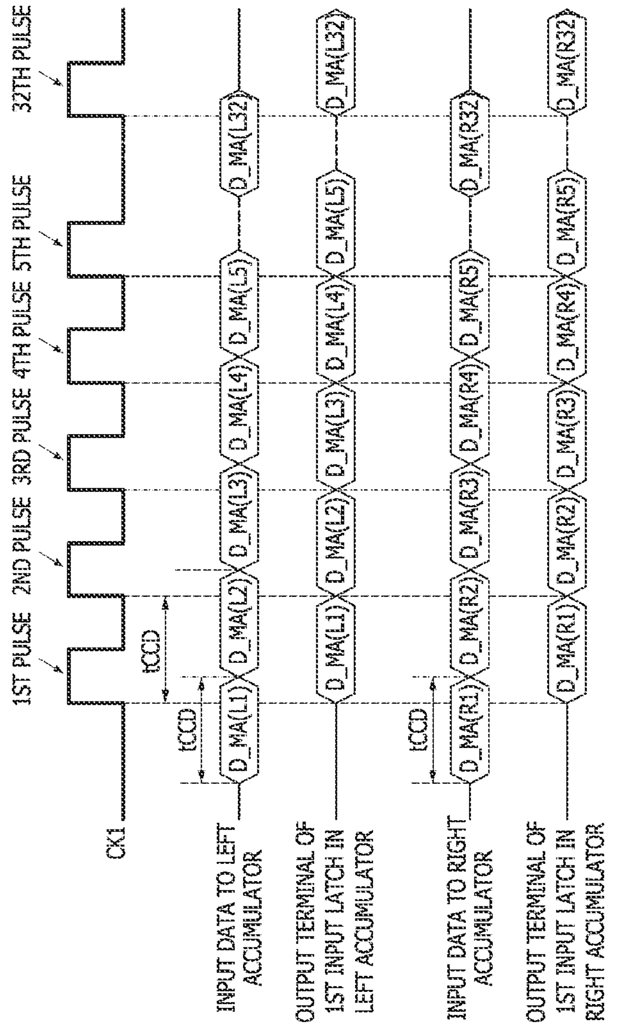
FIG. 50 is a diagram illustrating data input timings in a left accumulator and a right accumulator in the PIM device of FIG. 43.

FIG. 50 is a timing diagram illustrating data input timing in the left accumulator 733(L) and the right accumulator 733(R) in the PIM device 700 of FIG. 43. In this example, it is presupposed that a first clock signal CK1 (i.e., a reference clock signal CKR) has the same period as a CAS-to-CAS delay (hereinafter, referred to as "tCCD"), which is a time interval at which column addresses are applied to the memory circuit 710 in FIG. 43. In addition, it is presupposed that the time required for performing multiplication operation and addition operation in each of the left multiplication circuit 731(L)/left adder tree 732(L) and the right multiplication circuit 731(R)/right adder tree 732(R) is equal to or smaller than the tCCD.

Referring to FIG. 50, in the process of performing the MAC operations 32 times in the PIM device 700, the left accumulator 733(L) may sequentially receive the first to $32^{nd}$ left multiplication addition data D_MA(L1)-D_MA (L32) from the left adder tree 732(L) at an Interval of tCCD. Similarly, the right accumulator 733(R) may sequentially receive the first to $32^{nd}$ right multiplication addition data D_MA(R1)-D_MA(R32) from the right adder tree 732(R) at an interval of tCCD. A first input latch of the left accumulator 733(L) may sequentially output the first to $32^{nd}$ left multiplication addition data D_MA(L1)-D_MA(L32) at the interval of tCCD in synchronization with each of the pulses of the first clock signal CK1. Similarly, a first input latch of the right accumulator 733(R) may sequentially output the first to $32^{nd}$ right multiplication addition data D_MA(R1)-D_MA(R32) at the interval of tCCD in synchronization with each of the pulses of the first clock signal CK1.

When the first to fifth clock signals CK1-CK5 are provided as described with reference to FIG. 6, the left accumulator 733(L) may generate odd accumulation data in which the input data, that is, the odd-numbered left multiplication addition data of the input data, that is, the first to $32^{nd}$ left multiplication addition data D_MA(L1)-D_MA (L32) are added and even accumulation data in which the even-numbered left multiplication addition data of the input data, that is, the first to $32^{nd}$ left multiplication addition data D_MA(L1)-D_MA(L32) are added, as described with reference to FIGS. 31 and 32. In addition, in the manner described with reference to FIGS. 33 to 38, the left accumulator 733(L) may generate and output left accumulation data D_ACC(L) in which the odd accumulation data and the even accumulation data are added. Similarly, the right accumulator 733(R) may generate odd accumulation data in which the odd-numbered right multiplication addition data of the input data, that is, the first to $32^{nd}$ right multiplication addition data D_MA(R1)-D_MA(R32) are added and even accumulation data in which the even-numbered right multiplication addition data of the input data, that is, the first to $32^{nd}$ right multiplication addition data D_MA(R1)-D_MA (R32) are added. In addition, in the manner described with reference to FIGS. 33 to 38, the right accumulator 733(R) may generate and output right accumulation data D_ACC (R) in which odd accumulation data and even accumulation data are added. In this case, the MAC result data read enable signal RD_MAC_EN, which is activated before the logic level of the MAC result data read signal RD_MAC is changed to a "high" level, may be used as the selection signal SS transmitted to a selector 440 in FIGS. 33 to 38.

Figure 51:
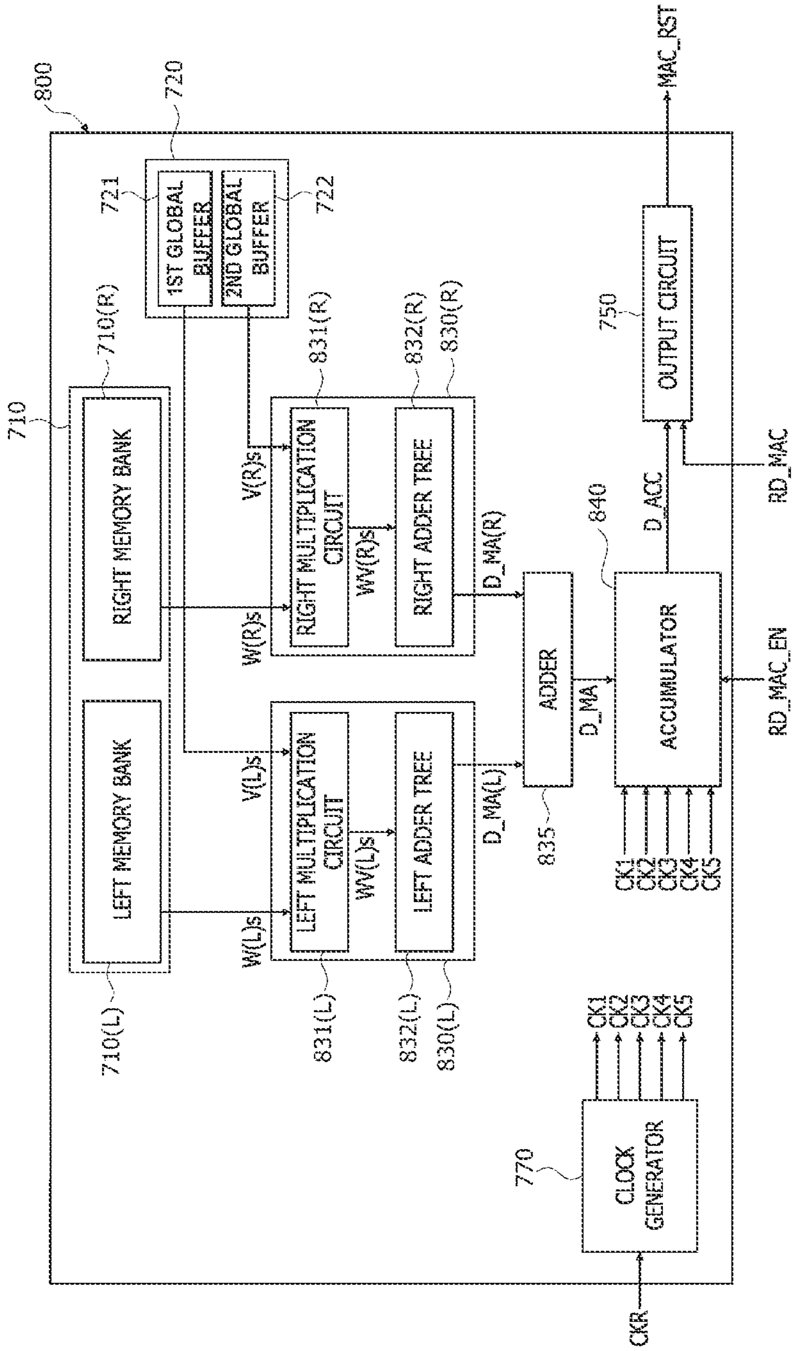
FIG. 51 is a diagram illustrating a PIM device according to another embodiment of the present disclosure.

FIG. 51 is a block diagram illustrating a PIM device 800 according to another embodiment of the present disclosure. Referring to FIG. 51, the PIM device 800 may include a first memory circuit 710, a second memory circuit 720, a left multiplication and addition circuit 830(L), a right multiplication and addition circuit 830(R), an adder 835, an accumulator 840, an output circuit 750, and a clock generator 770. The first memory circuit 710, the second memory circuit 720, the output circuit 750, and the clock generator 770 of the PIM device 800 according to the present embodiment may be configured in the same manner as the first memory circuit 710, the second memory circuit 720, the output circuit 750, and the clock generator 770 of the PIM device 700 described with reference to FIG. 43, respectively, and repeated descriptions will be omitted below. Referring to FIG. 51, the left multiplication and addition circuit 830(L) may include a left multiplication circuit 831(L) and a left adder tree 832(L). The left multiplication circuit 831(L) may receive left weight data W(L) s and left vector data V(L) s from a left memory bank 710(L) and a first global buffer 721, respectively. The left multiplication circuit 831(L) may perform a multiplication operation on the left weight data W(L) s and the left vector data V(L) s to generate and output left multiplication data WV(L) s. The left multiplication data WV(L) s may be transmitted to the left adder tree 832(L). The left adder tree 832(L) may perform an addition operation on the left multiplication data WV(L) s transmitted from the left multiplication circuit 831(L) to generate left multiplication addition data D_MA(L) and transmit the generated left multiplication addition data D_MA(L) to the adder 835.

The right multiplication and addition circuit 830(R) may include a right multiplication circuit 831(R) and a right adder tree 832(R). The right multiplication circuit 831(R) may receive right weight data W(R) s and right vector data V(R)s from a right memory bank 710(R) and a second global buffer 722, respectively. The right multiplication circuit 831(R) may perform a multiplication operation on the right weight data W(R) s and the right vector data V(R)s to generate and output right multiplication data WV(R)s. The right multiplication data WV(R)s may be transmitted to the right adder tree 832(R). The right adder tree 832(R) may perform an addition operation on the right multiplication data WV(R)s transmitted from the right multiplication circuit 831(R) to generate right multiplication addition data D_MA(R) and transmit the generated right multiplication addition data D_MA(R) to the adder 835.

The adder 835 may receive the left multiplication addition data D_MA(L) from the left adder tree 832(L) of the left multiplication and addition circuit 830(L). In addition, the adder 835 may receive the right multiplication addition data D_MA(R) from the right adder tree 832(R) of the right multiplication and addition circuit 830(R). The adder 835 may perform an addition on the left multiplication addition data D_MA(L) and the right multiplication addition data D_MA(R) to generate multiplication addition data D_MA. The adder 835 may transmit the generated multiplication addition data D_MA to the accumulator 840.

The accumulator 840 may perform an accumulation operation on the multiplication addition data D_MA transmitted from the adder 835 and latch data latched during the previous operation to generate and output accumulation data D_ACC. The accumulation data D_ACC may be transmitted to the output circuit 750. The accumulator 840 may be configured in the same manner as the accumulator 400 of FIG. 4 described with reference to FIG. 30. As in the example described with reference to FIGS. 45 and 46, in the process of performing the MAC operations 32 times in the PIM device 800, the accumulator 840 may sequentially receive the first to $32^{nd}$ multiplication addition data D_MAs from the adder 835. A first input latch of the accumulator 840 may be synchronized with each of the pulses of the first clock signal CK1 to sequentially output each of the first to $32^{nd}$ multiplication addition data D_MAS.

Figure 52:
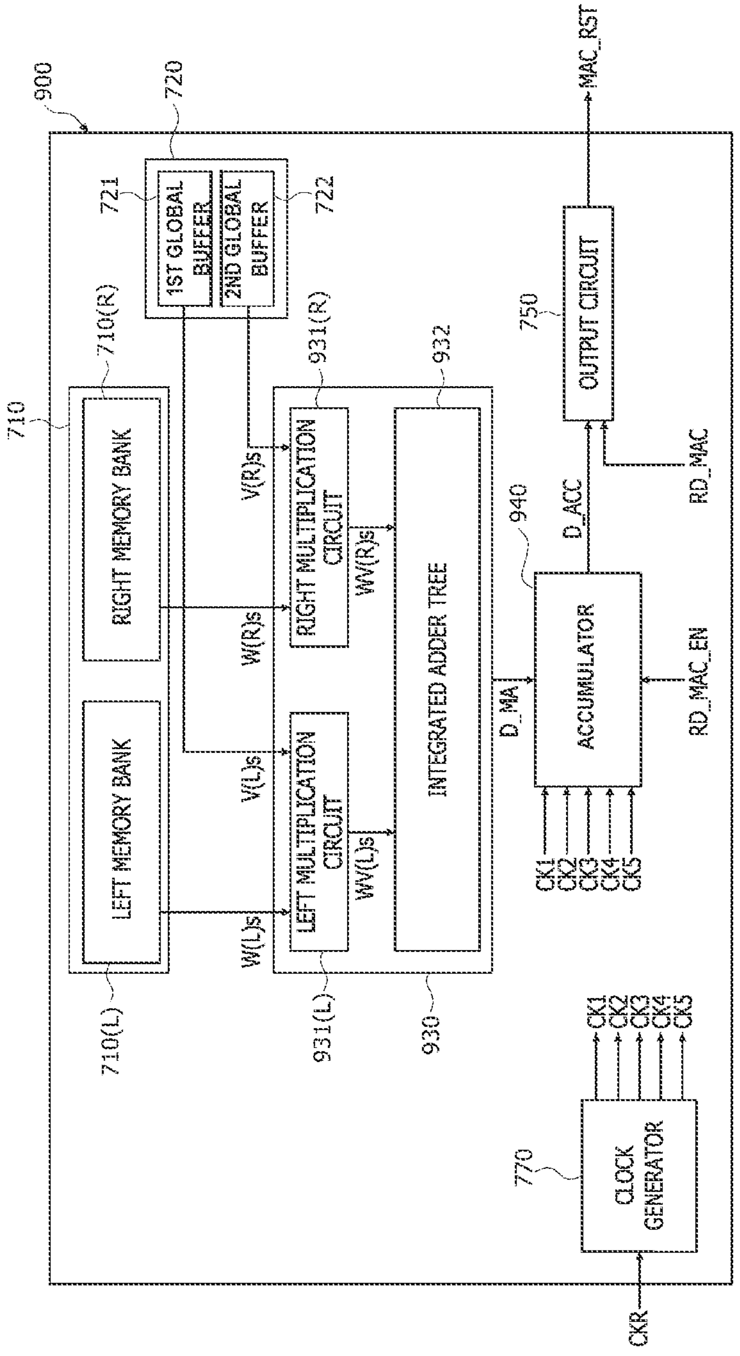
FIG. 52 is a diagram illustrating a PIM device according to another embodiment of the present disclosure.

When the first to fifth clock signals CK1-CK5 are provided as described with reference to FIG. 6, in the same manner as described with reference to FIGS. 31 and 32, the accumulator 840 may generate odd accumulation data in which the odd-numbered left multiplication addition data of the input data, that is, the first to $32^{nd}$ multiplication addition data D_MAs are added and even accumulation data in which the even-numbered left multiplication addition data are added. In addition, in the manner described with reference to FIGS. 33 to 38, the accumulator 840 may generate and output the accumulation data D_ACC in which the odd accumulation data and the even accumulation data are added. In this case, a MAC result data read enable signal RD_MAC_EN, which is activated before the logic level of the MAC result data read signal RD_MAC is changed to a "high" level, may be used as the selection signal SS transmitted to the selector 440 in FIGS. 33 to 38, FIG. 52 is a block diagram illustrating a PIM device 900 according to another embodiment of the present disclosure. Referring to FIG. 52, the PIM device 900 may include a first memory circuit 710, a second memory circuit 720, a multiplication and addition circuit 930, an accumulator 940, an output circuit 750, and a clock generator 770. The first memory circuit 710, the second memory circuit 720, the output circuit 750, and the clock generator 770 may be configured in the same manner as the first memory circuit 710, the second memory circuit 720, the output circuit 750, and the clock generator 770 of the PIM device 700 described with reference to FIG. 43, respectively, and hereinafter, overlapping descriptions will be omitted.

The multiplication and addition circuit 930 may perform a multiplication operation and an addition operation on the weight data W(L) s and W(R) s and the vector data V(L) s and V(R)s provided from the first memory circuit 710 and the second memory circuit 720, respectively, to generate and output multiplication addition data D_MA. The multiplication and addition circuit 930 may include a left multiplication circuit 931(L), a right multiplication circuit 931(R), and a unified adder tree 932. The left multiplication circuit 931(L) may receive the left weight data W(L) s and the left vector data V(L) s from a left memory bank 710(L) and a first global buffer 721, respectively. The left multiplication circuit 931(L) may perform a multiplication operation on the left weight data W(L) s and the left vector data V(L) s to generate and output left multiplication data WV(L) s. The right multiplication circuit 931(R) may receive the right weight data W(R) s and the right vector data V(R)s from a right memory bank 710(R) and a second global buffer 722, respectively. The right multiplication circuit 931(R) may perform a multiplication operation on the right weight data W(R) s and the right vector data V(R)s to generate and output right multiplication data W(R) s. The left multiplication data WV(L) s and the right multiplication data WV(R)s may be transmitted to the unified adder tree 932. The unified adder tree 932 may perform an addition operation on the left multiplication data WV(L) s and the right multiplication data WV(R)s transmitted from the left multiplication circuit 931(L) and the right multiplication circuit 931(R) to generate and output multiplication addition data D_MA. The accumulator 940 may perform an accumulation operation on the multiplication addition data D_MA transmitted from the multiplication and addition circuit 930 and the latch data latched in the previous operation process to generate and output accumulation data D_ACC. The accumulator 940 may have the same configuration as the accumulator 840 of the PIM device 800 described with reference to FIG. 51.

Figure 53:
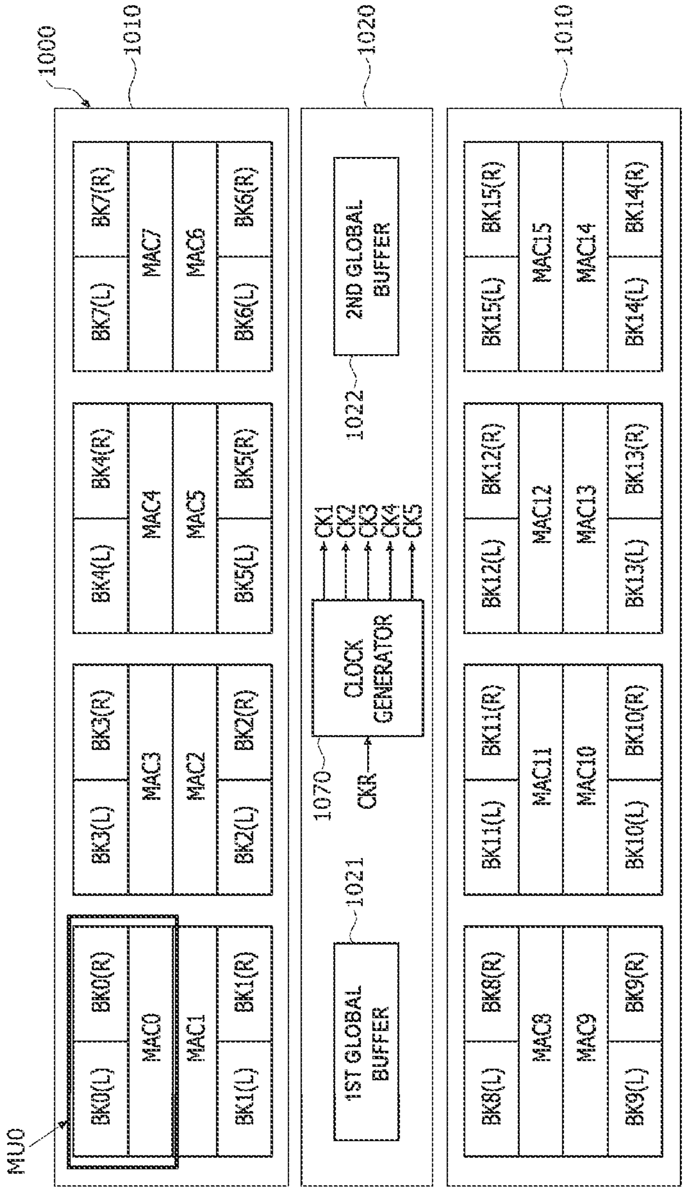
FIG. 53 is a diagram illustrating a PIM device according to another embodiment of the present disclosure.

FIG. 53 is a block diagram illustrating a PIM device 1000 according to another embodiment of the present disclosure. Referring to FIG. 53, the PIM device 1000 according to this embodiment may include a memory/operation circuit 1010 and a peripheral circuit 1020. The memory/operation circuit 1010 may include a plurality of memory banks BKs and a plurality of MAC operators MACs. The peripheral circuit 1020 may include a first global buffer 1021, a second global buffer 1022, and a clock generator 1070. Although not shown in FIG. 53, a data input/output circuit may be disposed in the peripheral circuit 1020. In this embodiment, it is presupposed that the plurality of memory banks BKs include first to sixteenth memory banks BK0-BK15. Also, it is presupposed that the plurality of MAC operators MACs include first to sixteenth MAC operators MAC0-MAC15.

Each of the first to sixteenth memory banks BK0-BK15 may be divided into first to sixteenth left memory banks BK0(L)-BK15(L) arranged in a left region and first to sixteenth right memory banks BK0(R)-BK15(R) arranged in a right region. For example, the first memory bank BK0 may include the first left memory bank BK0(L) arranged in the left region and the first right memory bank BK0(R) arranged in the right region. The second memory bank BK1 may include the second left memory bank BK1(L) arranged in the left region and the second right memory bank BK1(R) arranged in the right region. Similarly, the sixteenth memory bank BK15 may include the sixteenth left memory bank BK15(L) arranged in the left region and the sixteenth right memory bank BK15(R) arranged in the right region. In this embodiment, each of the first to sixteenth left memory banks BK0(L)-BK15(L) and each of the first to sixteenth right memory banks BK0(R)-BK15(R) may be disposed adjacent to each other. For example, the first left memory bank BK0(L) and the first right memory bank BK0(R) may be disposed adjacent to each other while sharing, for example, a row decoder. The second left memory bank BK1(L) and the second right memo bank BK1(R) may also be disposed adjacent to each other. Similarly, the sixteenth left memory bank BK15(L) and the sixteenth right memory bank BK15 (R) may also be disposed adjacent to each other.

In an example, each of the first to sixteenth MAC operators MAC0-MAC15 may include the left MAC operator 730(L) of FIG. 43 and the right MAC operator 730(R) of FIG. 43 described with reference to FIG. 43. In another example, each of the first to sixteenth MAC operators MAC0-MAC15 may include the left multiplication and addition circuit 830(L), the right multiplication and addition circuit 830(R), the adder 835, and the accumulator 840 described with reference to FIG. 51. In another example, each of the first to sixteenth MAC operators MAC0-MAC15 may include the multiplication and addition circuit 930 and the accumulator 940 described with reference to FIG. 52.

The first to sixteenth MAC operators MAC0-MAC15 may be allocated and arranged in the first to sixteenth memory banks BLO-BK15, respectively. For example, the first MAC operator MAC0 may be allocated to the first left memory bank BK0(L) and the first right memory bank BK0(R). The second MAC operator MAC1 may be allocated to the second left memory bank BK1(L) and the second right memory bank BK1(R). In the same manner, the sixteenth MAC operator MAC15 may be allocated to the sixteenth left memory bank BK15(L) and the sixteenth right memory bank BK15(R). Each of the first to sixteenth MAC operators MAC0-MAC15 may constitute a single MAC unit MU together with the allocated memory bank BK. For example, as shown in FIG. 53, the first left memory bank BK0(L), the first right memory bank BK0(R), and the first MAC operator MAC0 may constitute the first MAC unit MUO. Although omitted from FIG. 53, each of the remaining second to sixteenth MAC units may be configured in the same manner. The MAC operator constituting the single MAC unit may receive left weight data and right weight data from the left memory bank and the right memory bank constituting the MAC unit, respectively. Accordingly, the first MAC operator MAC0 may receive left weight data and right weight data from the first left memory bank BK0(L) and the first right memory bank BK0(R), respectively.

The first global buffer 1021 may transmit left vector data to each of the first to sixteenth MAC operators MAC0-MAC15. The second global buffer 1022 may transmit right vector data to each of the first to sixteenth MAC operators MAC0-MAC15. The clock generator 1070 may divide a reference clock signal CKR transmitted from the outside to output first to fifth clock signals CK1-CK5. The first to fifth clock signals CK1-CK5 may be configured in the same manner as described with reference to FIG. 6. The first to fifth clock signals CK1-CK5 may be provided to accumulators of the first to sixteenth MAC operators MAC0-MAC15, respectively.

Figure 54:
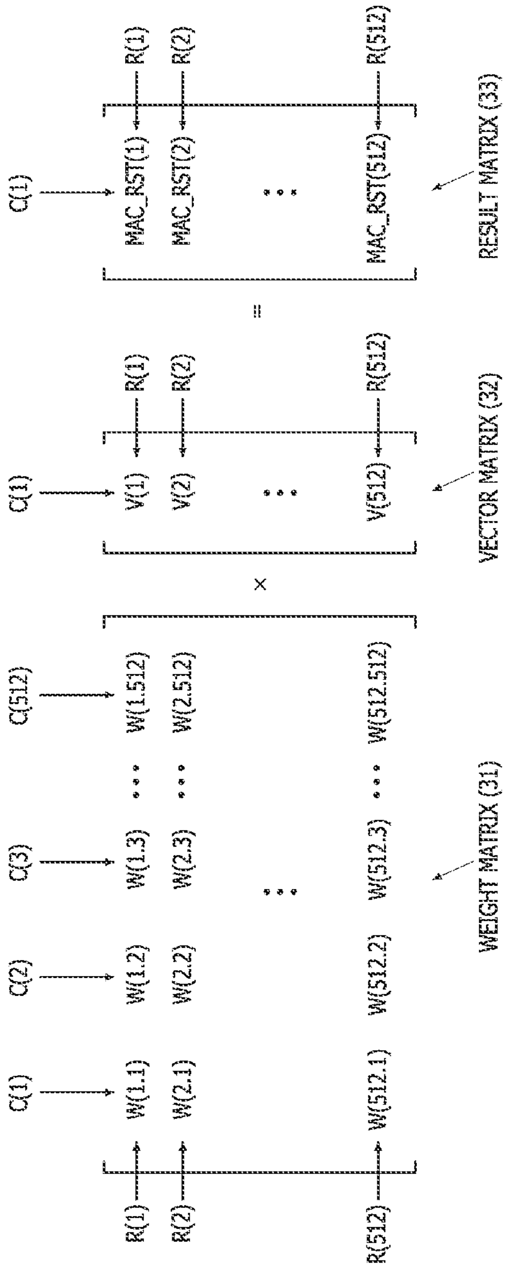
FIG. 54 is a diagram illustrating an example of matrix multiplication performed by a MAC operation of the PIM device of FIG. 53.

FIG. 54 is a diagram illustrating an example of matrix multiplication performed by a MAC operation of the PIM device 1000 of FIG. 53. Referring to FIG. 54, the PIM device 1000 may perform a MAC operation according to matrix multiplication on (M×N) weight matrix 31 ("M" and "N" are natural numbers greater than or equal to 2) and (N×1) vector matrix 32. The terms "matrix multiplication" and "MAC operation" are used interchangeably. The PIM device 1000 may generate and output (M×1) result matrix 33 as a result of the MAC operation. Hereinafter, it is presupposed that the weight matrix 31 has 512 rows R(1)-R(512) and 512 columns C(1)-C(512), and the vector matrix 32 has 512 rows R(1)-R(512) and one column C(1), as an example. The result matrix 33 generated as a result of the matrix multiplication for the weight matrix 31 and the vector matrix 32 may have 512 rows R(1)-R(512) and one column C(1). The weight matrix 31 may have 262,144 weight data W1.1-W1.512, . . . , W512.1-W512.512 as elements. The vector matrix 32 may have 512 vector data V(1)-V(512) as elements. The result matrix 33 generated as a result of the MAC operation may have 512 MAC result data MAC_RST(1)-MAC_RST(512) as elements.

The PIM device 1000 according to this embodiment may include the plurality of memory banks BKs and the plurality of MAC operators MACs, so that the MAC operation in each of the plurality of MAC operators MACs may be performed simultaneously. Specifically, each of the first to sixteenth MAC operators MAC0-MAC15 of the PIM device 1000 may perform a first MAC operation on the weight data W(1.1)-W(1.512), . . . , W(16.1)-W(16.512) of the first to sixteenth rows among the 512 rows of the weight matrix 31 and the vector data V(1)-V(512) to generate and output first to sixteenth MAC result data MAC_RST(1)-MAC_RST(16). Then, each of the first to sixteenth MAC operators MAC0-MAC15 may perform a second MAC operation on the weight data W(17.1)-W(17.512), . . . , W(32.1)-W(32.512) of the $17^{th}$ to $32^{nd}$ rows of the weight matrix 31 and the vector data V(1)-V(512) to generate and output $17^{th}$ to $32^{nd}$ MAC result data MAC_RST(17)-MAC_RST(32). When the third to $32^{nd}$ MAC operations are performed in the same manner, the $33^{rd}$ to $512^{th}$ MAC result data MAC_RST(33)-MAC_RST(512) may be generated and output. In this process, the accumulation operation performed by the accumulator of each of the first to sixteenth MAC operators MAC0-MAC15 may be performed in the same manner as the process described with reference to FIGS. 31 to 38.

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

What is claimed is:

1. An accumulator comprising:

an input latch circuit including a first input latch capable of latching and outputting input data, a second input latch capable of latching and outputting odd latch data associated with odd-numbered pulses of a first clock signal, and a third input latch capable of latching and outputting even latch data associated with even-numbered pulses of the first clock signal;

an accumulating circuit configured to add the input data and the odd latch data output from the input latch circuit to output odd accumulation data associated with odd-numbered pulses of a first clock signal, and configured to add the input data and the even latch data to output even accumulation data associated with even-numbered pulses of the first clock signal; and an output latch circuit including a first output latch capable of latching the odd accumulation data output from the accumulating circuit and outputting the odd latch data, and including a second output latch capable of latching the even accumulation data output from the accumulating circuit and outputting the even latch data.

2. The accumulator of claim 1, wherein the first input latch:

includes an input terminal capable of receiving the input data, a clock input terminal capable of receiving the first clock signal, and an output terminal coupled to a first input terminal of the accumulating circuit, and is configured to transmit the input data to the accumulating circuit through the output terminal in synchronization with the first clock signal.

3. The accumulator of claim 2, wherein the second input latch:

includes an input terminal capable of receiving the odd latch data, a clock input terminal capable of receiving a second clock signal, and an output terminal coupled to a second input terminal of the accumulating circuit, and is configured to transmit the odd latch data to the accumulating circuit through the output terminal in synchronization with the second clock signal.

4. The accumulator of claim 3, wherein the third input latch:

includes an input terminal capable of receiving the even latch data, a clock input terminal capable of receiving a third clock signal, and an output terminal coupled to the second input terminal of the accumulating circuit, and is configured to transmit the even latch data to the accumulating circuit through the output terminal in synchronization with the third clock signal.

5. The accumulator of claim 4, wherein the second clock signal has the same pulses as odd-numbered pulses of the first clock signal, and wherein the third clock signal has the same pulses as even-numbered pulses of the first clock signal.

6. The accumulator of claim 5, wherein the accumulating circuit includes a first output terminal capable of outputting the odd accumulation data and a second output terminal capable of outputting the even accumulation data, and wherein the first output terminal of the accumulating circuit is coupled to the input terminal of the first output latch, and the second output terminal of the accumulating circuit is coupled to the input terminal of the second output latch.

7. The accumulator of claim 6, wherein the input data has a floating-point format composed of a first sign bit, first exponent bits, and first mantissa bits, wherein each of the odd latch data and the even latch data has a floating-point format composed of a second sign bit, second exponent bits, and second mantissa bits, wherein each of the odd accumulation data and the even accumulation data has a floating-point format composed of a third sign bit, third exponent bits, and third mantissa bits, and wherein the accumulating circuit includes:

an exponent operation circuit configured to perform an exponent calculation operation on the first exponent bits and the second exponent bits transmitted from the input latch circuit and generate maximum exponent bits, first shift bits, and second shift bits;

a mantissa operation circuit configured to perform a mantissa calculation operation on the first mantissa bits and the second mantissa bits and generate the third sign bit and intermediate mantissa addition bits; and a normalizer configured to perform a normalization operation using the maximum exponent bits, the intermediate mantissa addition bits, and the third sign bit and generate the third exponent bits and the third mantissa bits.

8. The accumulator of claim 7, wherein the exponent operation circuit includes:

an exponent subtraction circuit configured to perform a subtraction operation of subtracting the second exponent bits from the first exponent bits to generate exponent subtraction bits and output a most significant bit and lower bits of the exponent subtraction bits;

a 2's complement circuit configured to generate 2's complement bits for the lower bits output from the exponent subtraction circuit;

a first selector configured to output "0" or the lower bits of the exponent subtraction bits as the first shift bits according to a value of the most significant bit output from the exponent subtraction circuit;

a second selector configured to output 2's complement bits for the lower bits or "0" as the second shift bits according to the value of the most significant bit output from the exponent subtraction circuit; and a third selector configured to output the first exponent bits or the second exponent bits as the maximum exponent bits according to the value of the most significant bit output from the exponent subtraction circuit.

9. The accumulator of claim 8, wherein the exponent subtraction circuit includes:

a 2's complement circuit configured to generate 2's complement bits for the second exponent bits;

an exponent adder configured to add the 2's complement bits for the second exponent bits and the first exponent bits and output a most significant bit and lower bits of the exponent subtraction bits; and an exponent comparison circuit configured to generate a sign bit determined according to the most significant bit.

10. The accumulator of claim 9, wherein the exponent comparison circuit is configured to output "1" as the sign bit when the most significant bit is "0," and to output "0" as the sign bit when the most significant bit is "1".

11. The accumulator of claim 10, wherein when the sign bit is "0", the first selector, the second selector, and the third selector are configured to output "0", 2's complement bits for the lower bits of the exponent subtraction bits, and the first exponent bits as the first shift bits, the second shift bits, and the maximum exponent bits, respectively, and wherein when the sign bit is "1", the first selector, the second selector, and the third selector are configured to output the lower bits of the exponent subtraction bits, "0", and the 2's complement bits as the first shift bits, the second shift bits, and the maximum exponent bits, respectively.

12. The accumulator of claim 7, wherein the mantissa operation circuit includes:

a negative number processing circuit configured to perform negative number processing on the first mantissa bits and the second mantissa bits and output first intermediate mantissa bits and second intermediate mantissa bits;

a shift circuit configured to shift the first intermediate mantissa bits by the number of bits corresponding to an absolute value of the first shift bits and generate third intermediate mantissa bits, and shift the second intermediate mantissa bits by the number of bits corresponding to an absolute value of the second shift bits and generate fourth intermediate mantissa bits; and a mantissa addition circuit configured to receive the first sign bit, the second sign bit, the third intermediate mantissa bits, and the fourth intermediate mantissa bits and generate the third sign bit and the intermediate mantissa addition bits.

13. The accumulator of claim 12, wherein the negative number processing circuit includes:

a first 2's complement circuit configured to output 2's complement bits of the first mantissa bits;

a second 2's complement circuit configured to output 2's complement bits of the second mantissa bits;

a first selector configured to output the first mantissa bits or the 2's complement bits of the first mantissa bits as the first intermediate mantissa bits according to a value of the first sign bit; and a second selector configured to output the 2's complement bits of the first mantissa bits or the second mantissa bits as the second intermediate mantissa bits according to a value of the second sign bit.

14. The accumulator of claim 13, wherein the first selector is configured to output the first mantissa bits when the first sign bit is "0", and output the 2's complement bits of the first mantissa bits when the first sign bit is "1", and wherein the second selector is configured to output the second mantissa bits when the second sign bit is "0", and output the 2's complement bits of the second mantissa bits when the second sign bit is "1".

15. The accumulator of claim 12, wherein the shift circuit includes:

a first mantissa shifter configured to receive the first shift bits and the first intermediate mantissa bits and generate the third intermediate mantissa bits; and a second mantissa shifter configured to receive the second shift bits and the second intermediate mantissa bits and generate the fourth intermediate mantissa bits.

16. The accumulator of claim 12, wherein the mantissa addition circuit includes:

a mantissa adder configured to add the third intermediate mantissa bits and the fourth intermediate mantissa bits to generate the mantissa addition bits, and generate the third sign bit determined by the first sign bit, the second sign bit, and the mantissa addition bits;

a 2's complement circuit configured to generate 2's complement bits of the mantissa addition bits; and a selector configured to output the mantissa addition bits or the 2's complement bits of the mantissa addition bits as the intermediate mantissa addition bits according to a value of the third sign bit.

17. The accumulator of claim 16, wherein the mantissa adder is configured to:

output "0" as the third sign bit when both the first sign bit and the second sign bit are "0";

output "1" as the third sign bit when both the first sign bit and the second sign bit are "1";

output "0" as the third sign bit when one of the first sign bit and the second sign bit is "0" and the other is "1", and when a carry occurs in a result of an addition operation on the third intermediate mantissa bits and the fourth intermediate mantissa bits; and output "1" as the third sign bit when one of the first sign bit and the second sign bit is "0" and the other is "1", and when a carry does not occur in a result of an addition operation on the third intermediate mantissa bits and the fourth intermediate mantissa bits.

18. The accumulator of claim 16, wherein the selector is configured to output the mantissa addition bits as the intermediate mantissa addition bits when the third sign bit is "0", and output the 2's complement bits of the mantissa addition bits when the third sign bit is "1" as the intermediate mantissa addition bits.

19. The accumulator of claim 7, wherein the normalizer includes:

a "1" search circuit configured to search a position where a bit having "1" in a right direction from a leftmost bit of the intermediate mantissa addition bits is first located and generate the third shift bits as a search result;

a mantissa shifter configured to shift the intermediate mantissa addition bits by the number of bits corresponding to a value of the third shift bits and generate the third mantissa bits; and an exponent adder configured to add the maximum exponent bits and the third shift bits and generate the third exponent bits.

20. The accumulator of claim 6, wherein the first output latch includes an input terminal capable of receiving the odd accumulation data, a clock input terminal capable of receiving a fourth clock signal, and an output terminal coupled to the input terminal of the second input latch, and is configured to transmit the odd latch data to the second input latch through the output terminal in synchronization with the fourth clock signal.

21. The accumulator of claim 20, wherein the second output latch includes an input terminal capable of receiving the even accumulation data, a clock input terminal capable of receiving a fifth clock signal, and an output terminal coupled to the input terminal of the third input latch, and is configured to transmit the even latch data to the third input latch through the output terminal in synchronization with the fifth clock signal.

22. The accumulator of claim 21, wherein the fourth clock signal is composed of pulses that are delayed by a delay time from the second clock signal, and wherein the fifth clock signal is composed of pulses that are delayed by the delay time from the third clock signal.

23. The accumulator of claim 22, wherein the delay time is set to a time required for performing operations in the accumulating circuit.

24. The accumulator of claim 21, wherein a rising edge of each of pulses constituting the fourth clock signal is synchronized with a falling edge of each of pulses constituting the third clock signal, and wherein a rising edge of each of pulses constituting the fifth clock signal is synchronized with a falling edge of each of remaining pulses except for a first pulse among pulses constituting the second clock signal.

25. The accumulator of claim 21, wherein each of the second clock signal, the third clock signal, the fourth clock signal, and the fifth clock signal has a period that is twice a period of the first clock signal.

26. The accumulator of claim 1, wherein the first input latch is capable of transmitting each of the input data to the first input terminal of the accumulating circuit in synchronization with each of pulses of a clock signal, wherein the second input latch is capable of transmitting each of the odd latch data to the second input terminal of the accumulating circuit in synchronization with each of remaining odd-numbered pulses except for a first odd-numbered pulse among the odd-numbered pulses of the clock signal, and wherein the third input latch is capable of transmitting each of the even latch data to the second input terminal of the accumulating circuit in synchronization with each of remaining even-numbered pulses except for a first even-numbered pulse among the even-numbered pulses of the clock signal.

27. The accumulator of claim 26, wherein the accumulating circuit is configured to transmit each of the odd accumulation data to the first output latch in synchronization with each of the even-numbered pulses of the clock signal, and transmit each of the even accumulation data to the second output latch in synchronization with each of the odd-numbered pulses except for the first odd-numbered pulse among the odd-numbered pulses of the clock signal.

28. The accumulator of claim 27, wherein the first output latch is capable of transmitting each of the odd latch data to the second input latch at a time point delayed by a delay time from each of the even-numbered pulses of the clock signal, and wherein the second output latch is capable of transmitting each of the even latch data to the third input latch at a time point delayed by the delay time from the remaining odd-numbered pulses except for the first pulse among the odd-numbered pulses of the clock signal.

* * * * *